United States Patent
Harris et al.

(10) Patent No.: US 11,290,053 B2
(45) Date of Patent: Mar. 29, 2022

(54) SOLAR PANEL MOUNTING APPARATUS

(71) Applicant: Unirac Inc., Albuquerque, NM (US)

(72) Inventors: Stacy Harris, Albuquerque, NM (US); Todd Ganshaw, Albuquerque, NM (US); Nathan Schuit, Edgewood, NM (US)

(73) Assignee: Unirac Inc., Albuquerque, NM (US)

( * ) Notice: Subject to any disclaimer, the term of this patent is extended or adjusted under 35 U.S.C. 154(b) by 30 days.

(21) Appl. No.: 16/837,946

(22) Filed: Apr. 1, 2020

(65) Prior Publication Data

US 2020/0313604 A1 Oct. 1, 2020

Related U.S. Application Data

(60) Provisional application No. 62/827,625, filed on Apr. 1, 2019.

(51) Int. Cl.
*F16M 13/00* (2006.01)
*H02S 20/23* (2014.01)
*F16B 5/06* (2006.01)

(52) U.S. Cl.
CPC ............ *H02S 20/23* (2014.12); *F16B 5/0685* (2013.01)

(58) Field of Classification Search
CPC .......... H02S 20/00; H02S 20/25; H02S 20/23; H02S 20/24; F16B 5/085; F16B 2/12; F16B 2/10; F16B 2/065; Y02E 10/47; F24S 2025/801
See application file for complete search history.

(56) References Cited

U.S. PATENT DOCUMENTS

| | | | |
|---|---|---|---|
| 7,866,099 B2 | 1/2011 | Komamine et al. | |
| 8,938,932 B1 | 1/2015 | Wentworth et al. | |
| 9,825,581 B2 | 11/2017 | Wildes | |
| 2012/0073220 A1 | 3/2012 | Kobayashi et al. | |
| 2013/0220395 A1* | 8/2013 | Babineau, Jr. | F24S 25/35 136/244 |
| 2016/0308486 A1* | 10/2016 | Atia | F24S 25/613 |
| 2020/0116191 A1* | 4/2020 | Uppu | H02S 20/23 |
| 2021/0058023 A1* | 2/2021 | Bamat | F24S 25/636 |

* cited by examiner

*Primary Examiner* — Amy J. Sterling
(74) *Attorney, Agent, or Firm* — Lee & Hayes, P.C.

(57) ABSTRACT

A solar panel mounting assembly including a cap that includes a secure-side wing, a catch-side wing, and an integral vertical leg that protrudes downwardly from the catch-side wing. The vertical leg is integral with the catch-side wing and has a top end and a bottom end. A plurality of inwardly facing corrugations are disposed at the bottom end of the vertical leg. The solar panel mounting assembly further includes a base that includes a secure-side support surface, a tilted spring support ledge on a catch-side, and a plurality of outwardly-facing corrugations disposed on an upper horizontal portion of the base. An inwardly-facing corrugation of the vertical leg contacts and engages an outwardly-facing corrugation on the upper horizontal portion of the base, and the base is vertically adjustable with respect to the cap.

10 Claims, 86 Drawing Sheets

SEC B-B

SOLAR PANEL MOUNTING APPARATUS

CROSS-REFERENCE TO RELATED PATENT APPLICATIONS

This application claims priority to and incorporates U.S. Provisional Patent Application 62/827,625, filed Apr. 1, 2019, entitled "Solar Panel Mounting Apparatus," in its entirety by reference.

BACKGROUND

Photovoltaic (PV) modules (i.e., solar panels) come in a variety of frame heights (thicknesses), sometimes ranging from approximately 30 mm to 50 mm. In some examples, PV modules may be thinner or thicker than the aforementioned range. Furthermore, PV modules may be mounted to a roof of a house, a building, and/or other structures, or may even be mounted to a foundation surface. Currently, a specific PV module mounting apparatus may be used to mount the PV module to a structure. Such a mounting apparatus may be selected based at least in part on the thickness of the PV module.

Thus, a solution is desired for a PV module mounting assembly that is easily adjustable by the installer to accommodate a wide variation in module frame thickness.

DETAILED DESCRIPTION OF THE DRAWINGS

This disclosure describes structures and methods for mounting one or more photovoltaic modules (i.e., solar panels) to a roof of a house, building, or other structure, using components made of stainless steel and/or aluminum alloys (which may be anodized). Specifically, this disclosure is directed to rail-less mounting assemblies, with indexable vertical height adjustment capabilities, for attaching solar panels to a roof. A catch/secure arrangement may be used to hold one or more solar panels in an array. A height adjustment bolt may be used to adjust the vertical height of the solar panels before, or after, installation. A "Click-On" tower attachment scheme may be used to attach the rail-less mounting assembly to a slider channel, which is lag screwed to the roof.

In an embodiment, the module mounting assembly may be configured to adjust the height of the mount's attachment point above the roof surface in a continuous manner over a wide range (approximately 28 mm), so as to accommodate non-uniformities, undulations, or waviness in the roof's surface. Such a feature gives the entire array of installed solar panels a smooth and flat appearance when viewed from a distance. The module mounting assembly may be configured to adjust the solar panel's height above the roof after the panels have been installed (i.e., post-installation height adjustment capability). In an embodiment, the module mounting assembly may be indexable, meaning that the module mounting assembly may accommodate solar panel frames having varying thicknesses by the adjustability of the module mounting assembly. In such an embodiment, the module mounting assembly may be easily adjusted across a wide range of thicknesses in discrete (non-continuous) increments of about 2.9 mm per increment of adjustment. Additionally, and/or alternatively, the module mounting assembly may be indexable in any discrete increments greater than or less than about 2.9 mm. Furthermore, the module mounting apparatus may be adjusted across a wide range within discrete increments in solar panel frame thickness of about 2 to 3 mm per increment (e.g., a subset of 30, 33, 36, 39, 42 mm thick would be a 3 mm increment in thickness).

In an embodiment, the module mounting assembly may use a "Click-On" attachment feature for attaching the indexable mounts to a slider bar or channel (see, for example, FIG. 1) which is described in more detail in co-pending U.S. patent application Ser. No. 15/659,038 filed Jul. 25, 2017, entitled "Click-On Tower and L-Foot Mount for Attaching Solar Panels to a Roof", and which is incorporated by reference herein in its entirety.

In general, the upper bracket (cap), lower bracket (base), and tower bracket (tower) may be made of metallic extrusions (e.g., of aluminum alloy). Other components may be made by die-casting or 3-D additive printing, where appropriate.

Figure 1:
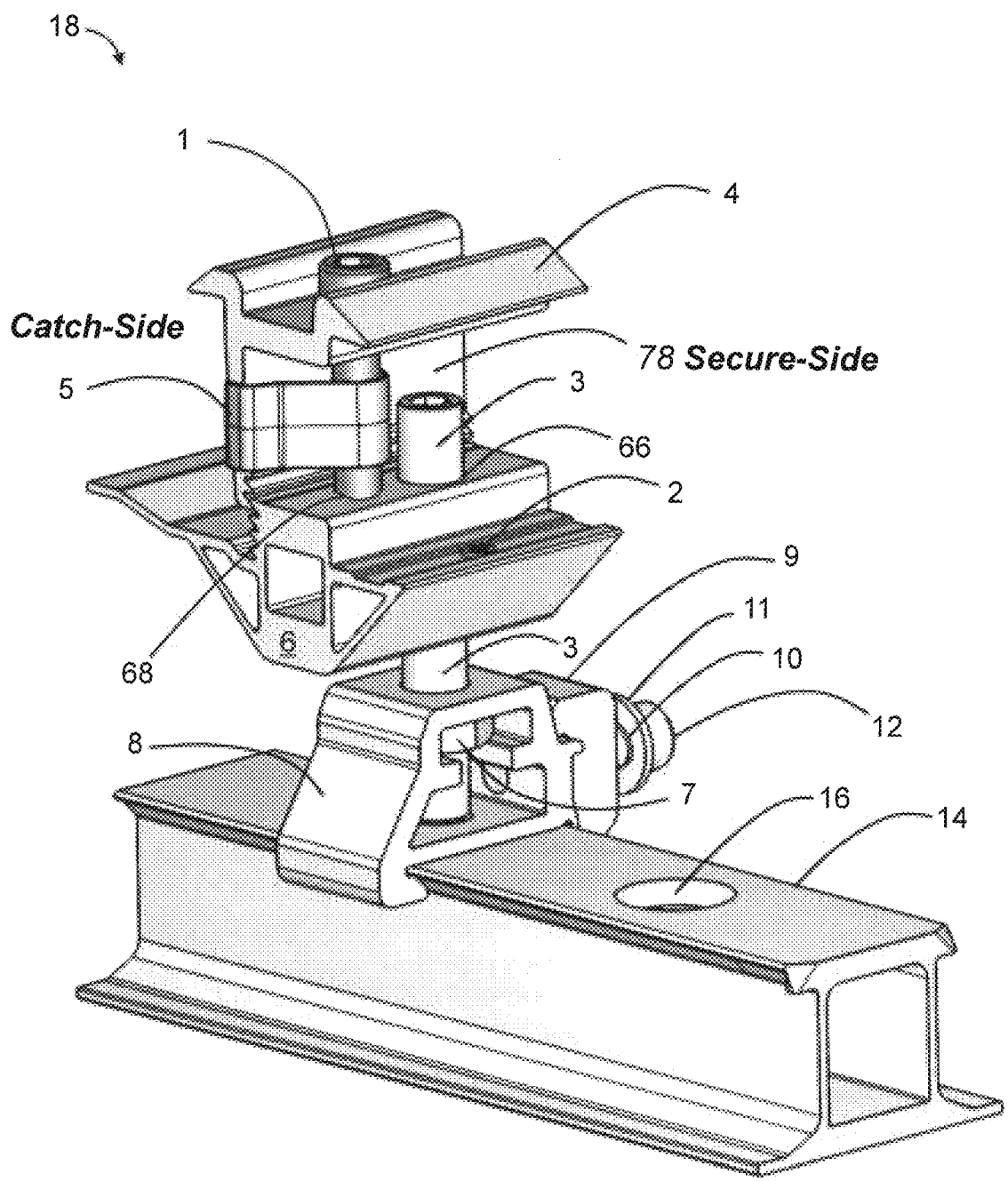
FIG. 1 shows an isometric perspective view of a rail-less, indexable mounting assembly, according to an embodiment.

FIG. 1 shows an isometric perspective view of a rail-less, indexable mounting assembly 18, according to an embodiment. Assembly 18 may include a clamping bolt 1 (also referred to as "a catching bolt") that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby stabilizing cap 4 relative to clamping bolt 1. In other words, spring clip 5 clips onto clamping bolt 1 on one end and clips onto the vertical leg 78 of the cap 4, such that the spring clip 5 maintains a position of the cap 4 against the clamping bolt 1 and the base 6. Base 6 includes an electrical bonding pin 2 (also referred to herein as a "bonding pin") disposed in a horizontal groove. Height adjustment bolt 3 engages threaded aperture 66 in base 6. Clamping bolt 1 engages threaded aperture 68 in base 6. Rotation of bolt 3 about its longitudinal axis causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Slider 14 has an un-threaded aperture 16 that provides access to install a lag screw that attaches slider 14 to an underlying roof surface. Tower bracket 8, with attached assembly 18, is free to slide North-South along the longitudinal length of slider 14 prior to tightening of horizontal attachment bolt 12.

Figure 2:
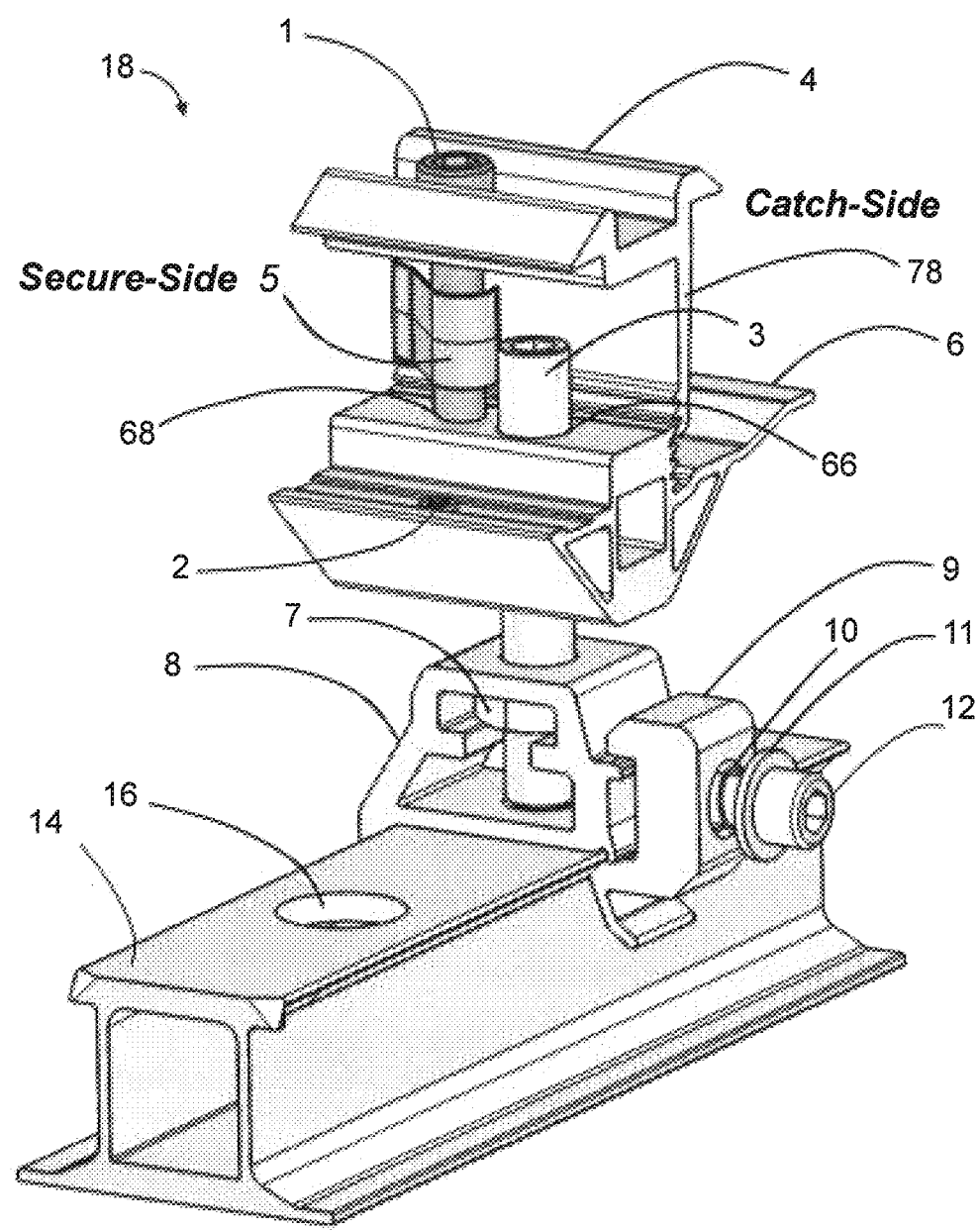
FIG. 2 shows an isometric perspective view of a rail-less, indexable mounting assembly, according to an embodiment.

FIG. 2 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of cap 4 against clamping bolt 1 and base 6, unless acted upon by a force that is sufficient to overcome a restoring force that presses the cap against the base. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface. Tower bracket 8, with attached assembly 18, is free to slide North-South along the longitudinal length of slider 14 prior to tightening of horizontal attachment bolt 12.

Figure 3:
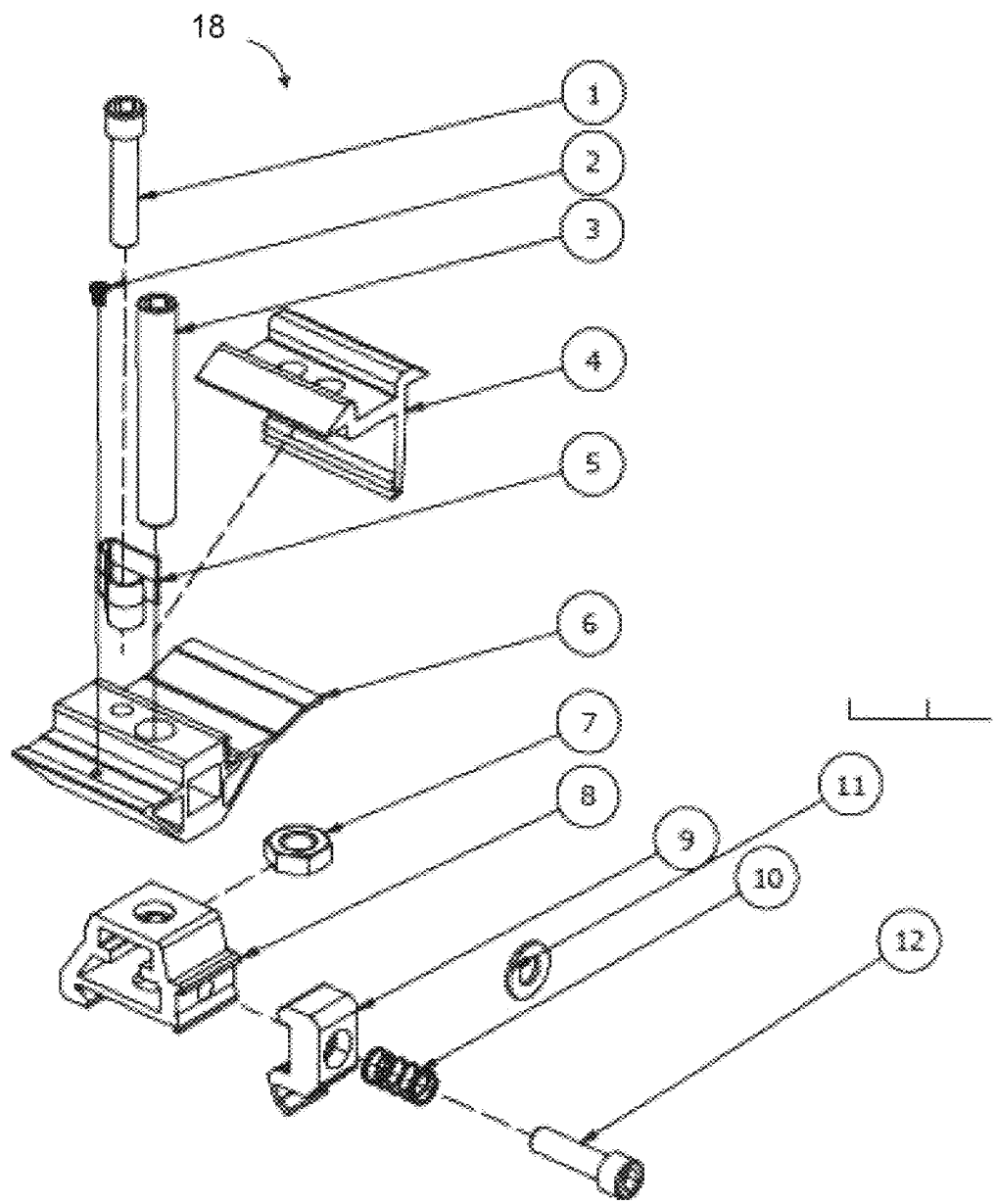
FIG. 3 shows an exploded isometric perspective view of a rail-less, indexable mounting assembly, according to an embodiment.

FIG. 3 shows an exploded isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of cap 4 against clamping bolt 1 and base 6. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface.

Figure 4:
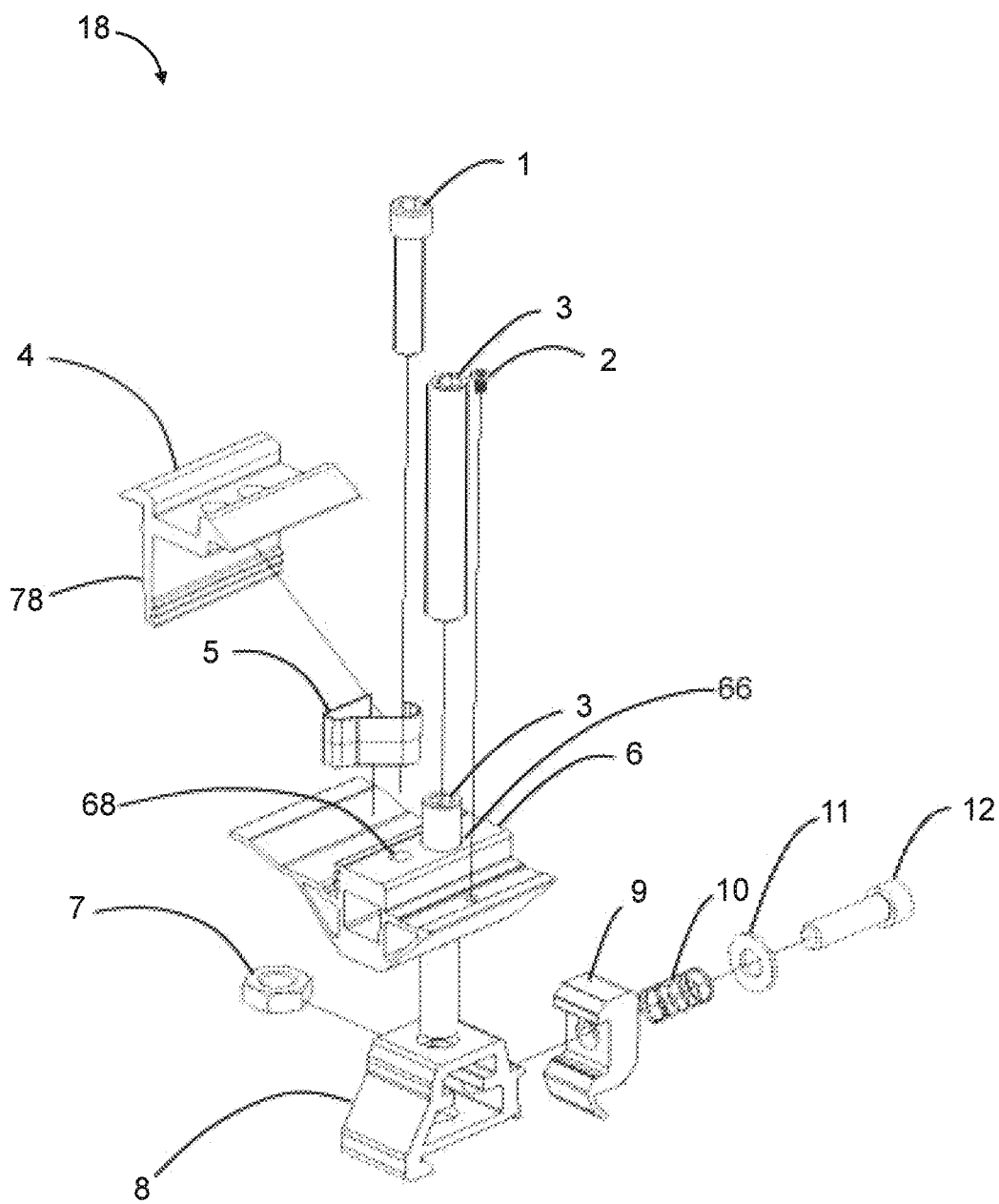
FIG. 4 shows an exploded isometric perspective view of a rail-less, indexable mounting assembly, according to an embodiment.

FIG. 4 shows an exploded isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of cap 4 against clamping bolt 1 and base 6. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface.

Figure 5:
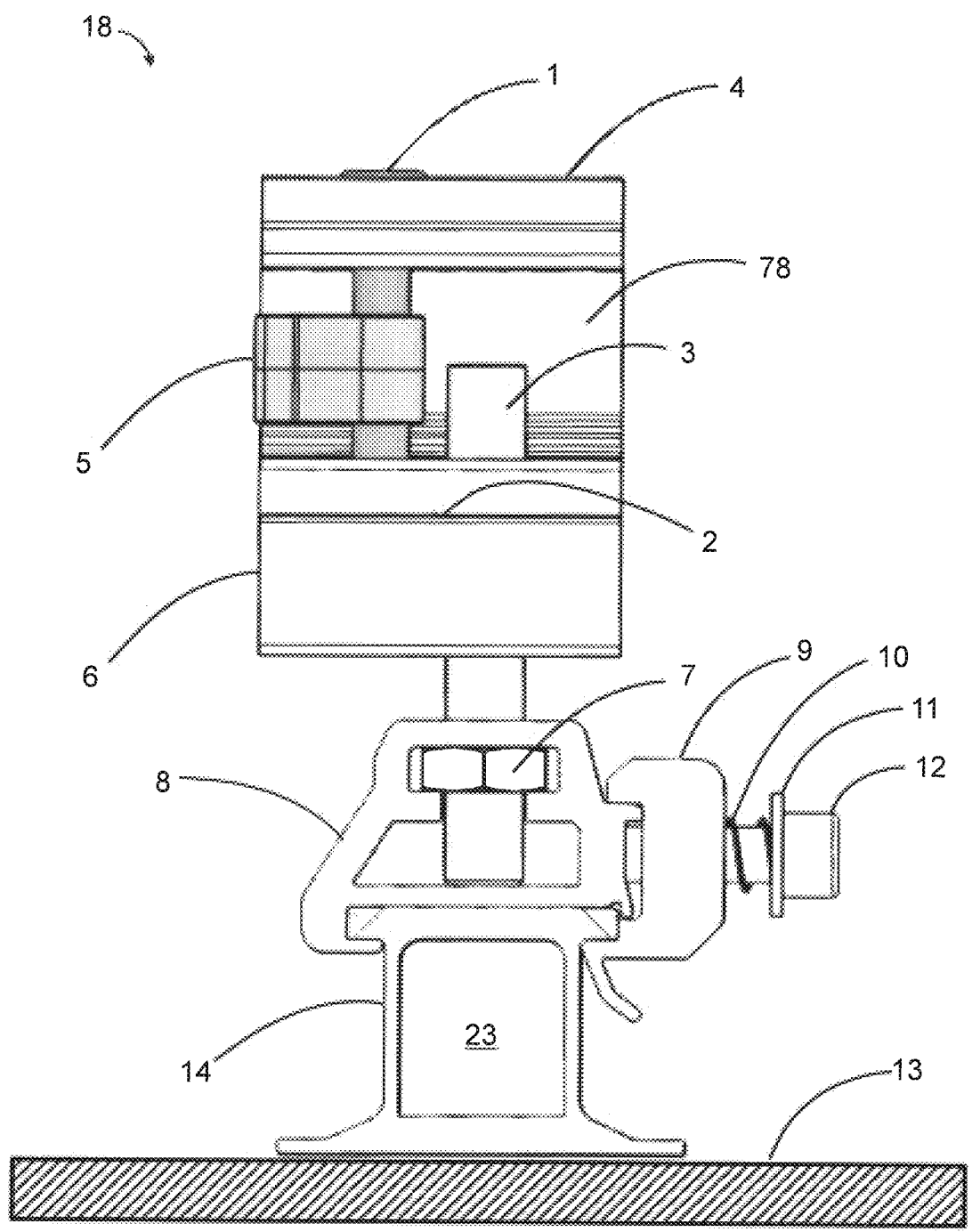
FIG. 5 shows an elevation front view of a rail-less, indexable mounting assembly, according to an embodiment.

FIG. 5 shows an elevation front view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of cap 4 against clamping bolt 1 and base 6. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface 13. Slider channel 14 may have a hollow interior volume 23. Tower bracket 8, with attached assembly 18, is free to slide North-South along the longitudinal length of slider 14 prior to tightening of horizontal attachment bolt 12.

Figure 6:
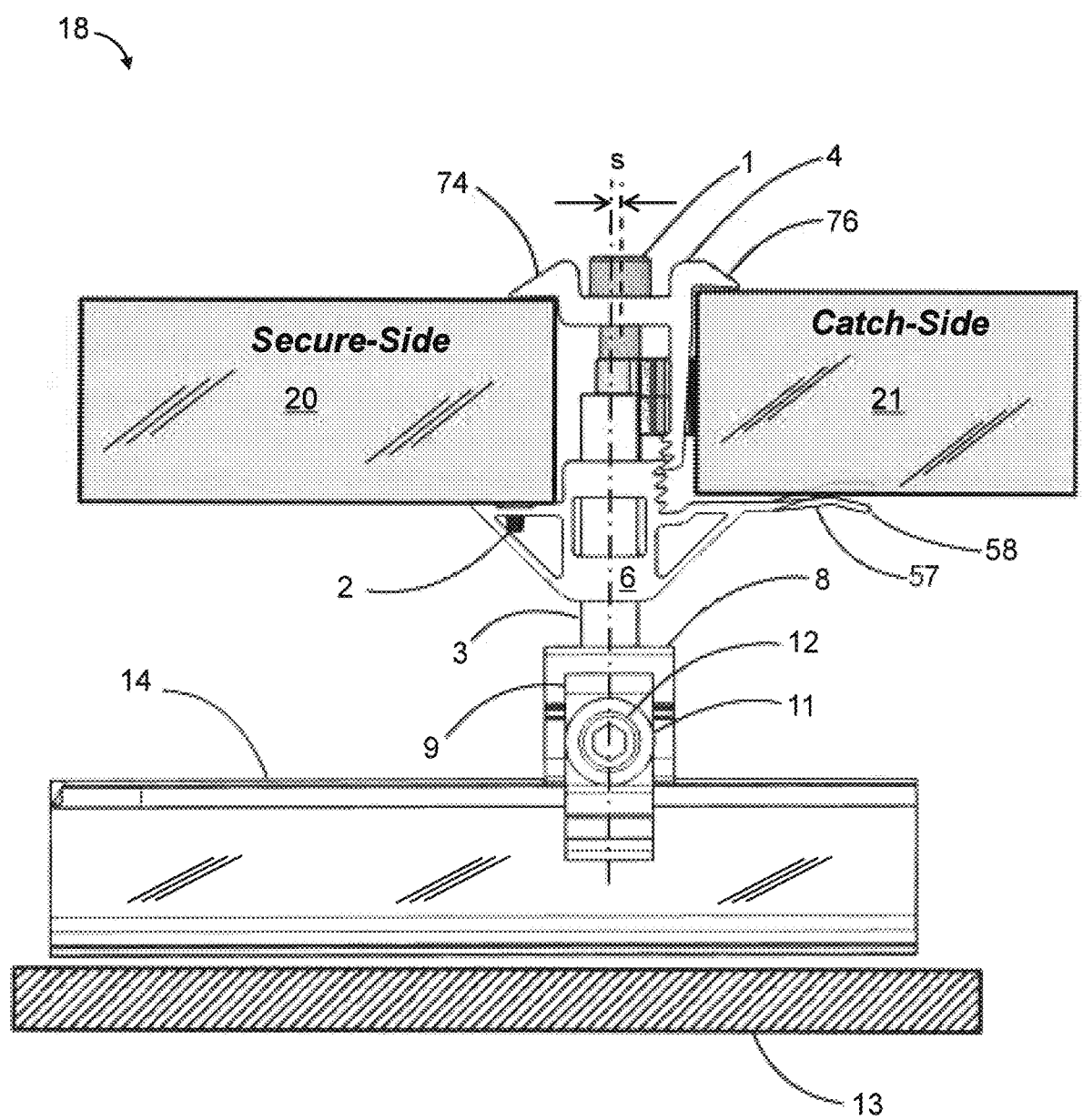
FIG. 6 shows an elevation side perspective view of a rail-less, indexable mounting assembly, according to an embodiment.

FIG. 6 shows an elevation side perspective view of a rail-less, indexable mounting assembly 18, according to an embodiment. Assembly 18 may include a clamping bolt 1 that clamps a pair of solar panels 20 and 21 in-between an indexable (adjustable) cap 4 and a base 6. Panel 20 is clamped on the "secure-side" of assembly 18, and panel 21 is clamped on the "catch-side" of assembly 18. Tilted spring support ledge 57 on the catch-side of assembly 18 deflects downwards when solar panel 21 is installed in the opening in-between cap 4 and base 6, which provides a restoring up force on panel 21 that forces panel 21 to make contact with the overhanging catch-side wing 76 of cap 4. Spring clip 5 clips onto clamping bolt 1 on one end, and clips onto vertical leg 78 (that protrudes downwardly from cap 4) on the other end, thereby maintaining a position of cap 4 against clamping bolt 1 and base 6. Base 6 includes a bonding pin 2 disposed in a horizontal groove. Pin 2 makes electrical contact with the anodized frame of solar panel 20 when clamped tight. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface 13. Tower bracket 8, with attached assembly 18, is free to slide North-South along the longitudinal length of slider 14 prior to tightening of horizontal attachment bolt 12.

Figure 7A:
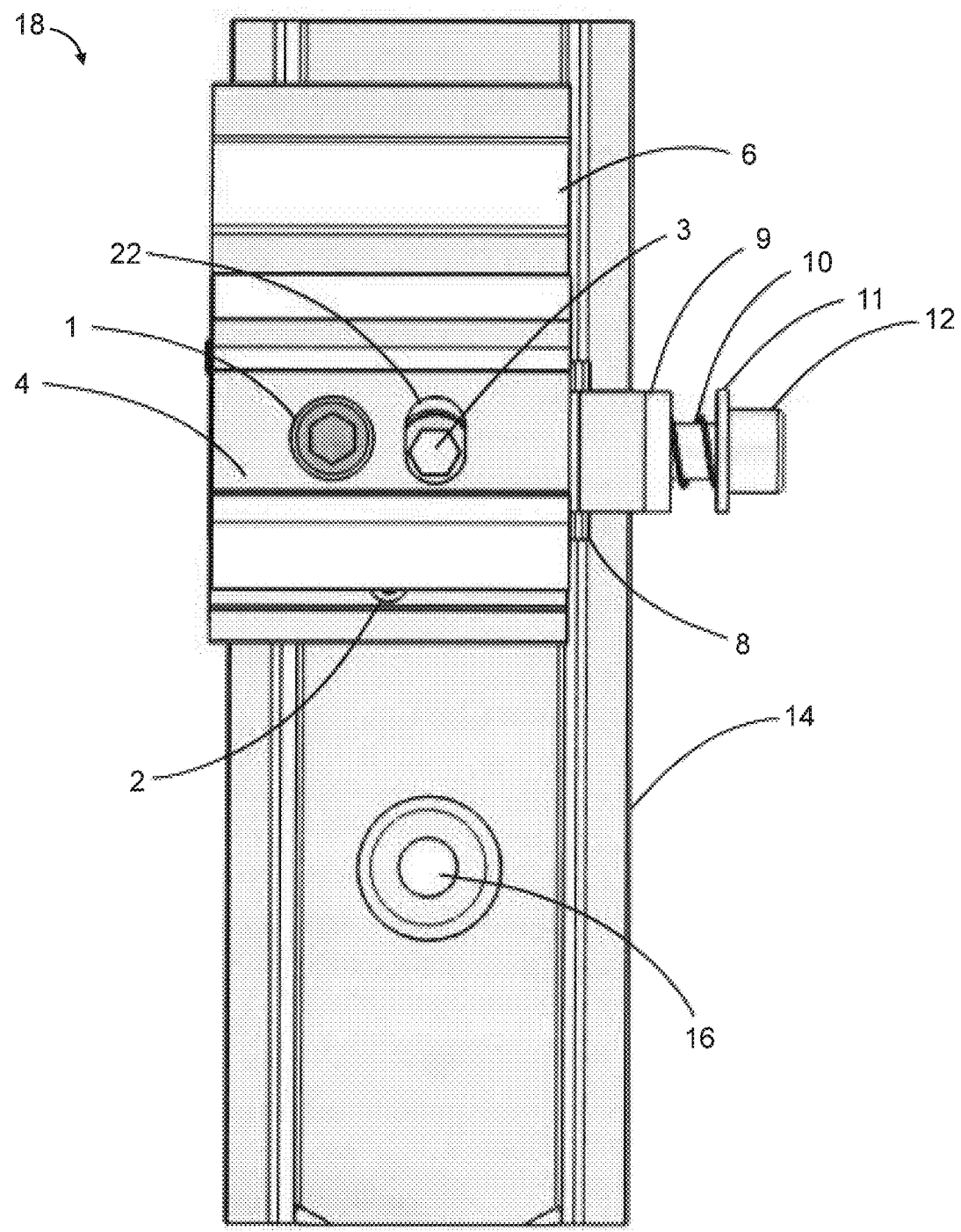
FIG. 7A shows a top perspective view of a rail-less, indexable mounting assembly, according to an embodiment.

FIG. 7A shows a top perspective view of a rail-less, indexable mounting assembly 18, according to an embodiment. Cap 4 includes a slot 22 for providing access for a tool to rotate height adjustment bolt 3 disposed underneath. Clamping bolt 1 may be seen, along with base 6, bonding pin 2, tower 8, dovetail clamp 9, spring 10, washer 11, horizontal attachment bolt 12, and aperture 16 in slider 14. Tower bracket 8, with attached assembly 18, is free to slide North-South along the longitudinal length of slider 14 prior to tightening of horizontal attachment bolt 12.

Figure 7B:
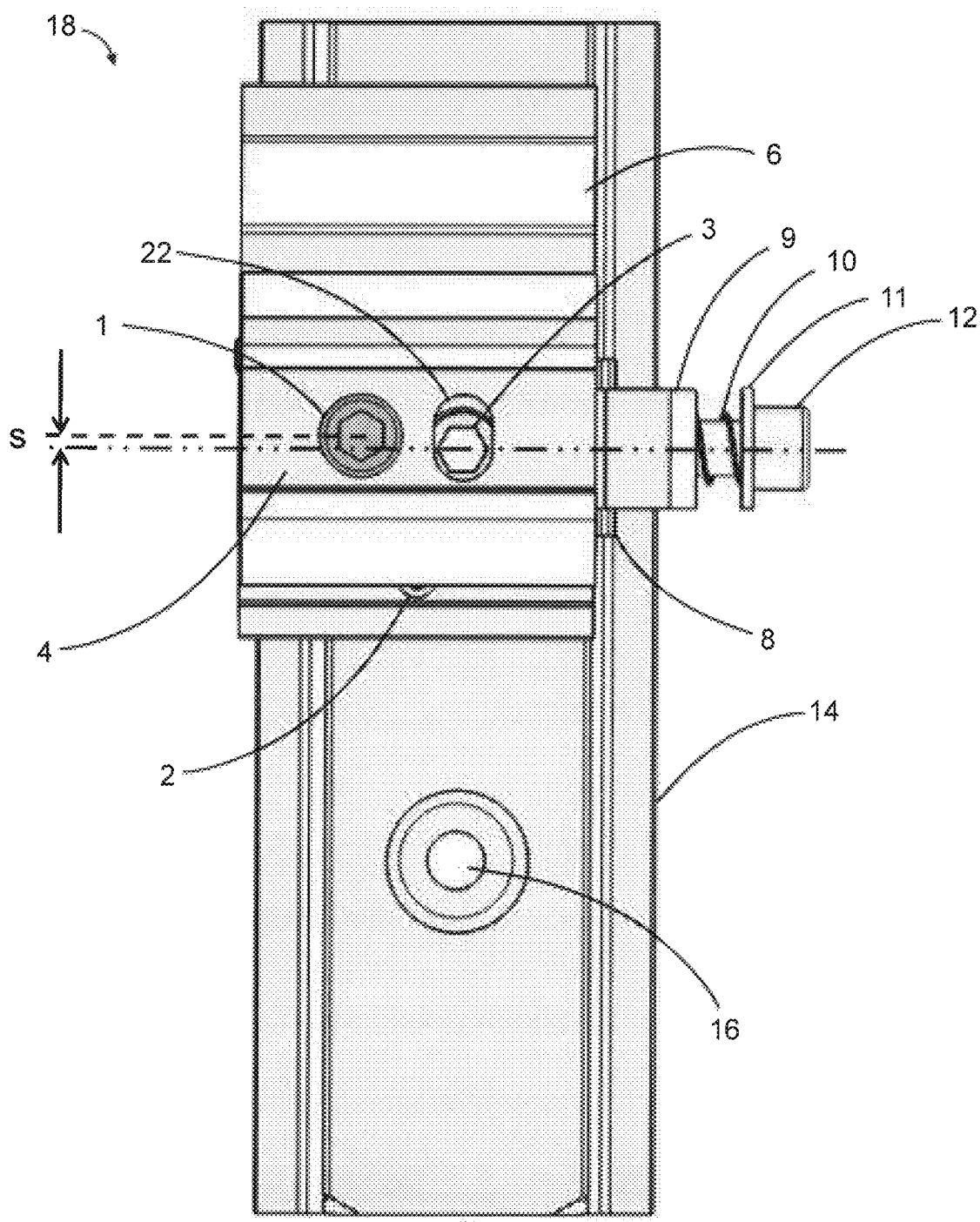
FIG. 7B shows a top perspective view of a rail-less, indexable mounting assembly, according to an embodiment.

FIG. 7B shows a top perspective view of a rail-less, indexable mounting assembly 18, according to an embodiment. In this view, the centerline of clamping bolt 1 is offset from the center line of height adjustment bolt 3 by a distance=s. The offset distance "s" may range from 1-5 mm, for example. It is to be noted that the centerline of height adjustment bolt 3 coincides with the centerline of horizontal attachment bolt 12. (See FIG. 6). The centerline of clamping bolt 1 is offset towards the catch-side of assembly 18.

Figure 8:
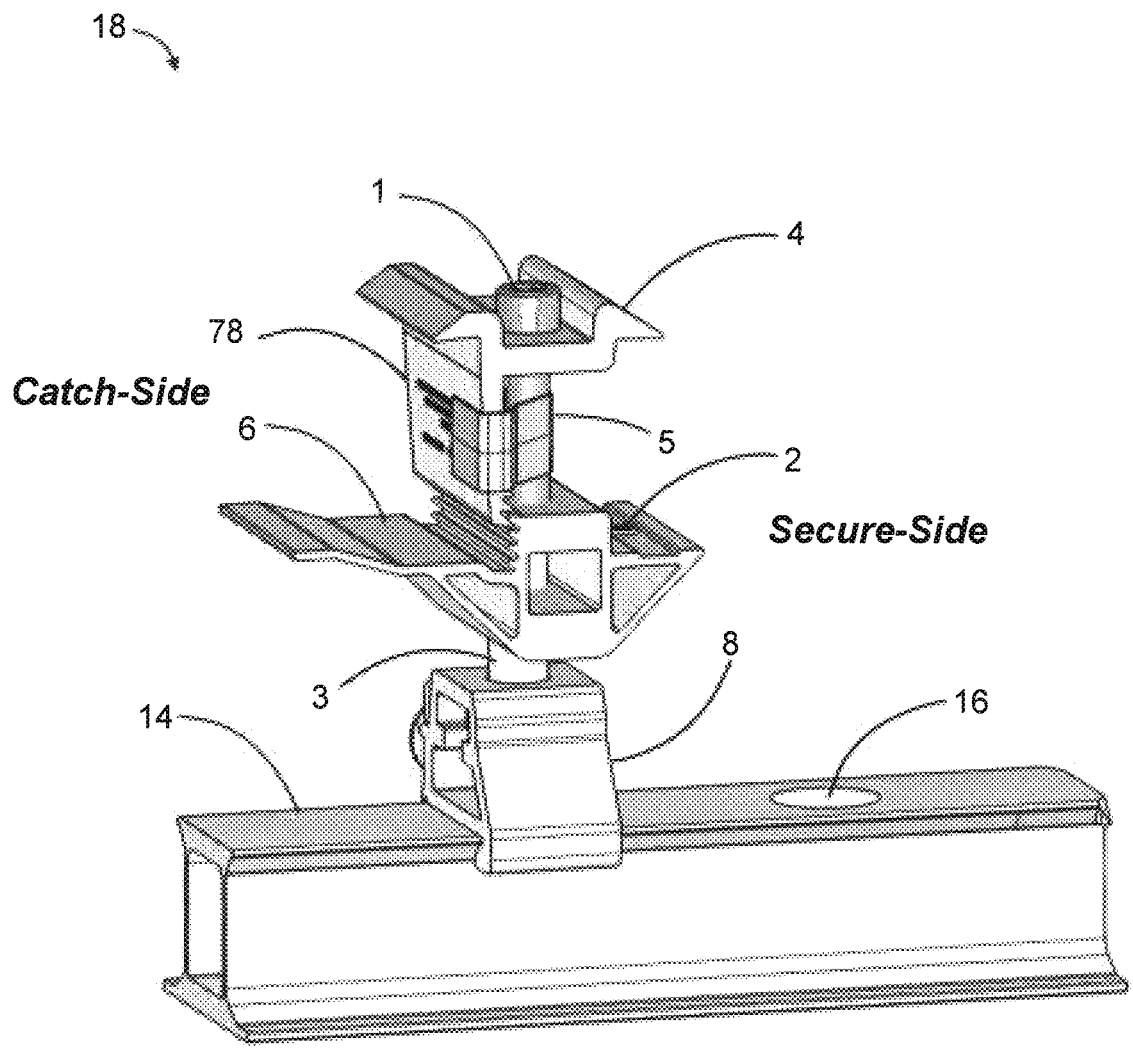
FIG. 8 shows an isometric perspective view of a rail-less, indexable mounting assembly, according to an embodiment.

FIG. 8 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of the cap 4 against clamping bolt 1 and the base 6. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. Slider 14 has an un-threaded aperture 16 that provides access to install a lag screw that attaches slider 14 to an underlying roof surface. Tower bracket 8, with attached assembly 18, is free to slide North-South along the longitudinal length of slider 14 prior to tightening of horizontal attachment bolt 12.

Figure 9:
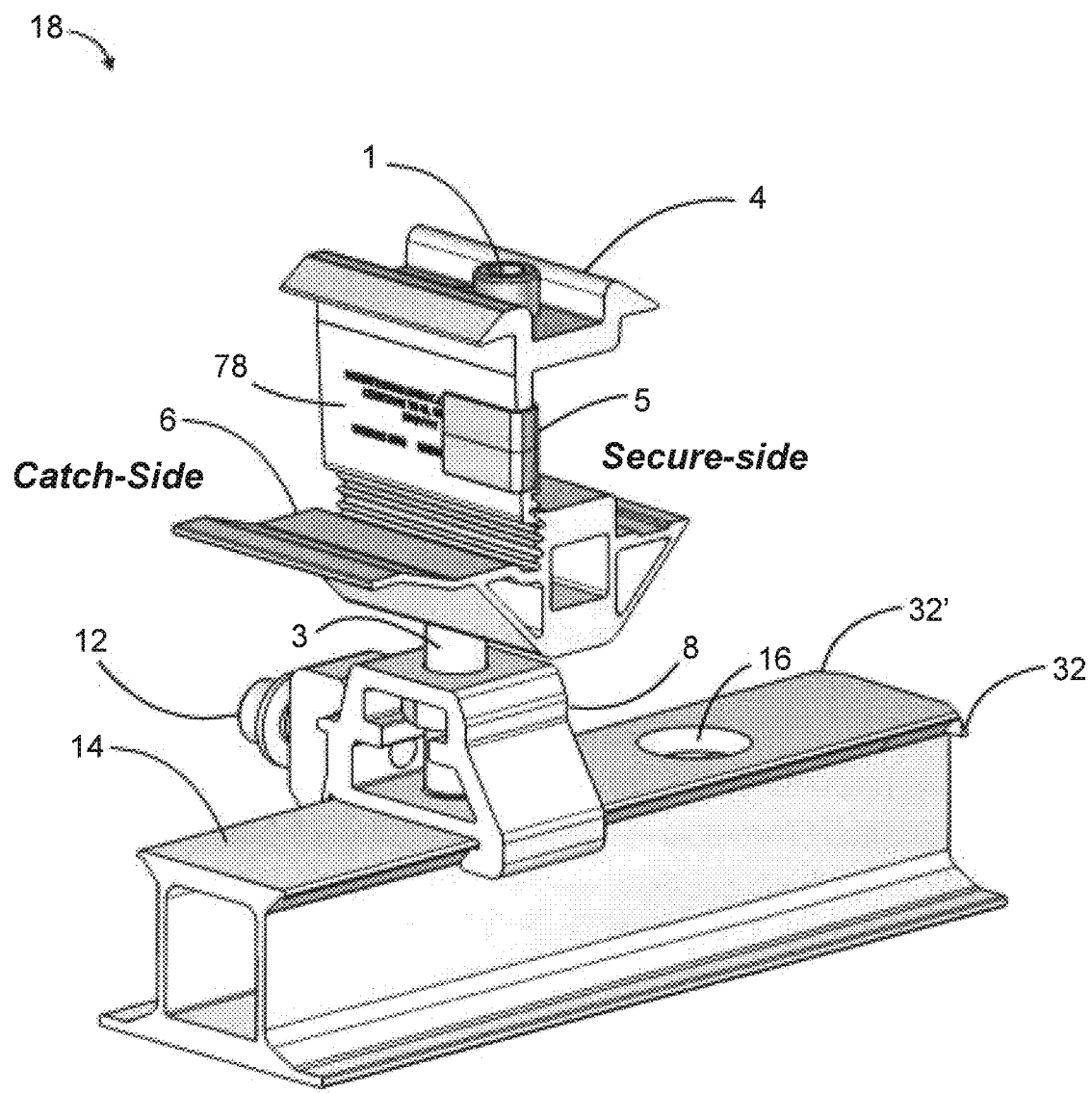
FIG. 9 shows an isometric perspective view of a rail-less, indexable mounting assembly, according to an embodiment.

FIG. 9 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of the cap 4 against the clamping bolt 1 and the base 6. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface. At one distal end of slider 14, flanges are peened (turned) down to make stops 32, 32', which prevent assembly 18 from sliding off one end of slider 14 when slider 14 is angled at a steep North-South angle to the horizontal (e.g., if installed on a steep roof). Tower bracket 8, with attached assembly 18, is free to slide North-South along the longitudinal length of slider 14 prior to tightening of horizontal attachment bolt 12.

Figure 10:
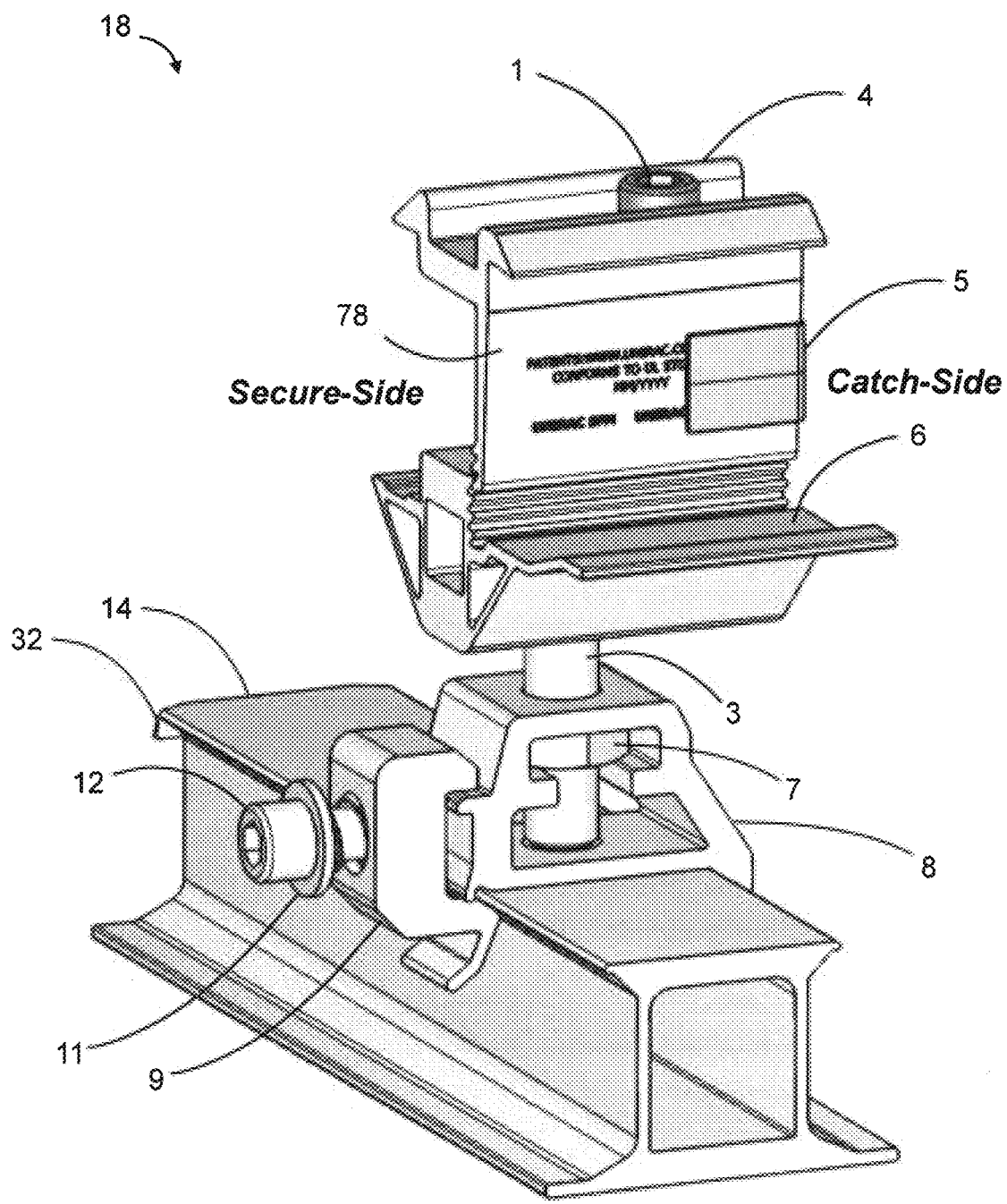
FIG. 10 shows an isometric perspective view of a rail-less, indexable mounting assembly, according to an embodiment.

FIG. 10 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of the cap 4 against the clamping bolt 1 and the base 6. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when tightened. Slider 14 has an un-threaded aperture 16 that provides access to install a lag screw that attaches slider 14 to an underlying roof surface. At one distal end of slider 14, flanges are peened (turned) down to make stops 32, 32', which prevent assembly 18 from sliding off one end of slider 14 when slider 14 is angled at a steep North-South angle to the horizontal (e.g., if installed on a steep roof). Tower bracket 8, with attached assembly 18, is free to slide North-South along the longitudinal length of slider 14 prior to tightening of horizontal attachment bolt 12.

Figure 11:
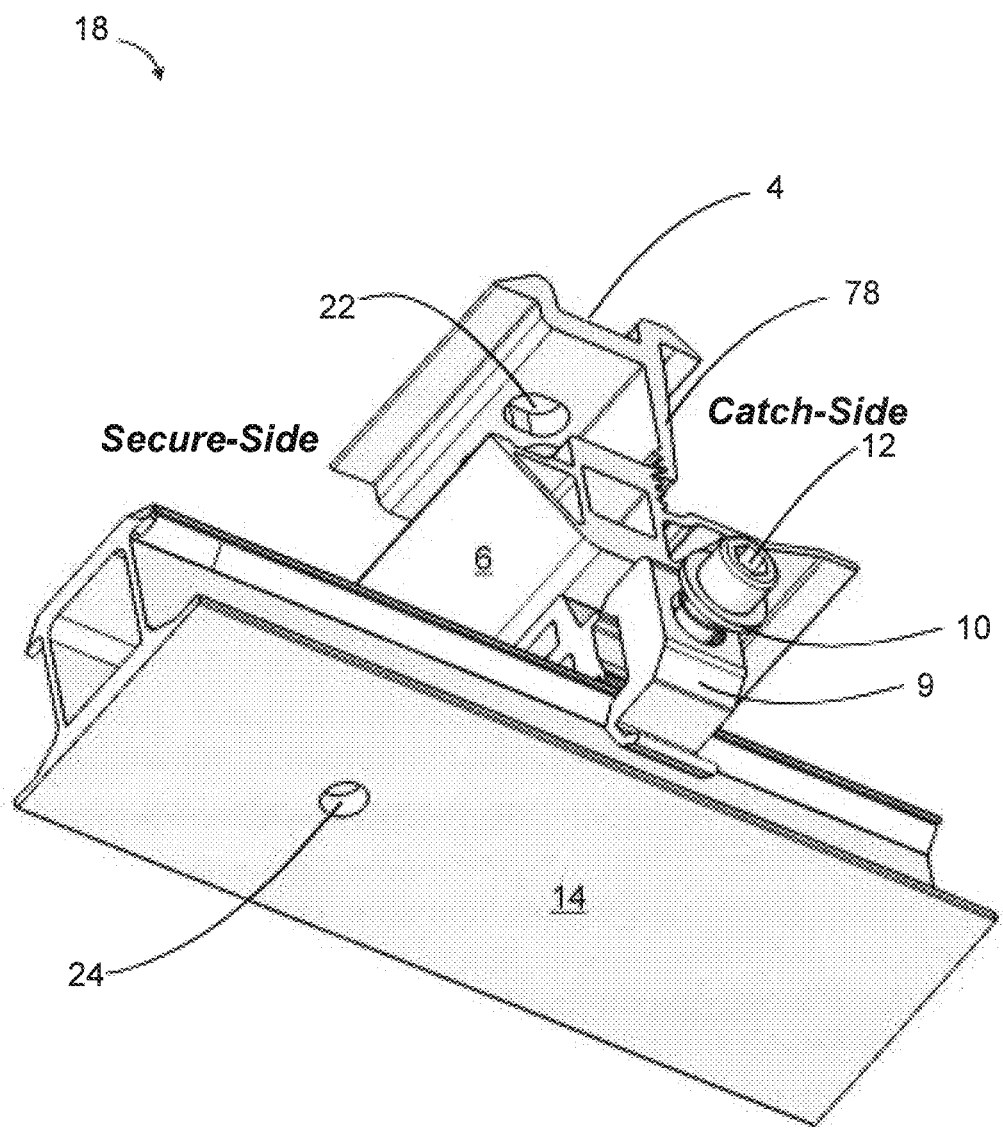
FIG. 11 shows an isometric perspective view of a rail-less, indexable mounting assembly, according to an embodiment.

FIG. 11 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Slot aperture 22 in cap 4 may be seen. Spring clip 5 clips onto clamping bolt 1 on one end, and clips onto vertical leg 78 (that protrudes downwardly from cap 4) on the other end, thereby maintaining a position of the cap 4 against the clamping bolt 1 and the base 6. Base 6 includes a bonding pin 2 disposed in a horizontal groove. Height adjustment bolt 3 engages threaded aperture 66 in base 6. Clamping bolt 1 engages threaded aperture 68 in base 6. Dovetail clamp 9, spring 10, washer 11, and horizontal attachment bolt 12 clamps tower 8 to slider channel 14 when tightened. Slider 14 has an un-threaded aperture 24 that is located on the bottom surface of slider 14 that provides access to install a lag screw that attaches slider 14 to an underlying roof surface. Tower bracket 8, with attached assembly 18, is free to slide North-South along the longitudinal length of slider 14 prior to tightening of horizontal attachment bolt 12.

Figure 12:
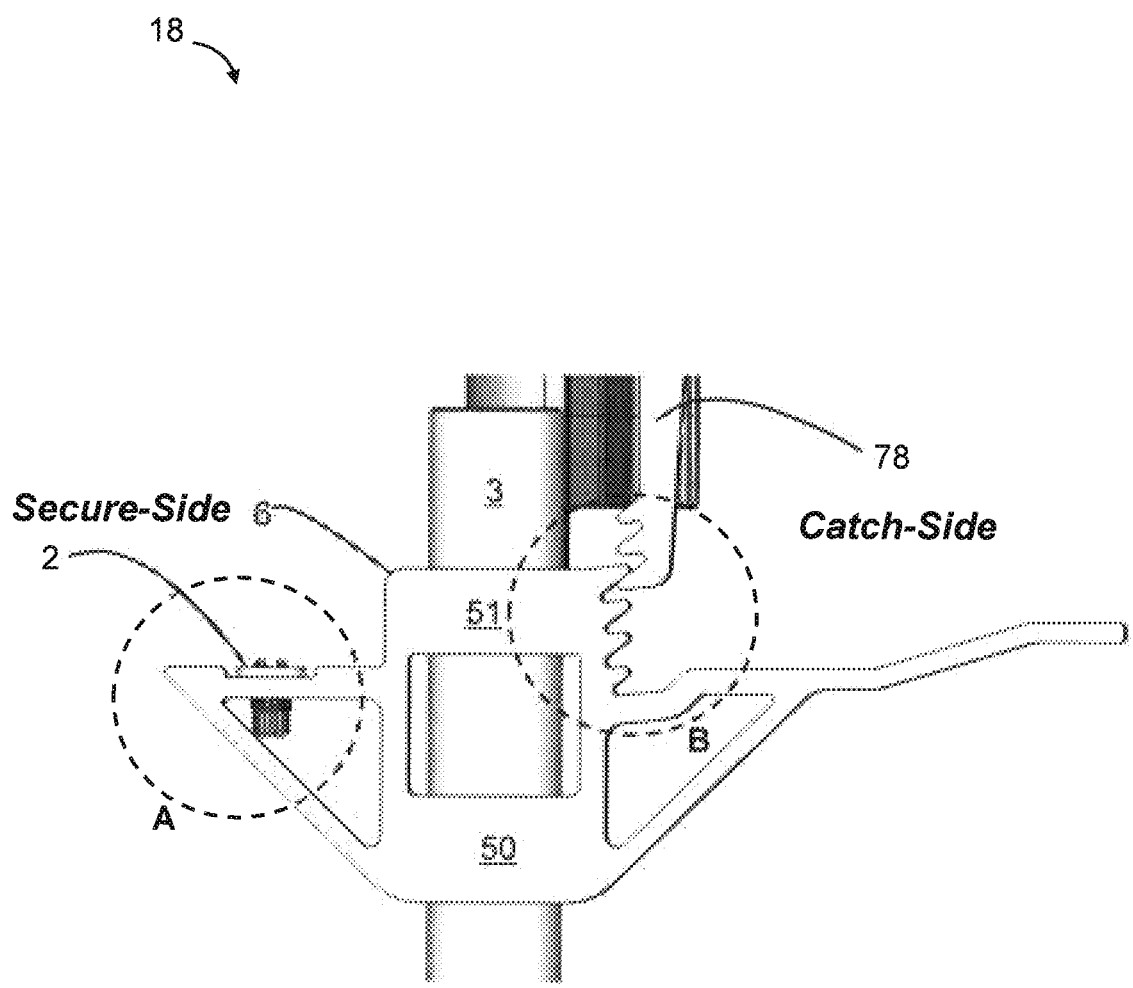
FIG. 12 shows an elevation side view of a rail-less, indexable mounting assembly, according to an embodiment.

FIG. 12 shows an elevation side view of a rail-less, indexable mounting assembly 18, according to an embodiment. See FIG. 13 for Detail "A", and FIG. 15 for Detail "B". Base 6 may include an upper horizontal bridge portion 51, that's connected to a lower horizontal bridge portion 50.

Figure 13:
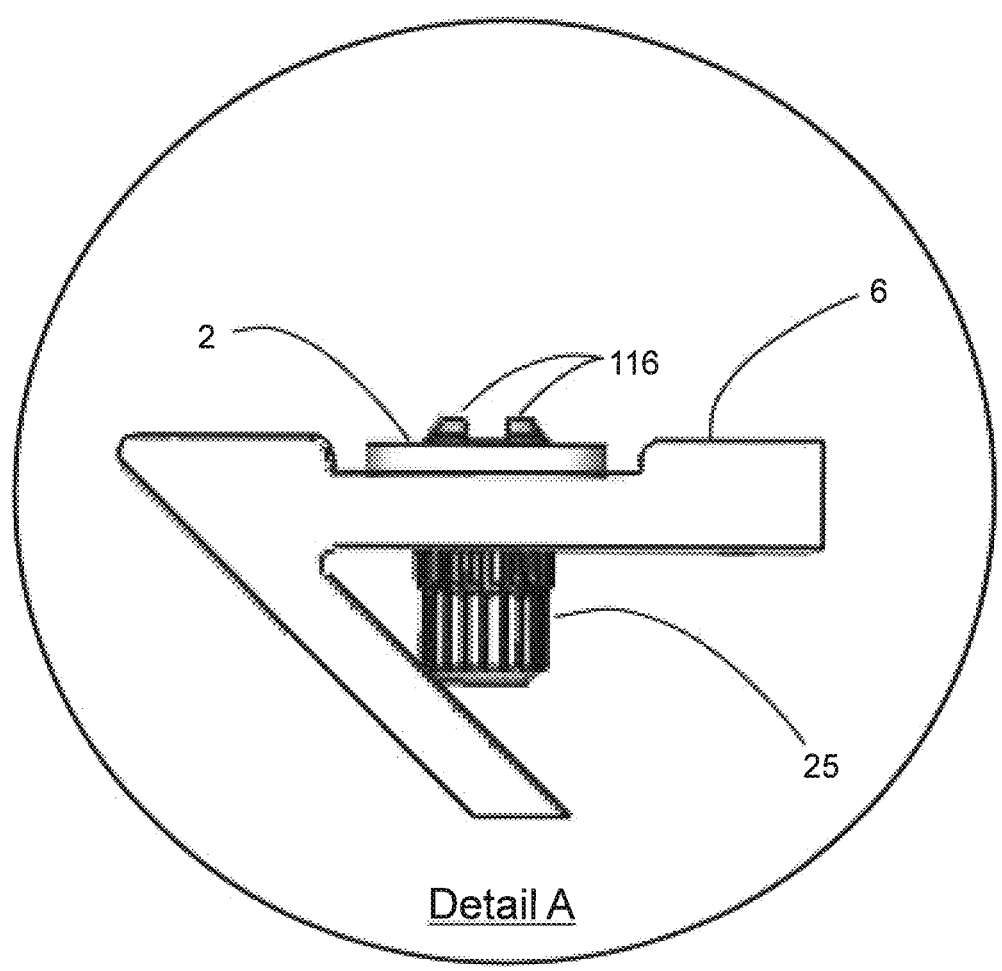
FIG. 13 shows a detailed elevation side view of a bonding pin assembly, according to an embodiment.

FIG. 13 shows a detailed elevation side view of a bonding pin assembly 2, according to an embodiment. Bonding pin 2 is disposed through a hole in base 6. Pin 2 may include a plurality of vertical knurlings (grooves) 25 disposed around an outer circumference of pin 2. Pin 2 may include a plurality of sharp points 116, that penetrate the thin, anodized coating of an aluminum frame of a solar panel.

Figure 14:
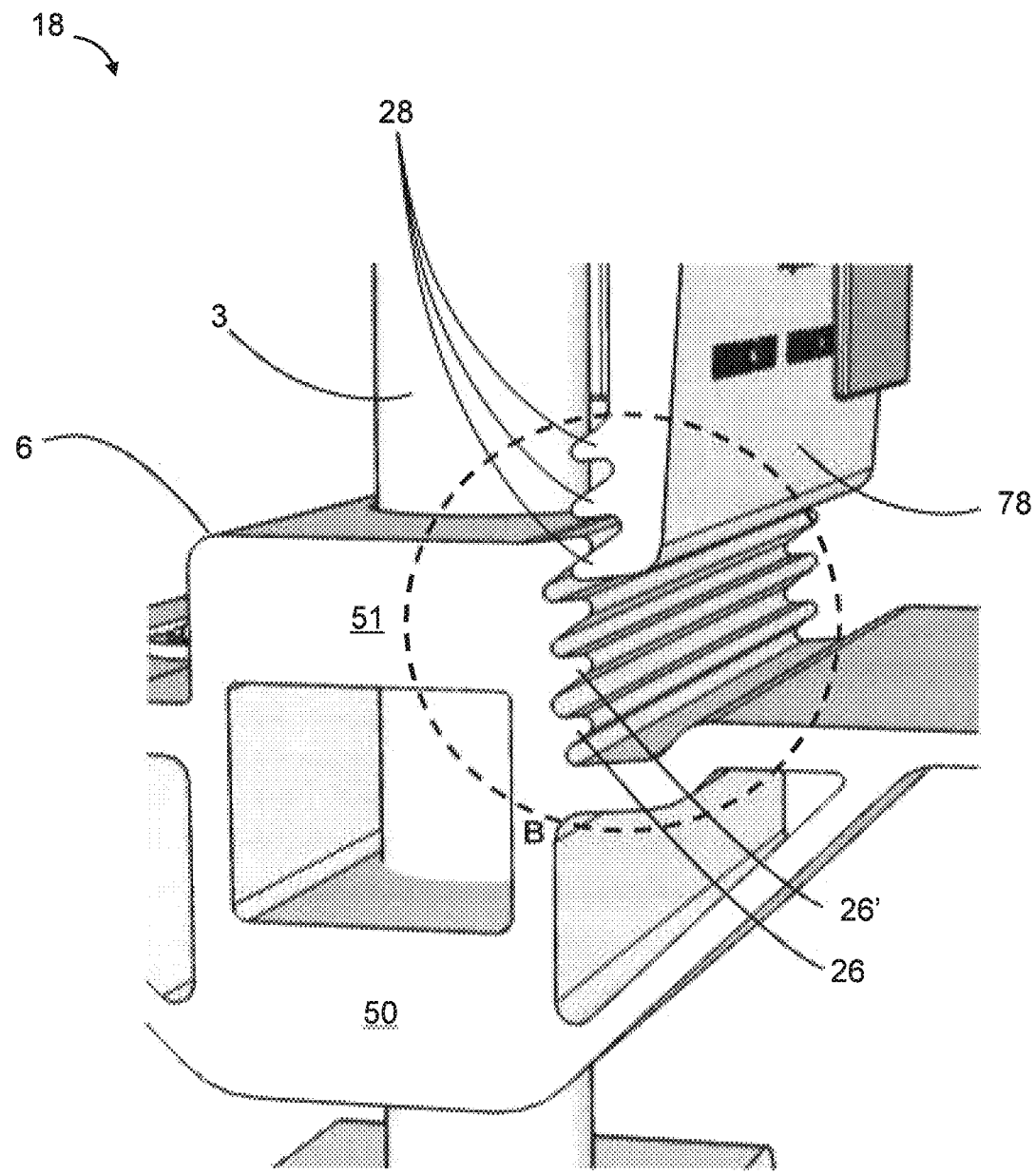
FIG. 14 shows an isometric perspective view of a rail-less, indexable mounting assembly, according to an embodiment.

FIG. 14 shows an isometric perspective view of a rail-less, indexable mounting assembly 18, according to an embodiment. Base 6 may include an upper horizontal portion 51, which has a plurality of horizontal, parallel, protruding corrugations (teeth) 26 that face outwardly from the center of assembly 18 (as defined by the centerline of height adjustment bolt 3). Cap 4 may include a downwardly protruding vertical leg 78, which has a plurality of horizontal, parallel, protruding corrugations (teeth) 28 that face inwardly towards the center of assembly 18 (as defined by the centerline of height adjustment bolt 3). Selected teeth 28 of vertical leg 78 engage with selected teeth 26 of base 6, depending on the particular solar panel frame thickness that is defined by the distance in-between cap 4 and base 6. The height of cap 4 over base 6 (i.e., panel thickness, H) is easily adjusted by disengaging one set of teeth pairs (e.g., 26+28), and re-engaging a different pair of teeth (e.g., 26'+28) on the lower rack 51 of teeth.

Figure 15:
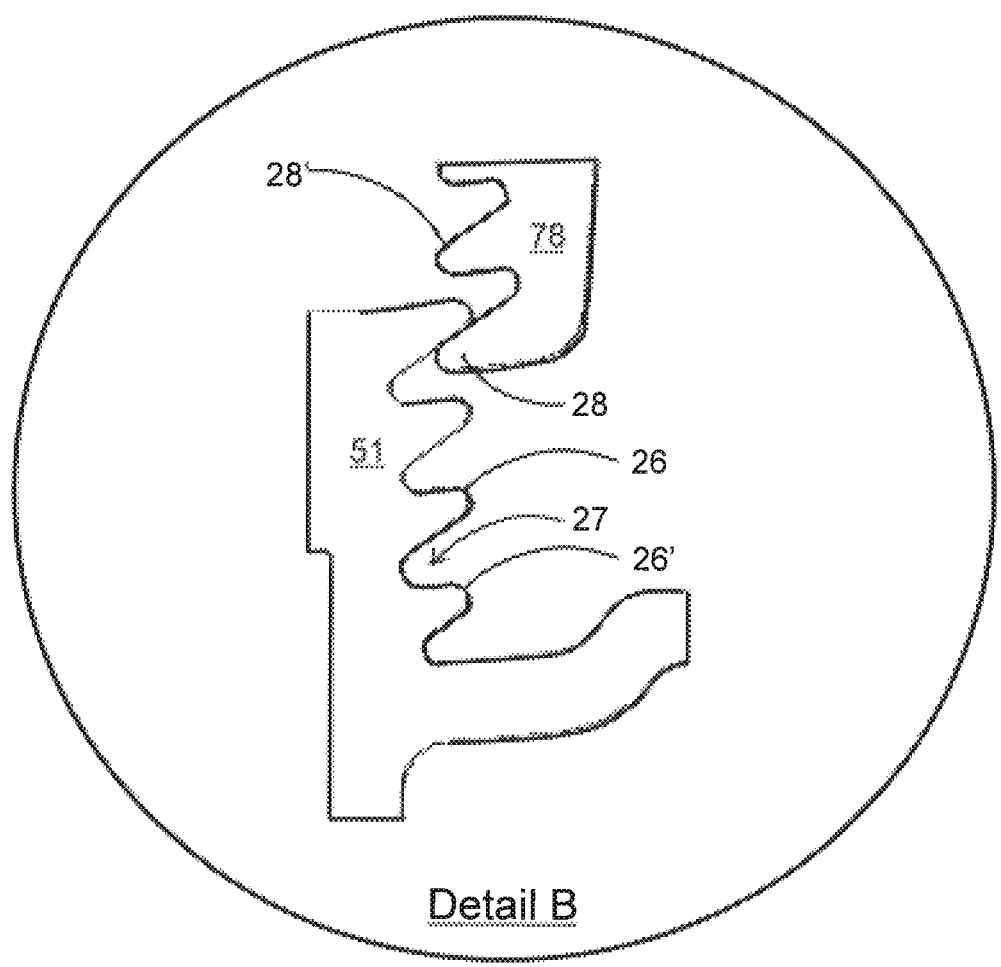
FIG. 15 shows a detailed elevation side view of a rail-less, indexable mounting assembly, according to an embodiment.

FIG. 15 shows a detailed elevation side view of a rail-less, indexable mounting assembly 18, according to an embodiment. Base 6 may include an upper horizontal portion 51, which includes a plurality of protruding corrugations (teeth) 26 that face outwardly from the center of assembly 18 (as defined by the centerline of height adjustment bolt 3). Cap 4 may include a downwardly protruding vertical leg 78, which has a plurality of protruding corrugations (teeth) 28 that face inwardly towards the center of assembly 18 (as defined by the centerline of height adjustment bolt 3). Selected teeth 28 of vertical leg 78 engage with selected teeth 26 of base 6, depending on the particular solar panel frame thickness that is defined by the distance in-between cap 4 and base 6. Lower groove 27 is disposed in-between adjacent pair of teeth 26, 26'. The height of cap 4 over base 6 (i.e., panel thickness, H) is easily adjusted by disengaging one set of teeth pairs (e.g., 26+28), and re-engaging a different pair of teeth (e.g., 26'+28) on the lower rack 51 of teeth.

Figure 16:
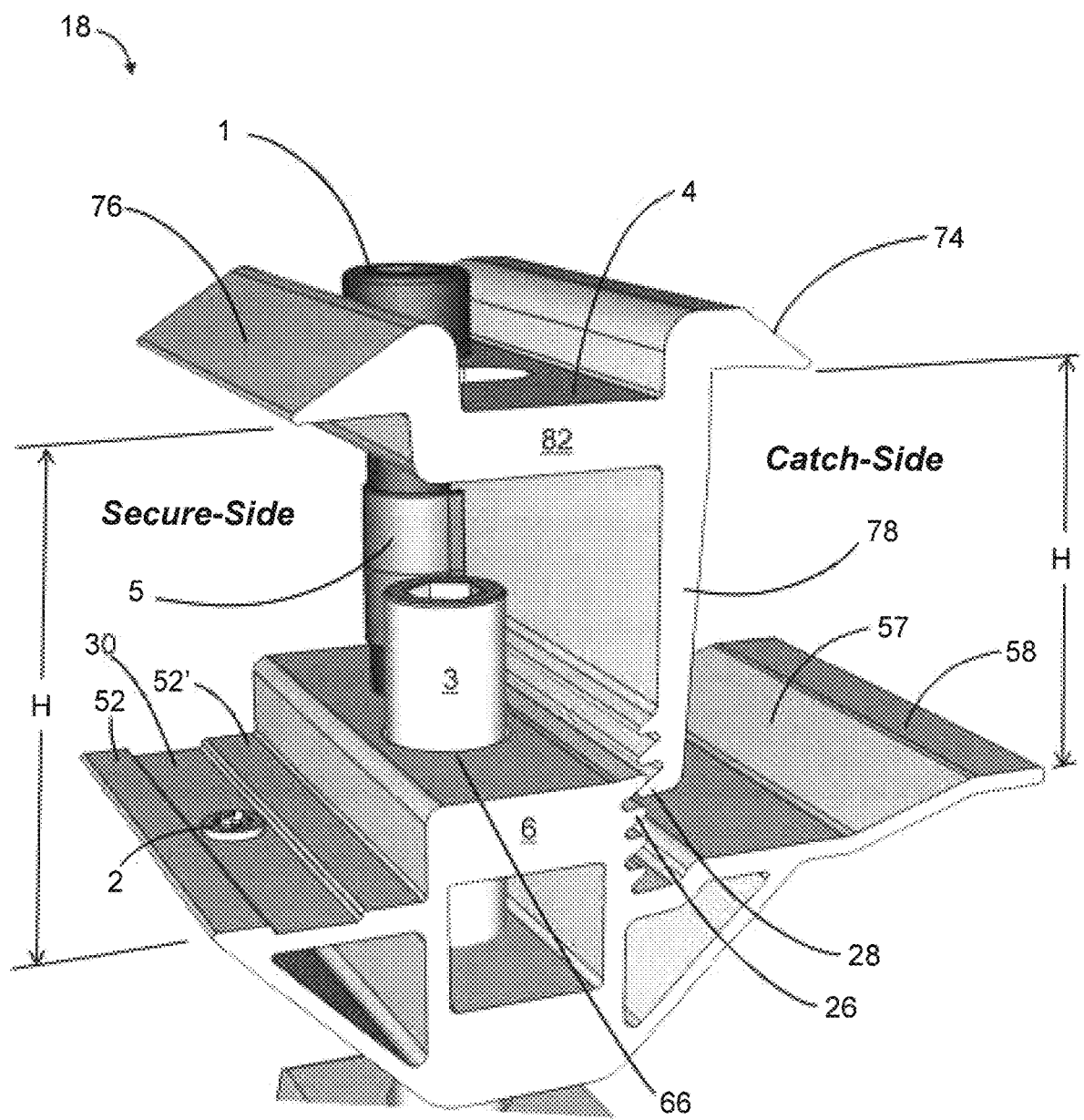
FIG. 16 shows an isometric perspective view of a rail-less, indexable mounting assembly, according to an embodiment.

FIG. 16 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of the cap 4 against the clamping bolt 1 by pulling teeth 28 and 26 together. Base 6 includes a bonding pin 2 disposed in a horizontal groove 30. Height adjustment bolt 3 engages threaded aperture 66 in base 6. Clamping bolt 1 engages threaded aperture 68 in base 6. Rotation of bolt 3 causes base 6 and clamped cap 4 to move up or down. Teeth 28 of support leg 78 of cap 4 engages with teeth 26 of base 6, to define the distance, H, in-between clamping wings 76, 74 of cap 4 and supporting surfaces 52, 52' and 58, respectively of base 6.

Figure 17:
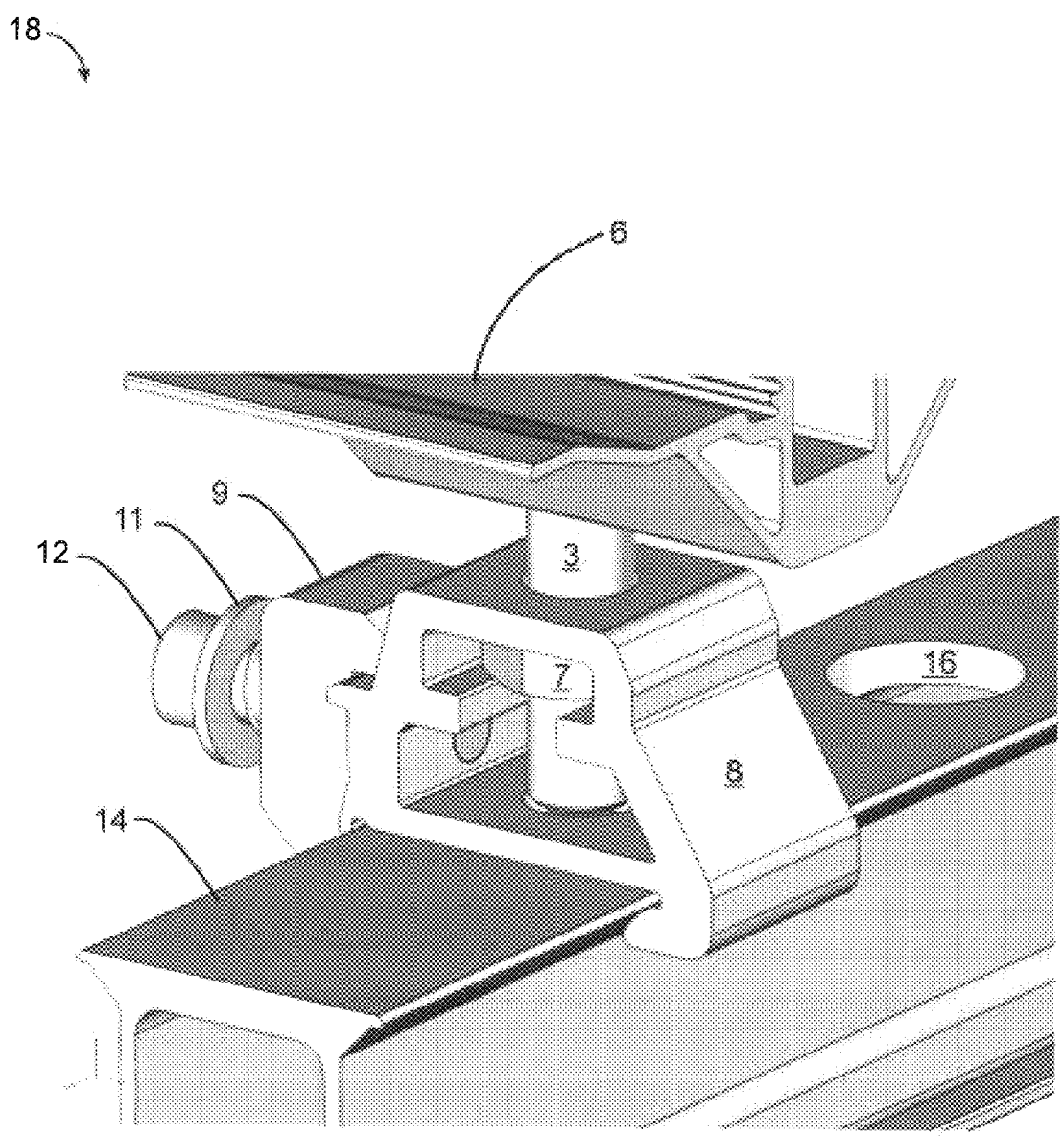
FIG. 17 shows an isometric perspective view of a rail-less, indexable mounting assembly, according to an embodiment.

FIG. 17 shows an isometric perspective view of a rail-less, indexable mounting assembly 18, according to an embodiment. Rotation of bolt 3 about its longitudinal axis causes base 6 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Slider 14 has an un-threaded aperture 16 that provides access to install a lag screw that attaches slider 14 to an underlying roof surface. Tower bracket 8, with attached assembly 18 (cap 4 and base is not shown for clarity), is free to slide North-South along the longitudinal length of slider 14 prior to tightening of horizontal attachment bolt 12.

Figure 18:
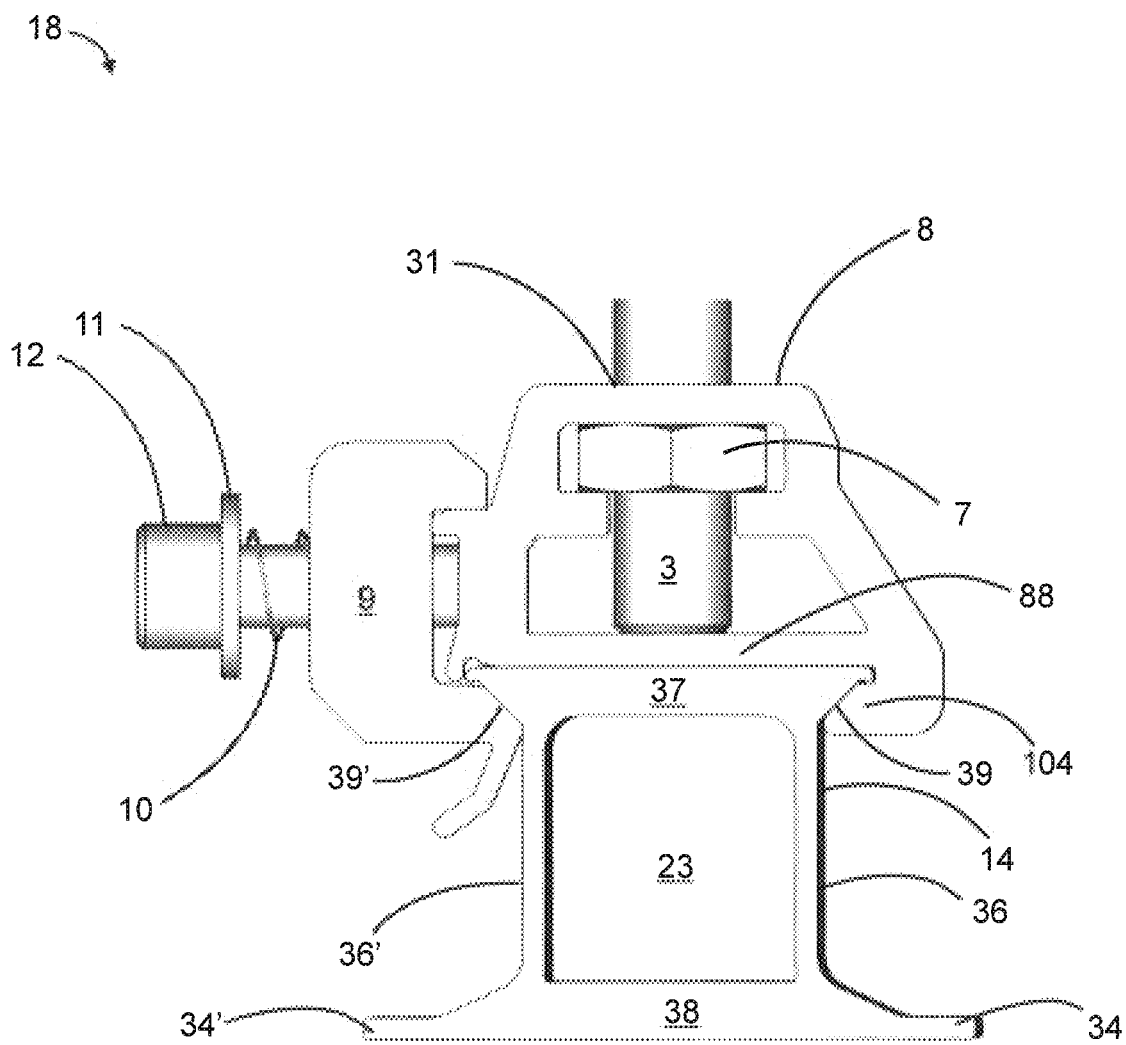
FIG. 18 shows an elevation side view of a rail-less, indexable mounting assembly, according to an embodiment.

FIG. 18 shows an elevation side view of a rail-less, indexable mounting assembly 18, according to an embodiment. Rotation of bolt 3 about its longitudinal axis causes base 6 to move up or down. The lower end of height adjustment bolt 3 is held by an un-threaded aperture 31 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Slider 14 includes a pair of sidewalls 36, 36' that are integrally joined to upper horizontal bridge portion 37 (which forms the top of slider 14), and to lower horizontal bridge portion 38 (which forms the base of slider 14). Slider 14 further includes a pair of outwardly-extending, longitudinal base flanges 34, 34', which stabilizes slider 14 against wind loads acting on assembly 18. The bottom horizontal bridge portion 88 of tower 8 is clamped down onto the upper horizontal portion 37 of slider 14 when horizontal attachment bolt 12 is tightened, because: (a) dovetail clamp 9 provides an upwards force on angled ramp 39' of upper portion 37, and/or simultaneously (b) inwardly-facing hook 104 of tower 8 provides an upwards force on angled ramp 39 on upper portion 37. Optionally, the bottom end of height adjustment bolt 3 may be disposed inside of an un-threaded aperture (not shown) in the bottom horizontal bridge portion 88 of tower 8. Tower bracket 8, with attached assembly 18 (cap 4 and base is not shown for clarity), is free to slide North-South along the longitudinal length of slider 14 prior to tightening of horizontal attachment bolt 12.

Figure 19:
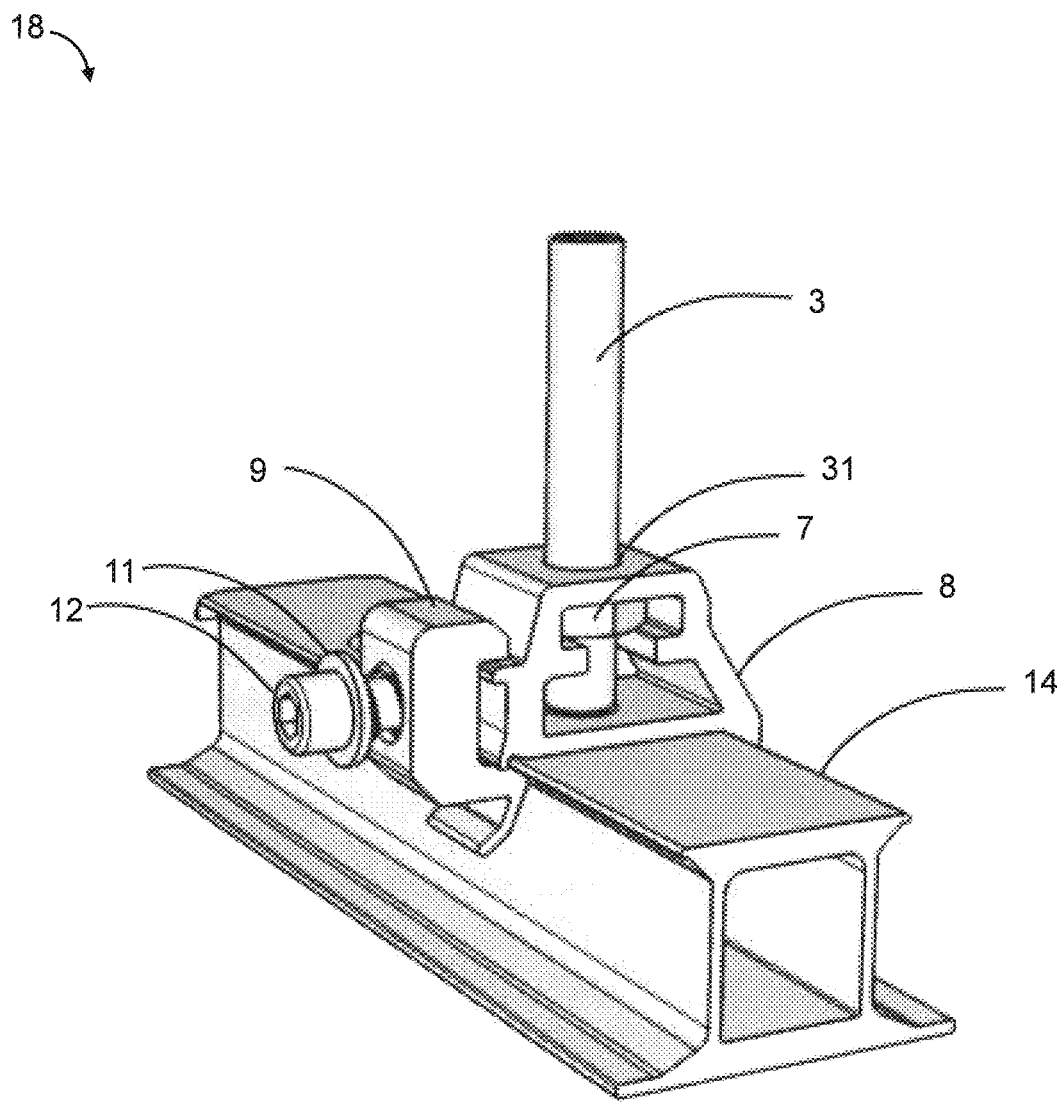
FIG. 19 shows an isometric perspective view of a rail-less, indexable mounting assembly, according to an embodiment.

FIG. 19 shows an isometric perspective view of a rail-less, indexable mounting assembly 18, according to an embodiment. Rotation of bolt 3 about its longitudinal axis causes base 6 to move up or down. The lower end of height adjustment bolt 3 is held by an un-threaded aperture 31 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Tower bracket 8, with attached assembly 18 (cap 4 and base is not shown for clarity), is free to slide North-South along the longitudinal length of slider 14 prior to tightening of horizontal attachment bolt 12.

Figure 20:
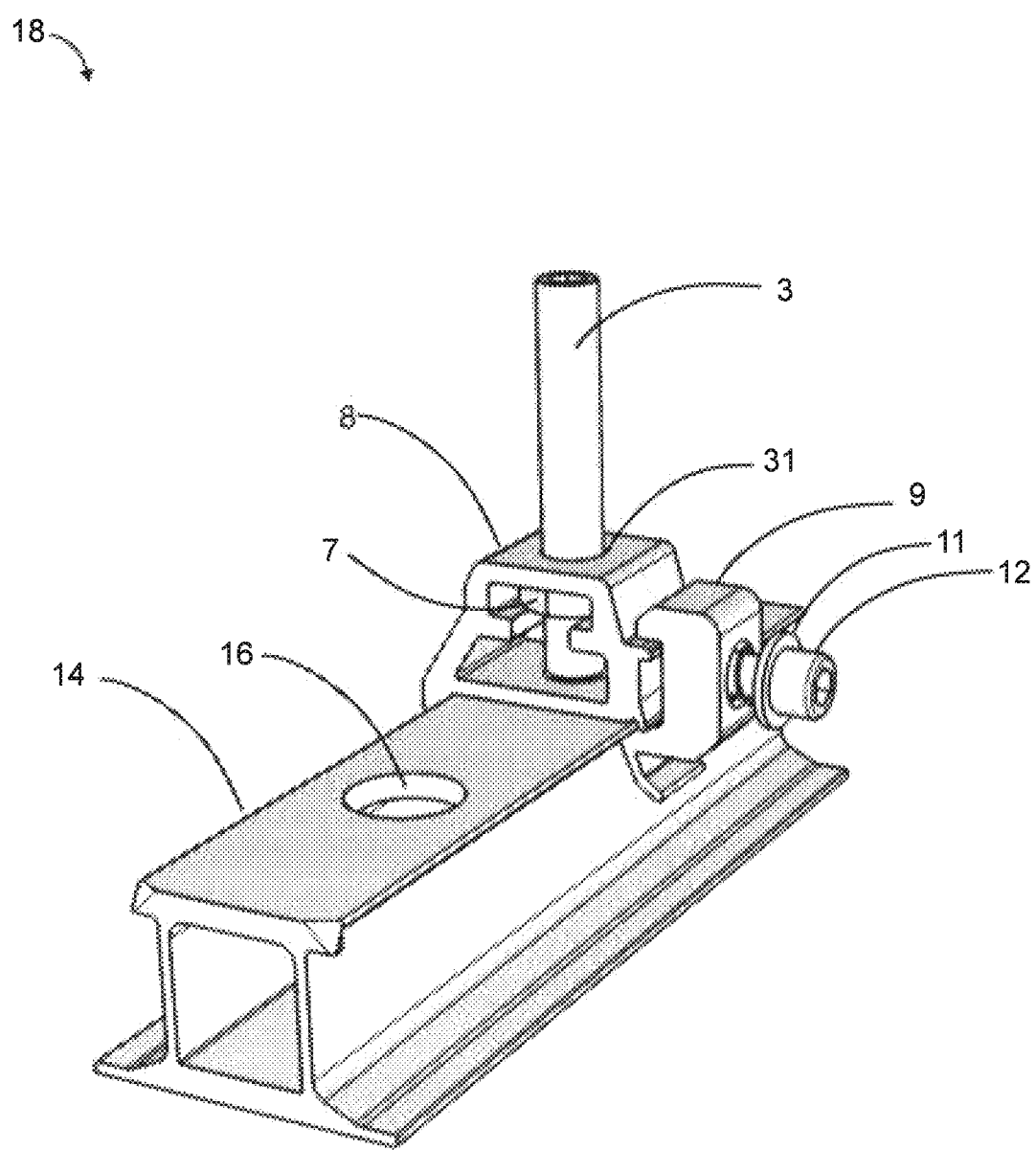
FIG. 20 shows an isometric perspective view of a rail-less, indexable mounting assembly, according to an embodiment.

FIG. 20 shows an isometric perspective view of a rail-less, indexable mounting assembly 18, according to an embodiment. Rotation of bolt 3 about its longitudinal axis causes base 6 to move up or down. The lower end of height adjustment bolt 3 is held by an un-threaded aperture 31 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Tower bracket 8, with attached assembly 18 (cap 4 and base is not shown for clarity), is free to slide North-South along the longitudinal length of slider 14 prior to tightening of horizontal attachment bolt 12.

Figure 21:
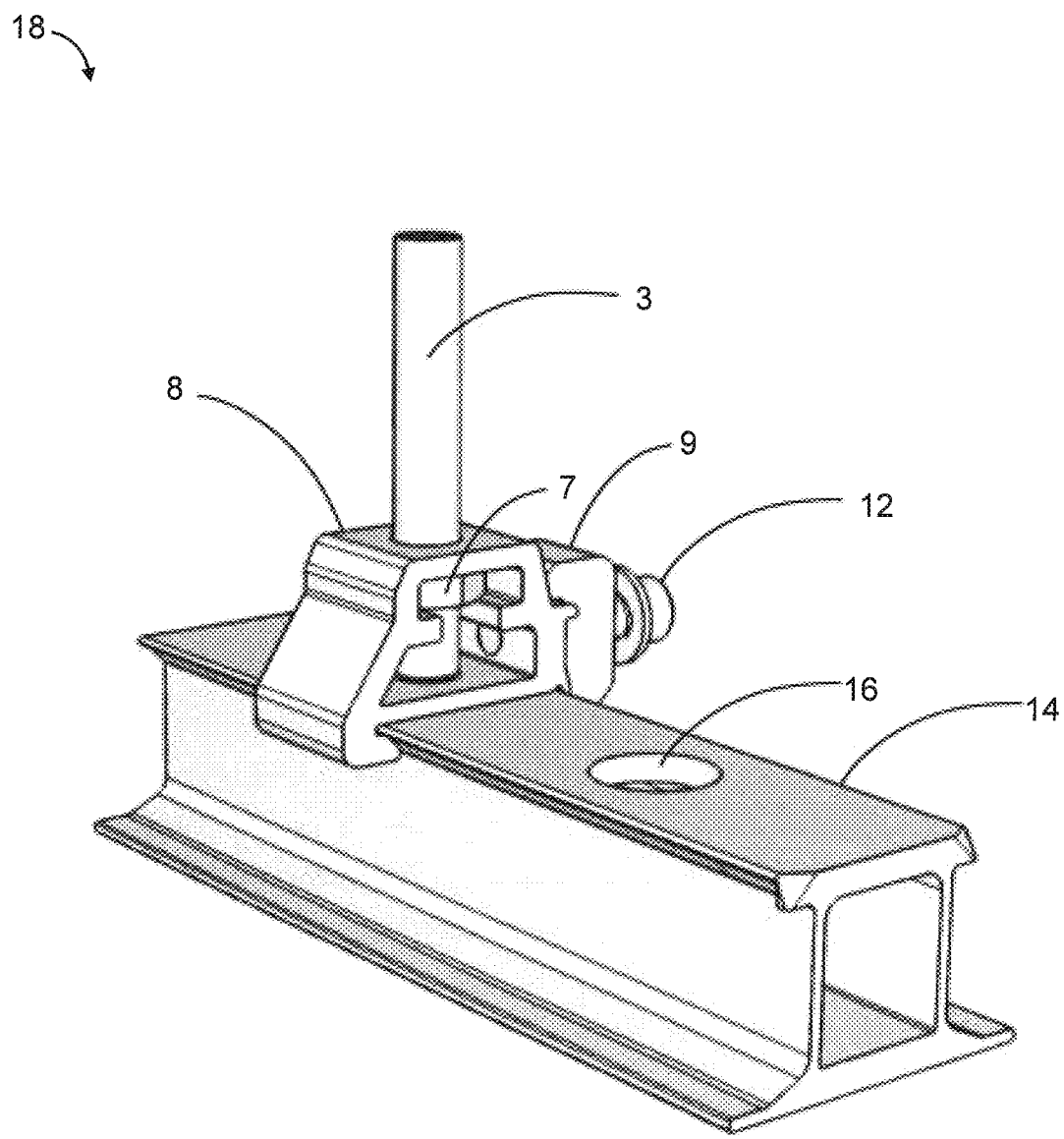
FIG. 21 shows an isometric perspective view of a rail-less, indexable mounting assembly, according to an embodiment.

FIG. 21 shows an isometric perspective view of a rail-less, indexable mounting assembly 18, according to an embodiment. Rotation of bolt 3 about its longitudinal axis causes base 6 to move up or down. The lower end of height adjustment bolt 3 is held by an un-threaded aperture 31 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Tower bracket 8, with attached assembly 18 (cap 4 and base is not shown for clarity), is free to slide North-South along the longitudinal length of slider 14 prior to tightening of horizontal attachment bolt 12.

Figure 22:
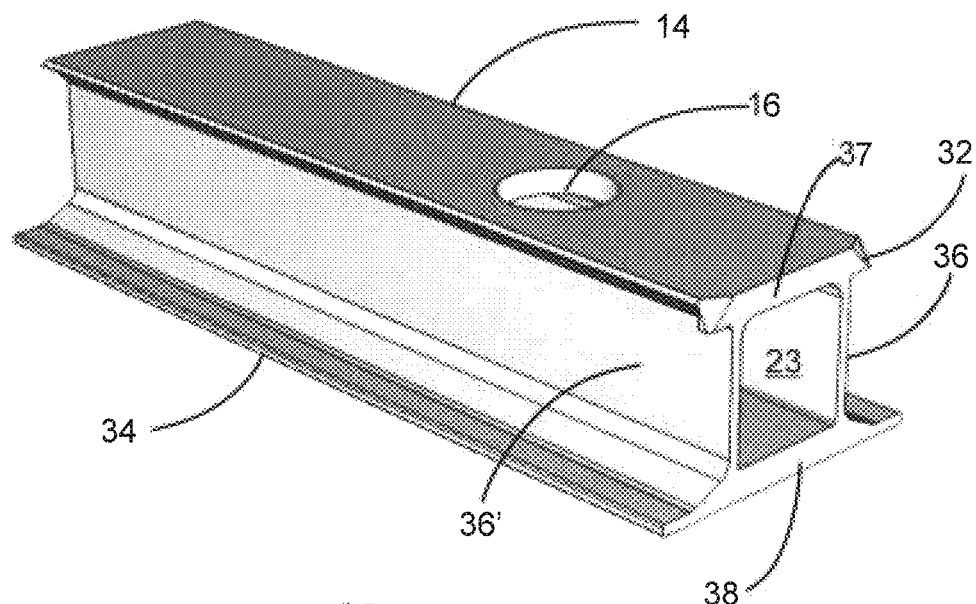
FIG. 22 shows an isometric perspective view of a slider channel, according to an embodiment.

FIG. 22 shows an isometric perspective view of a slider channel 14, according to an embodiment. Slider 14 may include a pair of sidewalls 36, 36' that are integrally joined to upper horizontal bridge portion 37 (which forms the top of slider 14), and to lower horizontal bridge portion 38 (which forms the base of slider 14). At one distal end of slider 14, flanges are peened (turned) down to make stops 32, 32', which prevent assembly 18 from sliding off one end of slider 14 when slider 14 is angled at a steep North-South angle to the horizontal (e.g., if installed on a steep roof). Slider 14 further includes a pair of outwardly-extending, longitudinal base flanges 34, 34', which stabilizes slider 14 against wind loads acting on assembly 18 (not shown).

Figure 23:
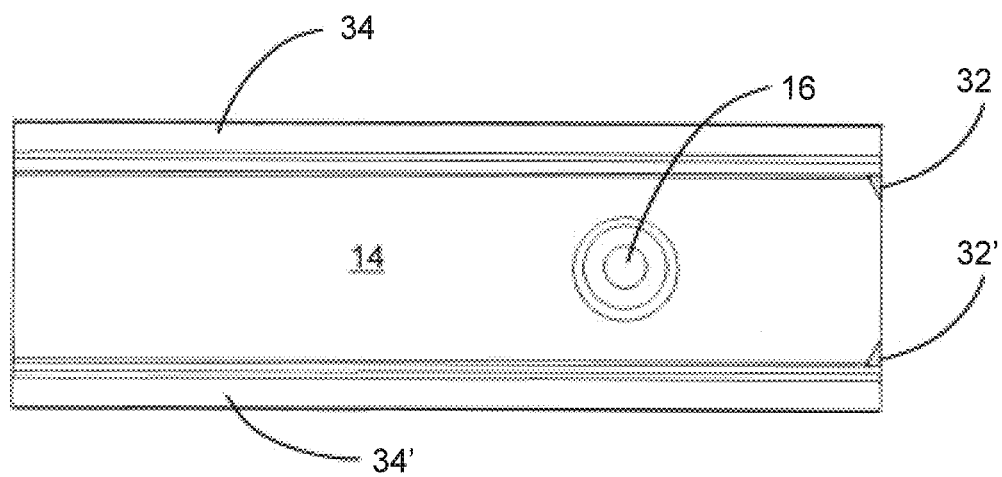
FIG. 23 shows a top view of a slider channel, according to an embodiment.

FIG. 23 shows a top view of a slider channel 14, according to an embodiment. Slider 14 has an un-threaded aperture 16 that provides access to install a lag screw that attaches slider 14 to an underlying roof surface. At one distal end of slider 14, flanges are peened (turned) down to make stops 32, 32', which prevent assembly 18 from sliding off one end of slider 14 when slider 14 is angled at a steep North-South angle to the horizontal (e.g., if installed on a steep roof). Slider 14 further includes a pair of outwardly-extending, longitudinal base flanges 34, 34', which stabilizes slider 14 against wind loads acting on assembly 18 (not shown).

Figure 24:
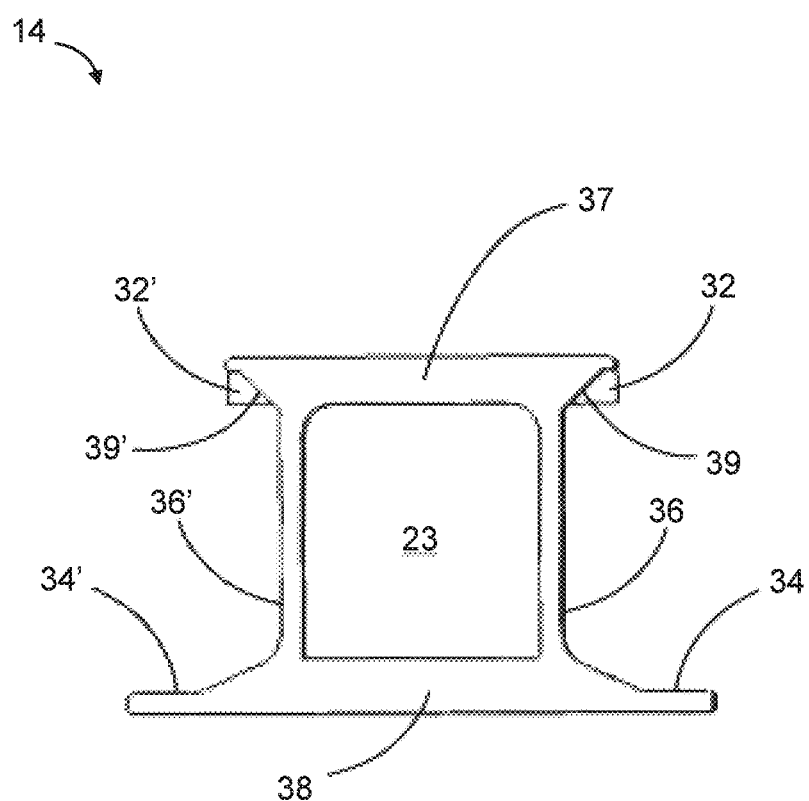
FIG. 24 shows an elevation end view of a slider channel, according to an embodiment.

FIG. 24 shows an elevation end view of a slider channel 14, according to an embodiment. Slider 14 may include a pair of sidewalls 36, 36' that are integrally joined to upper horizontal bridge portion 37 (which forms the top of slider 14), and to lower horizontal bridge portion 38 (which forms the base of slider 14). Sidewalls 36, 36' may be perpendicular to horizontal base portion 38, or (alternatively), sidewalls 36, 36' may be non-perpendicular to horizontal base portion 38 (e.g., splayed outwards or inwards, not shown). Slider 14 optionally includes a hollow interior volume 23. At one distal end of slider 14, flanges are peened (turned) down to make stops 32, 32', which prevent assembly 18 from sliding off one end of slider 14 when slider 14 is angled at a steep North-South angle to the horizontal (e.g., if installed on a steep roof). Slider 14 may further include a pair of outwardly-extending, longitudinal base flanges 34, 34', which stabilizes slider 14 against wind loads acting on assembly 18 (not shown).

Figure 25:
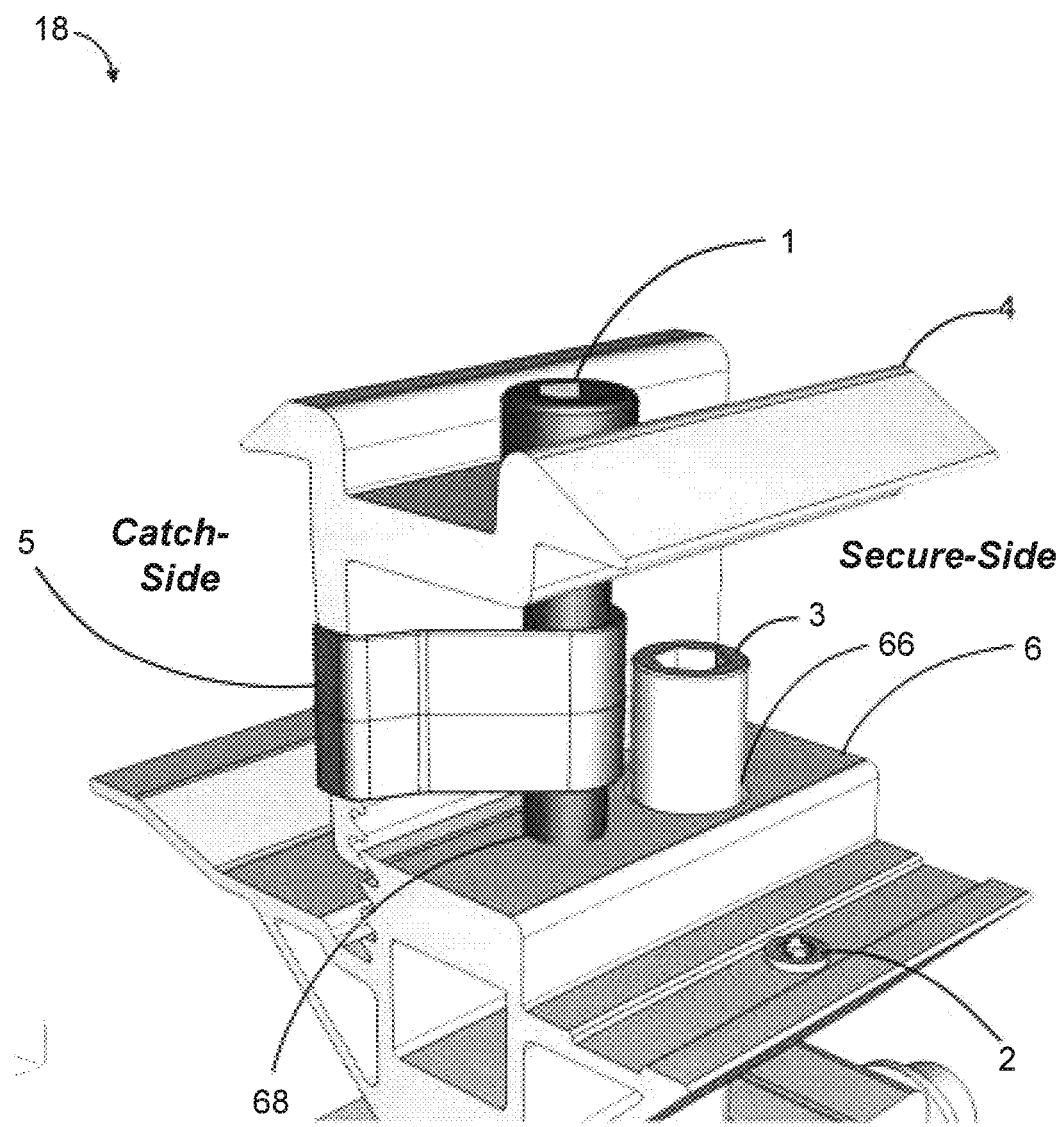
FIG. 25 shows an isometric perspective view of a rail-less, indexable mounting assembly, according to an embodiment.

FIG. 25 shows an isometric perspective view of a rail-less, indexable mounting assembly 18, according to an embodiment. Assembly 18 may include a clamping bolt 1 that clamps a solar panel (not shown) in-between an indexable (adjustable) cap 4 and a base 6. Spring clip 5 clips onto clamping bolt 1 on one end, and clips onto vertical leg 78 (that protrudes downwardly from cap 4) on the other end, thereby maintaining a position of the (i.e. provides a restoring force to the cap 4 such that, after separation of the cap 4 and teeth for the purpose of adjusting the height between the cap 4 and base 6, the spring 5 restores the cap 4 (including the teeth/grooves) to engage with the base 6 (including teeth/grooves) cap 4 against the clamping bolt 1 and the base. Base 6 includes a bonding pin 2 disposed in a horizontal groove. Height adjustment bolt 3 engages threaded aperture 66 in base 6. Clamping bolt 1 engages threaded aperture 68 in base 6. Rotation of bolt 3 about its longitudinal axis causes base 6 to move up or down.

Figure 26:
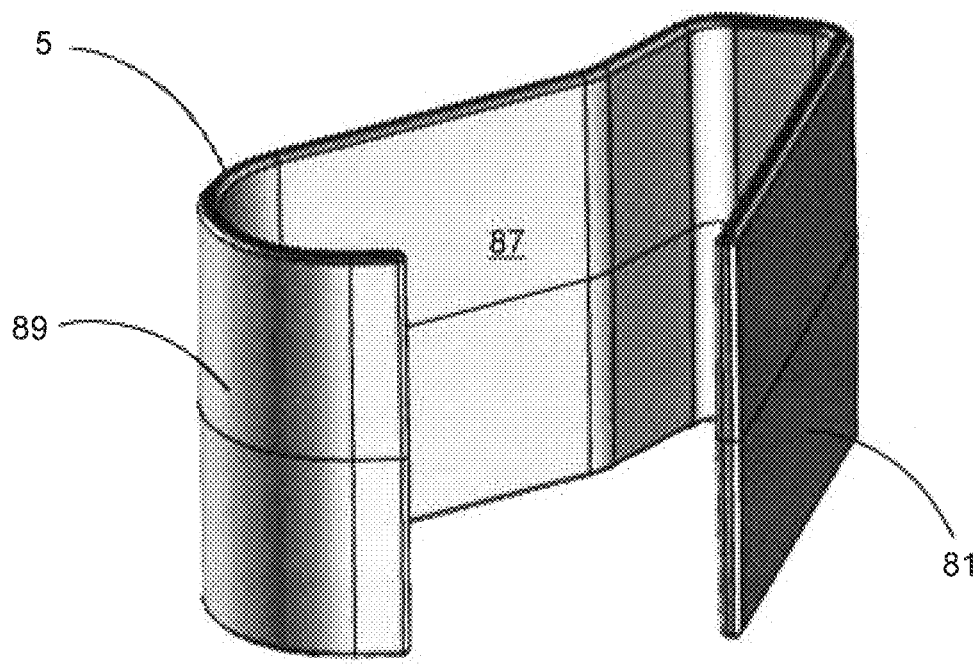
FIG. 26 shows an isometric perspective view of a spring clip, according to an embodiment.

FIG. 26 shows an isometric perspective view of a spring clip 5, according to an embodiment. Spring clip 5 clips onto clamping bolt 1 on curved end 89, and clips onto vertical leg 78 (that protrudes downwardly from cap 4) on the straight end 81, thereby maintaining a position of the cap 4 against the clamping bolt 1 and the base 6.

Figure 27:
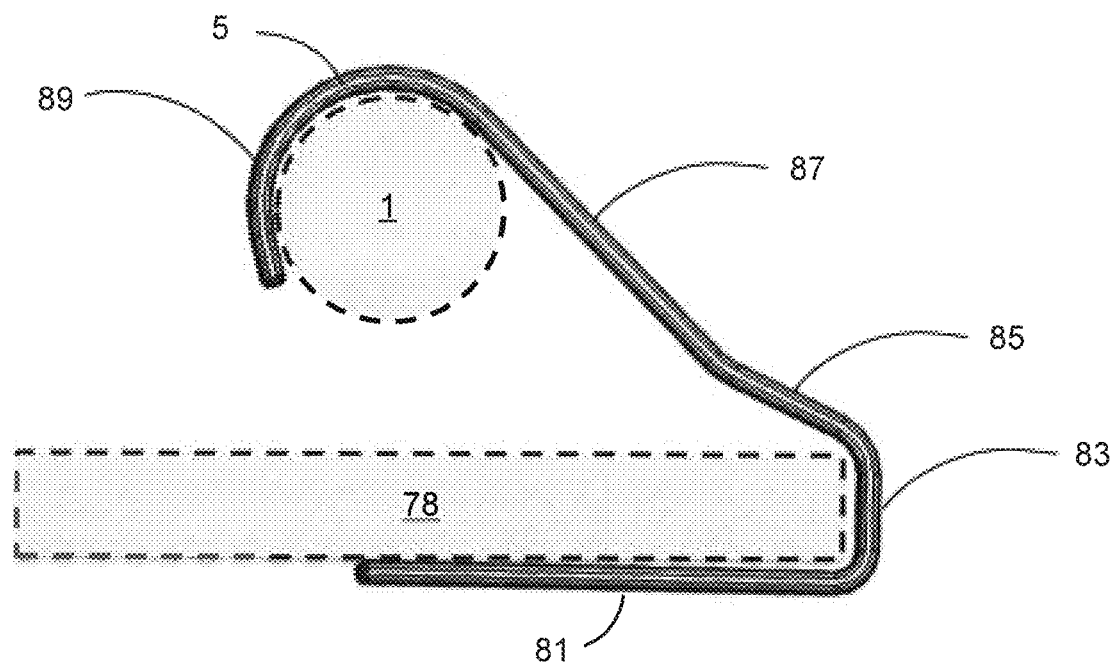
FIG. 27 shows a top view of a spring clip, according to an embodiment.

FIG. 27 shows a top view of a spring clip, according to an embodiment. In an embodiment, the spring clip 5 may include a straight segment 81, a short segment 83 disposed at approximately a right angle to the straight segment 81, a short segment angled at approximately 30° to the straight segment 81, a middle segment angled at approximately 45° to straight segment 81, and a semi-circular segment 89 disposed at the distal end of spring clip 5. Spring clip 5 clips onto clamping bolt 1 on curved end 89, and clips onto vertical leg 78 (that protrudes downwardly from cap 4) on the straight end 81, thereby maintaining a position of the cap 4 against the clamping bolt 1 and the base 6.

Figure 28:
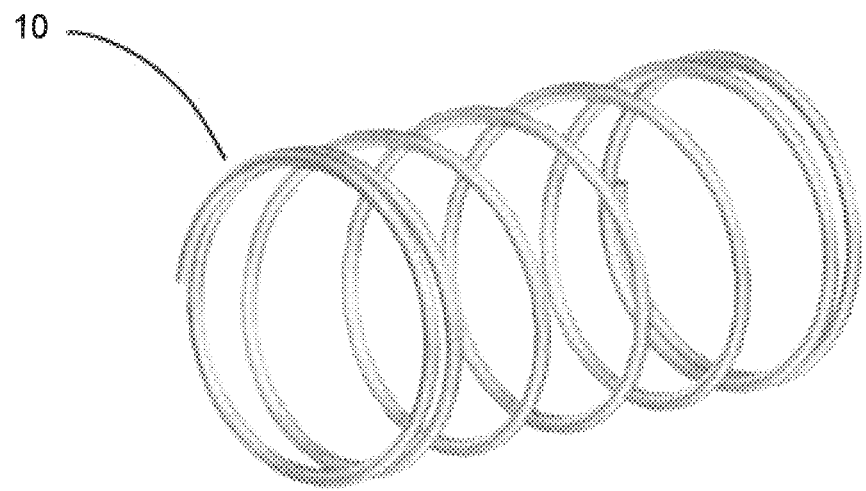
FIG. 28 shows an isometric perspective view of a spring, according to an embodiment.

FIG. 28 shows an isometric perspective view of a coil spring 10, according to an embodiment. Coil spring 10 may be replaced with a stack of Bellevue spring washers (conical spring washer, disc spring), or other elastic means for exerting a force in a direction.

Figure 29:
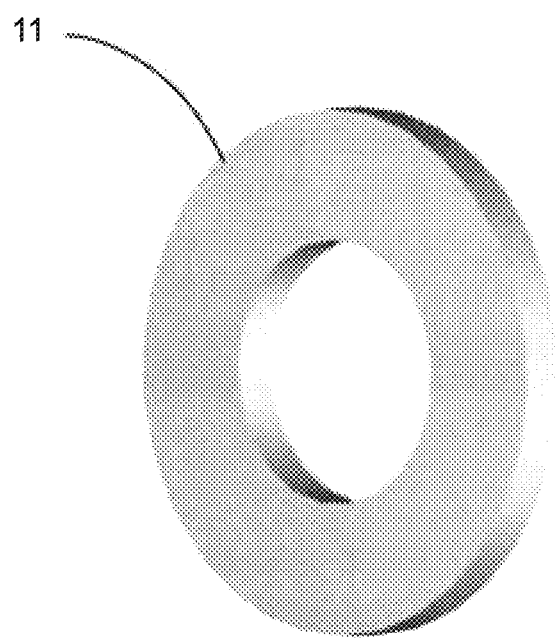
FIG. 29 shows an isometric perspective view of a washer, according to an embodiment.

FIG. 29 shows an isometric perspective view of a washer 11, according to an embodiment.

Figure 30:
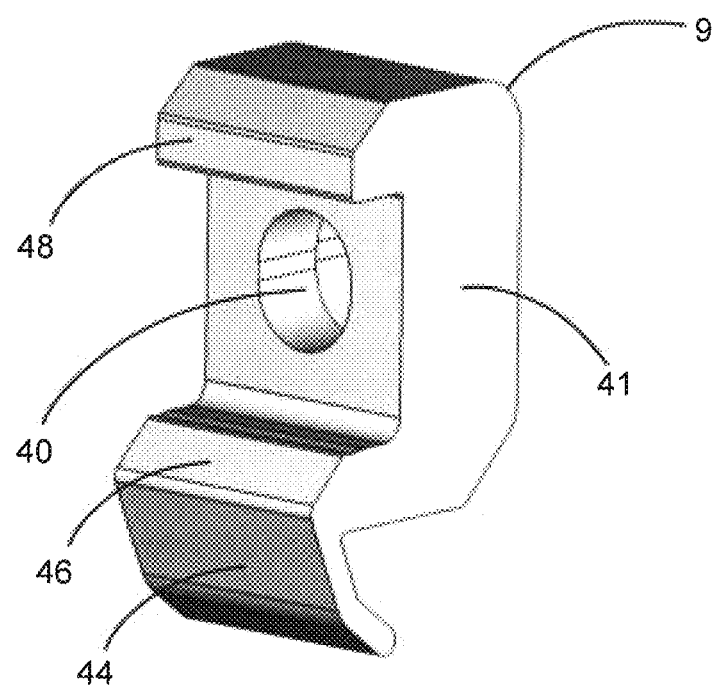
FIG. 30 shows an isometric perspective view of a dovetail clamp, according to an embodiment.

FIG. 30 shows an isometric perspective view of a dovetail clamp 9, according to an embodiment. Clamp 9 may include a generally-rectangular, extruded main body 41 with an un-threaded aperture 40 disposed through the main body 41; an angled ramp 46 disposed in a lower portion of clamp 9; a curved wing 44 disposed at a bottom of clamp 9; and an upper face 48 disposed at an upper portion of clamp 9. The "dovetail" aspect of clamp 9 is represented by angled ramp 46.

Figure 31:
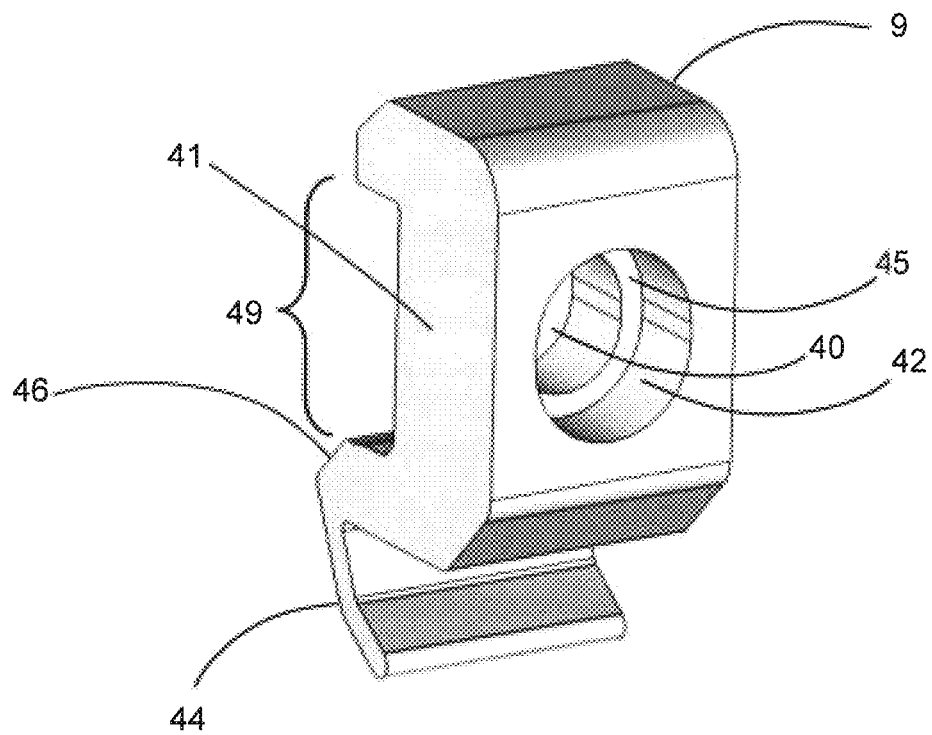
FIG. 31 shows an isometric perspective view of a dovetail clamp, according to an embodiment.

FIG. 31 shows an isometric perspective view of a dovetail clamp 9, according to an embodiment. Clamp 9 may include a generally-rectangular, extruded main body 41 with an un-threaded aperture 40 disposed through the main body 41; an angled ramp 46 disposed in a lower portion of clamp 9; a curved wing finger grip 44 disposed at a bottom of clamp 9; and an upper face 48 disposed at an upper portion of clamp 9. The "dovetail" aspect of clamp 9 is represented by angled ramp 46, which may be angled at approximately 45°. Clamp 9 may further include a recessed rectangular portion 49, and a recessed shoulder 45 disposed inside of a larger-diameter outer aperture 42 that encompasses inner aperture 40.

Figure 32:
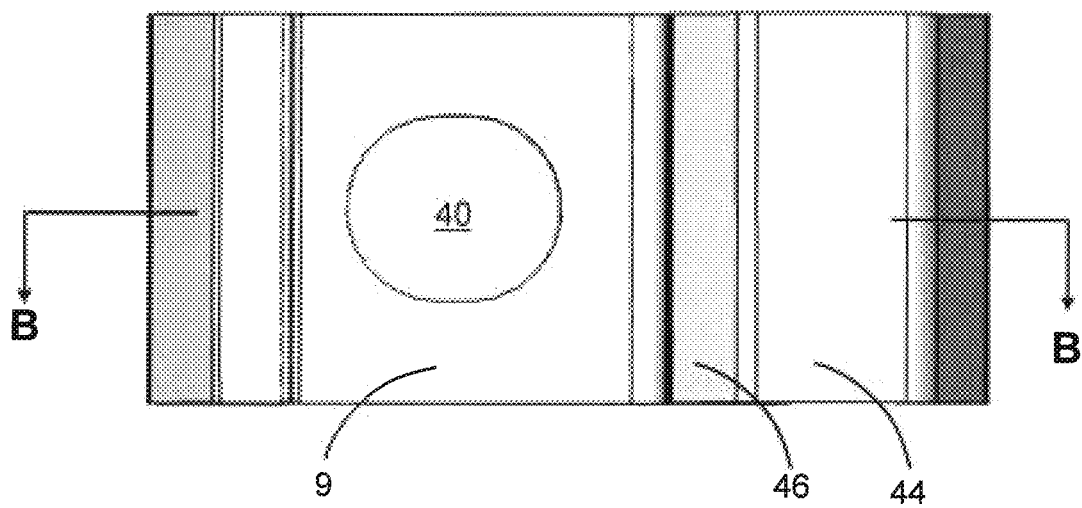
FIG. 32 shows a rotated elevation side view of a dovetail clamp, according to an embodiment.

FIG. 32 shows a rotated elevation side view of a dovetail clamp, according to an embodiment. Clamp 9 may include an aperture 40 and an angled ramp 46 and curved wing finger grip 44.

Figure 33:
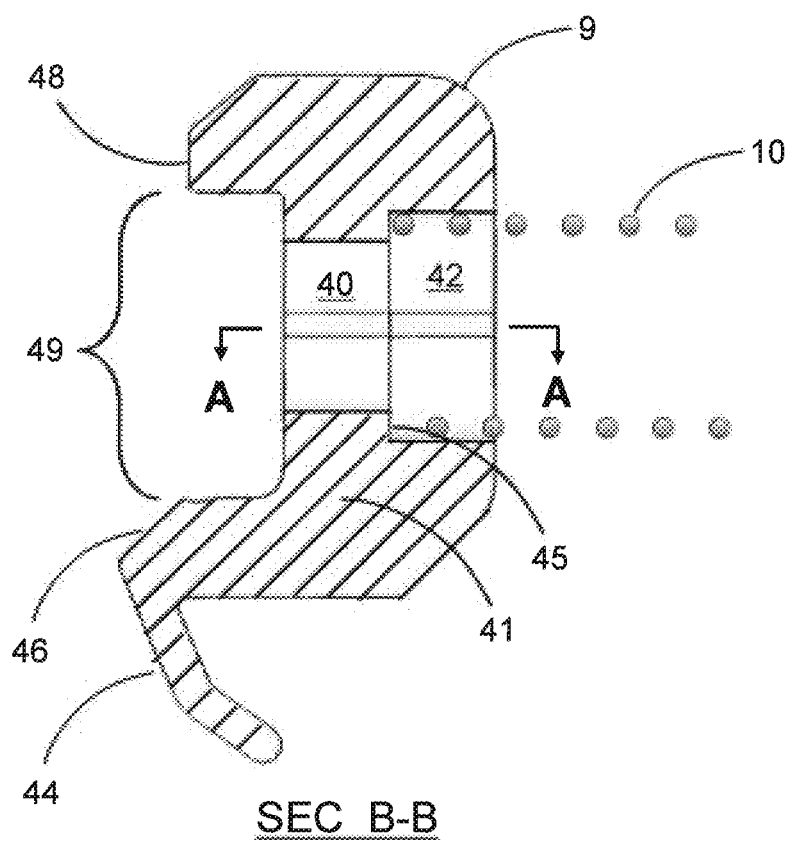
FIG. 33 shows a cross-section elevation side view (SEC. B-B) of a dovetail clamp, according to an embodiment.

FIG. 33 shows a cross-section elevation side view (SEC. B-B) a dovetail clamp, according to an embodiment. Clamp 9 may include a generally-rectangular, extruded main body 41 with an un-threaded aperture 40 disposed through the main body 41; an angled ramp 46 disposed in a lower portion of clamp 9; a curved wing finger grip 44 disposed at a bottom of clamp 9; and an upper face 48 disposed at an upper portion of clamp 9. The "dovetail" aspect of clamp 9 is represented by angled ramp 46, which may be angled at approximately 45°. Clamp 9 may further include a recessed rectangular portion 49, and a recessed shoulder 45 disposed inside of a larger-diameter outer aperture 42 that encompasses inner aperture 40. An end of coil spring 10 is showed schematically disposed in outer aperture 42, resting on recessed shoulder 45.

Figure 34:
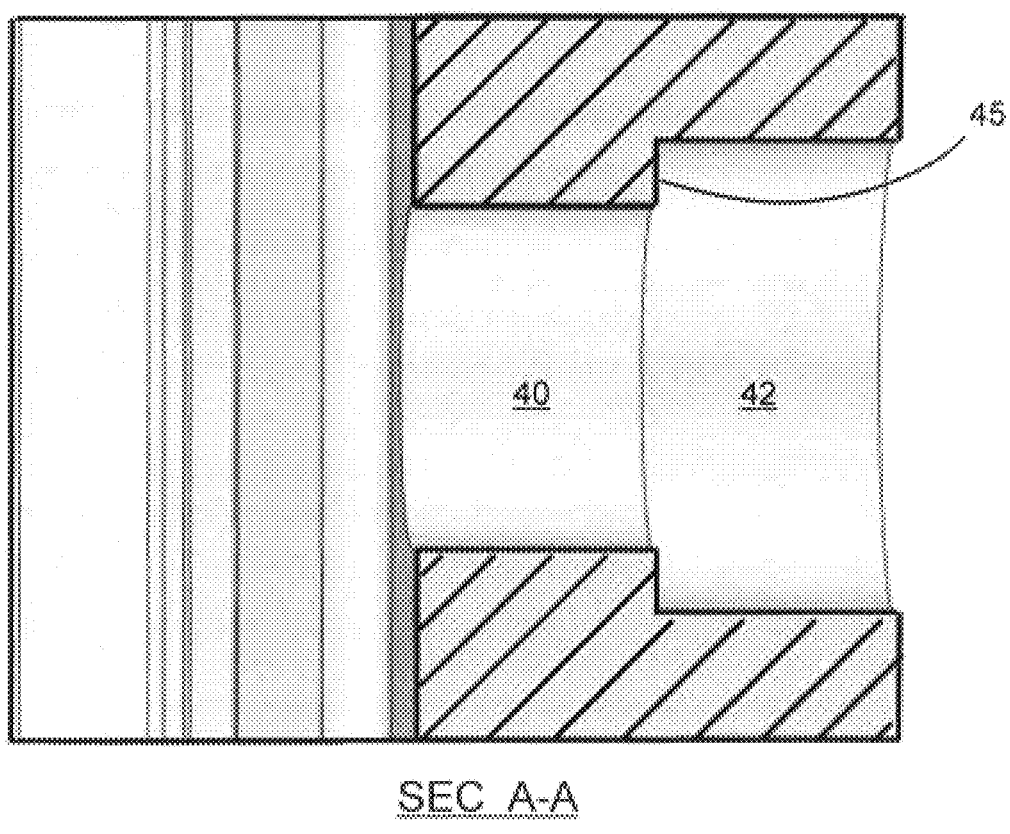
FIG. 34 shows a cross-section elevation side view (SEC. A-A) of a dovetail clamp, according to an embodiment.

FIG. 34 shows a cross-section elevation side view (SEC. A-A) of a dovetail clamp, according to an embodiment. Clamp 9 further includes a recessed shoulder 45 disposed inside of a larger-diameter outer aperture 42 that encompasses inner aperture 40. An end of coil spring 10 is showed schematically disposed in outer aperture 42, sitting on recessed shoulder 45.

Figure 35:
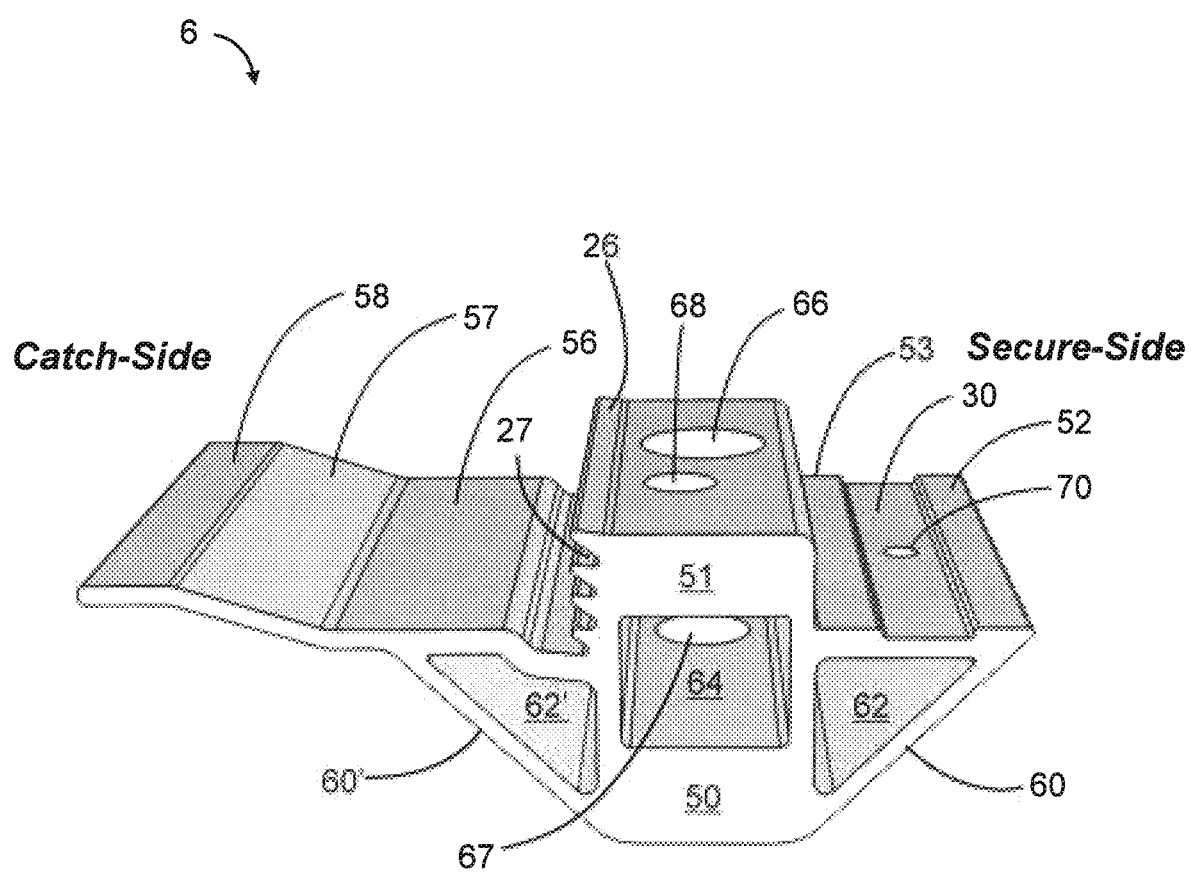
FIG. 35 shows an isometric perspective view of a base, according to an embodiment.

FIG. 35 shows an isometric perspective view of a base 6, according to an embodiment. Base 6 may include an extruded main body with upper horizontal portion 51 and lower horizontal portion 50; integral web portions 60 and 60'; and generally-horizontal extended support surfaces (ledges) 52, 53 on the clamp-side of base 6, and support surface (ledge) 58 on the catch-side of base 6. The support surface 58 on the catch-side extends horizontally approximately twice as far as the secure-side support surface 52 does. A horizontal groove 30 is disposed in-between ledges 52 and 53, which contains an aperture 70 for receiving a bonding pin 2 (not shown). Un-threaded aperture 66 and threaded aperture 68 are disposed through upper portion 51. Un-threaded aperture 66 in upper portion aligns vertically with un-threaded aperture 67 in lower portion 50. Base 6 further includes extended surface 56 and angled extended surface 57, which connect integrally to catch-side support surface 58. A plurality of corrugations 26, 26', 26", etc. are disposed on the catch-side of upper portion 51, facing outwardly from a center of upper portion 51. Corresponding grooves 27, 27' are disposed in-between adjacent teeth 26, 26', etc. Hollow volume 64 is disposed in-between solid portions 51 and 50; and hollow volumes 62 and 62' are disposed above web segments 60 and 60', respectively.

Figure 36:
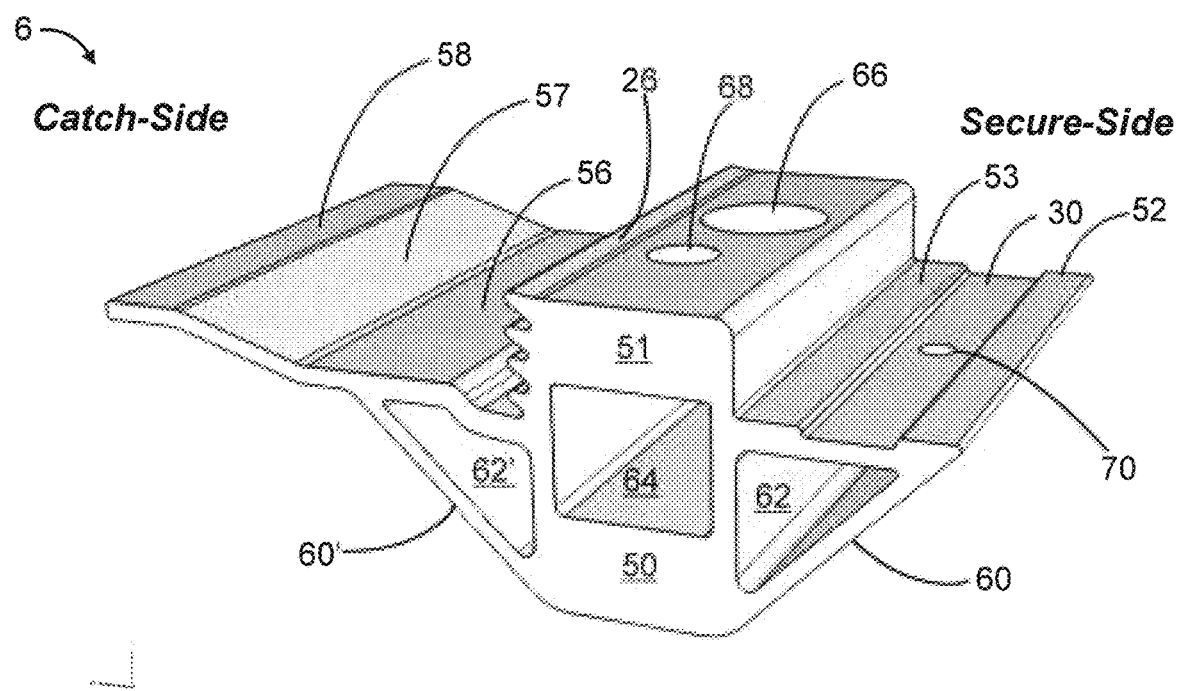
FIG. 36 shows an isometric perspective view of a base, according to an embodiment.

FIG. 36 shows an isometric perspective view of a base 6, according to an embodiment. Base 6 may include an extruded main body with upper horizontal portion 51 and lower horizontal portion 50; integral web portions 60 and 60'; and generally-horizontal extended support surfaces (ledges) 52, 53 on the secure-side of base 6, and support surface (ledge) 58 on the catch-side of base 6. The support surface 58 on the catch-side extends horizontally approximately twice as far as the secure-side support surface 52 does. A horizontal groove 30 is disposed in-between ledges 52 and 53, which contains an aperture 70 for receiving a bonding pin 2 (not shown). Un-threaded aperture 66 and threaded aperture 68 are disposed through upper portion 51. Un-threaded aperture 66 in upper portion aligns vertically with un-threaded aperture 67 in lower portion 50. Base 6 further includes extended surface 56 and angled extended surface 57, which connect integrally to catch-side support surface 58. A plurality of protruding corrugations 26, 26', 26", etc. are disposed on the catch-side of upper portion 51, facing outwardly from a center of upper portion 51. Corresponding grooves 27, 27' are disposed in-between adjacent teeth 26, 26', etc. Hollow volume 64 is disposed in-between solid portions 51 and 50; and hollow volumes 62 and 62' are disposed above web segments 60 and 60', respectively.

Figure 37:
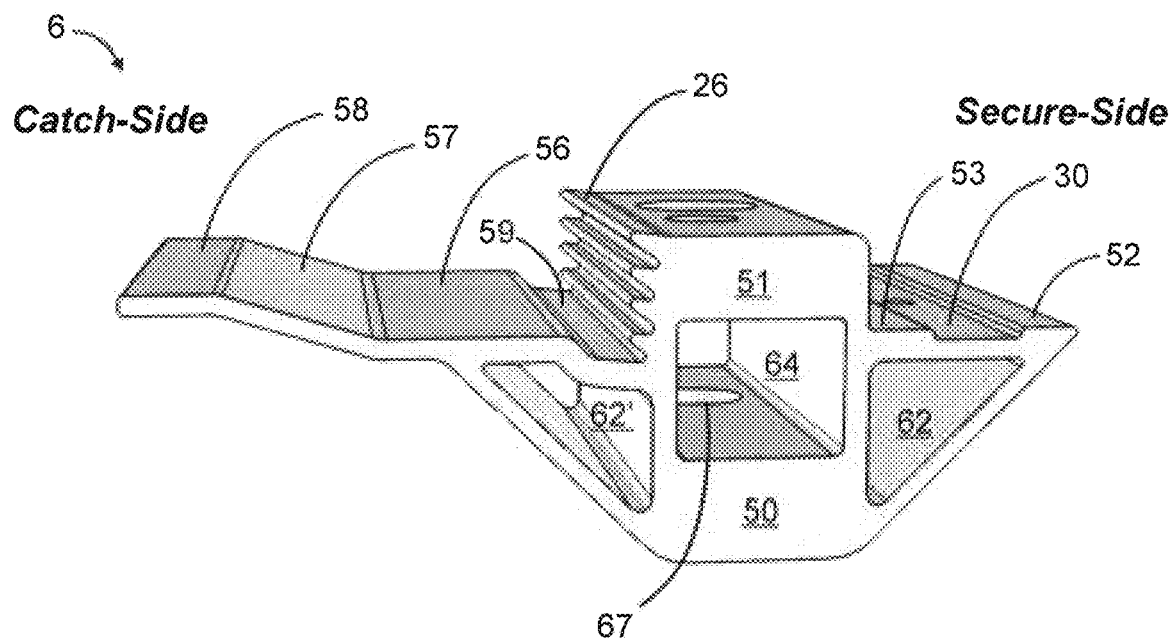
FIG. 37 shows an isometric perspective view of a base, according to an embodiment.

FIG. 37 shows an isometric perspective view of a base 6, according to an embodiment. Base 6 may include an extruded main body with upper horizontal portion 51 and lower horizontal portion 50; integral web portions 60 and 60'; and generally-horizontal extended support surfaces (ledges) 52, 53 on the secure-side of base 6, and support surface (ledge) 58 on the catch-side of base 6. The support surface 58 on the catch-side extends horizontally approximately twice as far as the secure-side support surface 52 does. A horizontal groove 30 is disposed in-between ledges 52 and 53, which contains an aperture 70 for receiving a bonding pin 2 (not shown). Un-threaded aperture 66 and threaded aperture 68 are disposed through upper portion 51. Un-threaded aperture 66 in upper portion aligns vertically with un-threaded aperture 67 in lower portion 50. Base 6 further includes extended surface 56 and angled extended surface 57, which connect integrally to catch-side support surface 58. A plurality of parallel, horizontal corrugations 26, 26', 26", etc. are disposed on the catch-side of upper portion 51, facing outwardly from a center of upper portion 51. Corresponding grooves 27, 27' are disposed in-between adjacent teeth 26, 26', etc. Hollow volume 64 is disposed in-between solid portions 51 and 50; and hollow volumes 62 and 62' are disposed above web segments 60 and 60', respectively.

Figure 38A:
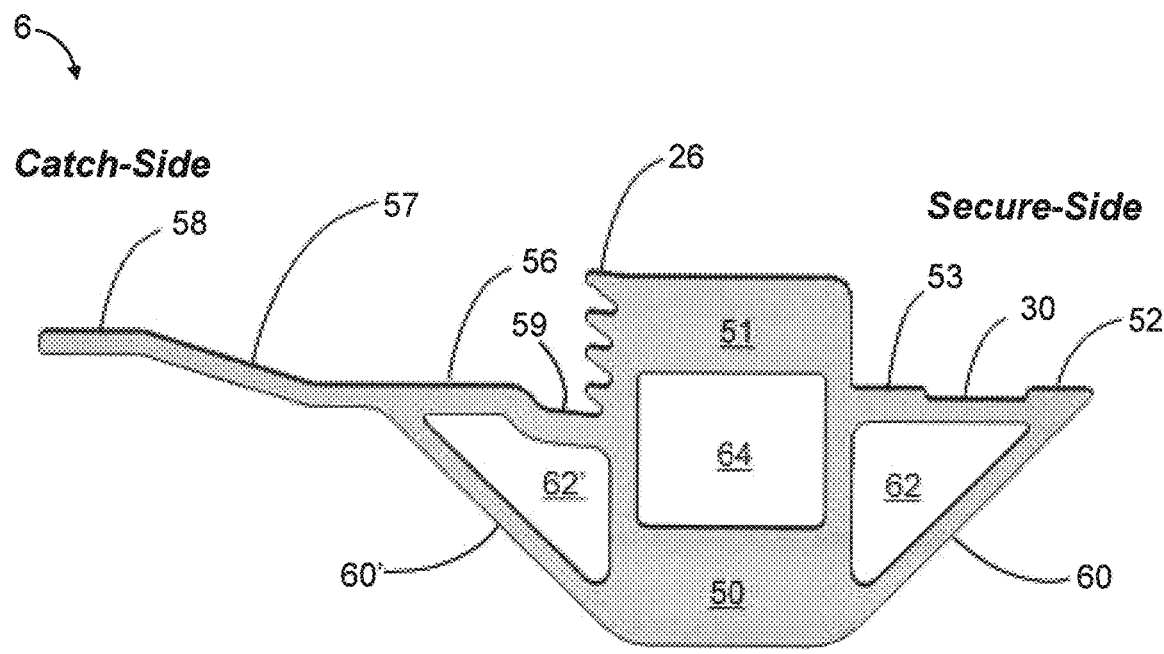
FIG. 38A shows an elevation side view of a base, according to an embodiment.

FIG. 38A shows an elevation side view of a base, according to an embodiment. Base 6 includes an extruded main body with upper horizontal portion 51 and lower horizontal portion 50; integral web portions 60 and 60'; and generally-horizontal extended support surfaces (ledges) 52, 53 on the secure-side of base 6, and support surface (ledge) 58 on the catch-side of base 6. The support surface 58 on the catch-side extends horizontally approximately twice as far as the secure-side support surface 52 does. A horizontal groove 30 is disposed in-between ledges 52 and 53, which contains an aperture 70 for receiving a bonding pin 2 (not shown). Un-threaded aperture 66 and threaded aperture 68 are disposed through upper portion 51. Un-threaded aperture 66 in upper portion aligns vertically with un-threaded aperture 67 in lower portion 50. Base 6 further includes extended surface 56 and angled extended surface 57, which connect integrally to catch-side support surface 58. A plurality of corrugations 26, 26', 26", etc. are disposed on the catch-side of upper portion 51, facing outwardly from a center of upper portion 51. Corresponding grooves 27, 27' are disposed in-between adjacent teeth 26, 26', etc. Hollow volume 64 is disposed in-between solid portions 51 and 50; and hollow volumes 62 and 62' are disposed above web segments 60 and 60', respectively.

Figure 38B:
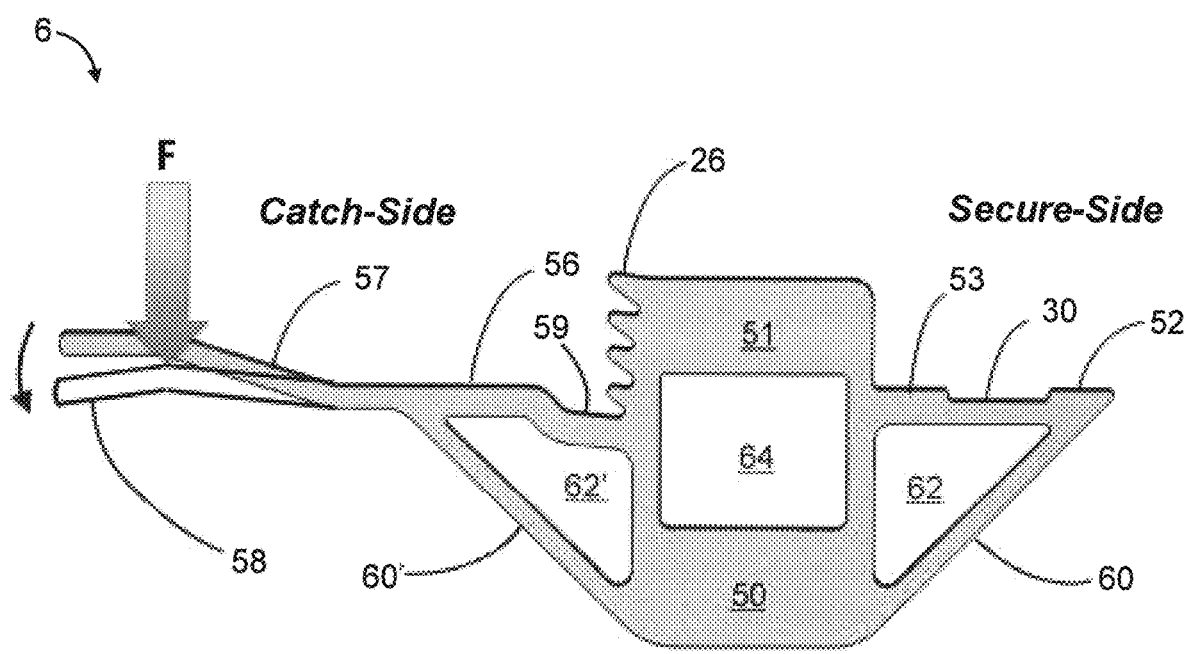
FIG. 38B shows an elevation side view of a base, according to an embodiment.

FIG. 38B shows an elevation side view of a base 6, according to an embodiment. In this view, catch-side tilted-up support ledge 58 acts as a cantilevered spring and deflects downwards when a solar panel 20 (not shown) is installed on the catch-side. This deflection is caused by a downwards force, F, that is applied to ledge 58 by panel 20. An equal, and opposite, restoring force (not shown) is applied upwards to panel 20 by spring ledge 58, which forces panel 20 up against the overhanging clamping wing 74 (not shown) of cap 4.

Figure 39:
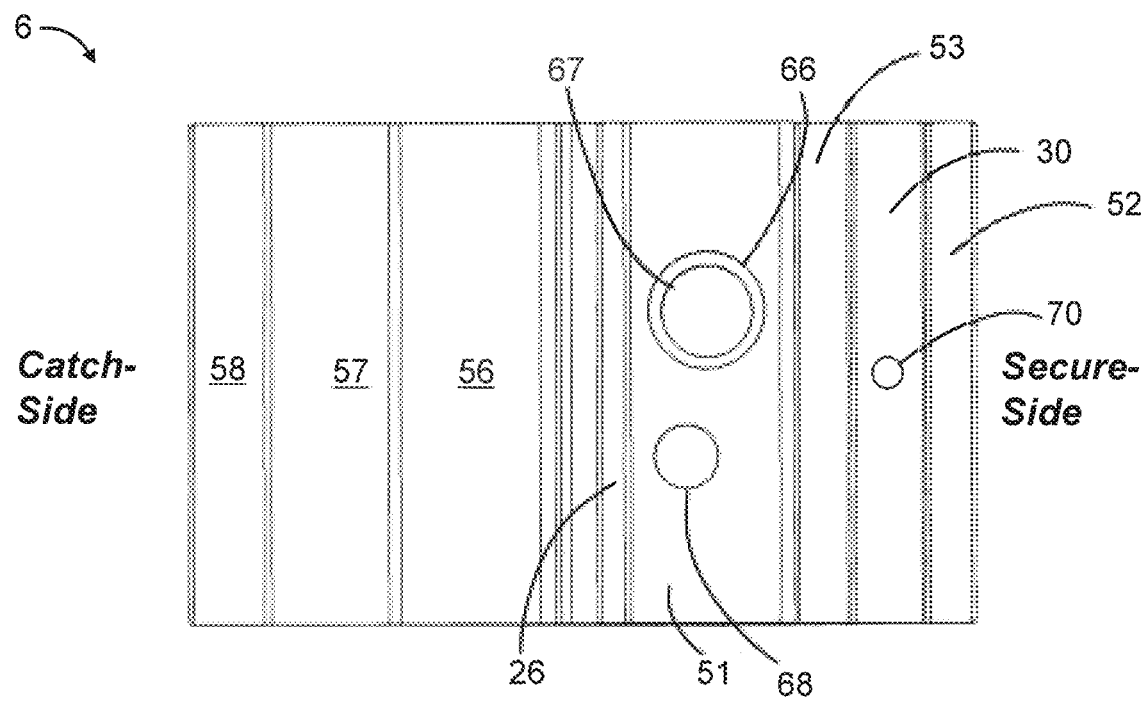
FIG. 39 shows top view of a base, according to an embodiment.

FIG. 39 shows top view of a base 6, according to an embodiment. Base 6 includes an extruded main body with upper horizontal portion 51 and lower horizontal portion 50; integral web portions 60 and 60'; and generally-horizontal extended support surfaces (ledges) 52, 53 on the secure-side of base 6, and support surface (ledge) 58 on the catch-side of base 6. The support surface 58 on the catch-side extends horizontally approximately twice as far as the secure-side support surface 52 does. A horizontal groove 30 is disposed in-between ledges 52 and 53, which contains an aperture 70 for receiving a bonding pin 2 (not shown). Un-threaded aperture 66 and threaded aperture 68 are disposed through upper portion 51. Un-threaded aperture 66 in upper portion aligns vertically with threaded aperture 67 in lower portion 50. Base 6 further includes extended surface 56 and tilted extended surface 57, which connect integrally to catch-side support surface 58. Aperture 68 is offset to the catch-side from the center of upper portion 51 of base 6 (wherein the center of portion 51 is defined as the center of aperture 66/67). Aperture 66 is slightly larger in diameter than aperture 66 to ensure proper clearance. Corrugation 26 may be seen.

Figure 40:
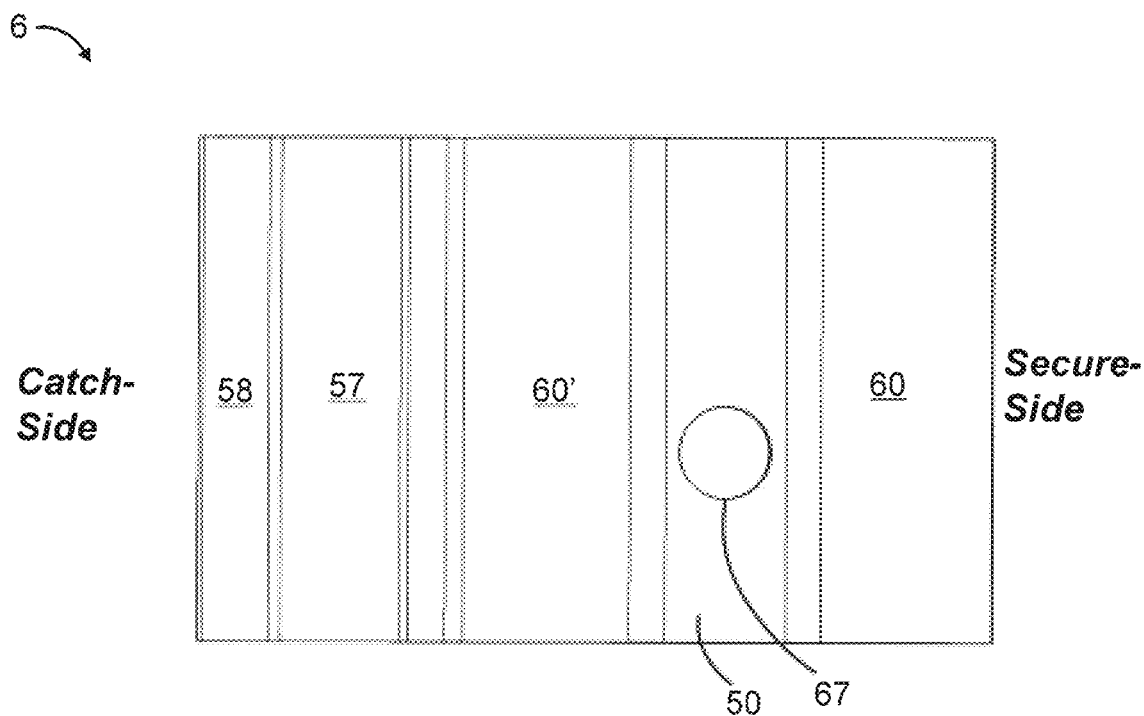
FIG. 40 shows bottom view of a base, according to an embodiment.

FIG. 40 shows bottom view of a base 6, according to an embodiment. Base 6 includes an extruded main body with upper horizontal portion 51 and lower horizontal portion 50; integral web portions 60 and 60'; and generally-horizontal extended support surfaces (ledges) 52, 53 on the secure-side of base 6, and support surface (ledge) 58 on the catch-side of base 6. The support surface 58 on the catch-side extends horizontally approximately twice as far as the secure-side support surface 52 does. A horizontal groove 30 is disposed in-between ledges 52 and 53, which contains an aperture 70 for receiving a bonding pin 2 (not shown). Un-threaded aperture 66 and threaded aperture 68 are disposed through upper portion 51. Un-threaded aperture 66 in upper portion aligns vertically with un-threaded aperture 67 in lower portion 50. Base 6 further includes extended surface 56 and angled extended surface 57, which connect integrally to catch-side support surface 58. Aperture 68 is offset to the catch-side from the center of upper portion 51 of base 6 (wherein the center of portion 51 is defined as the center of aperture 66/67). Aperture 67 is slightly smaller in diameter than aperture 66.

Figure 41:
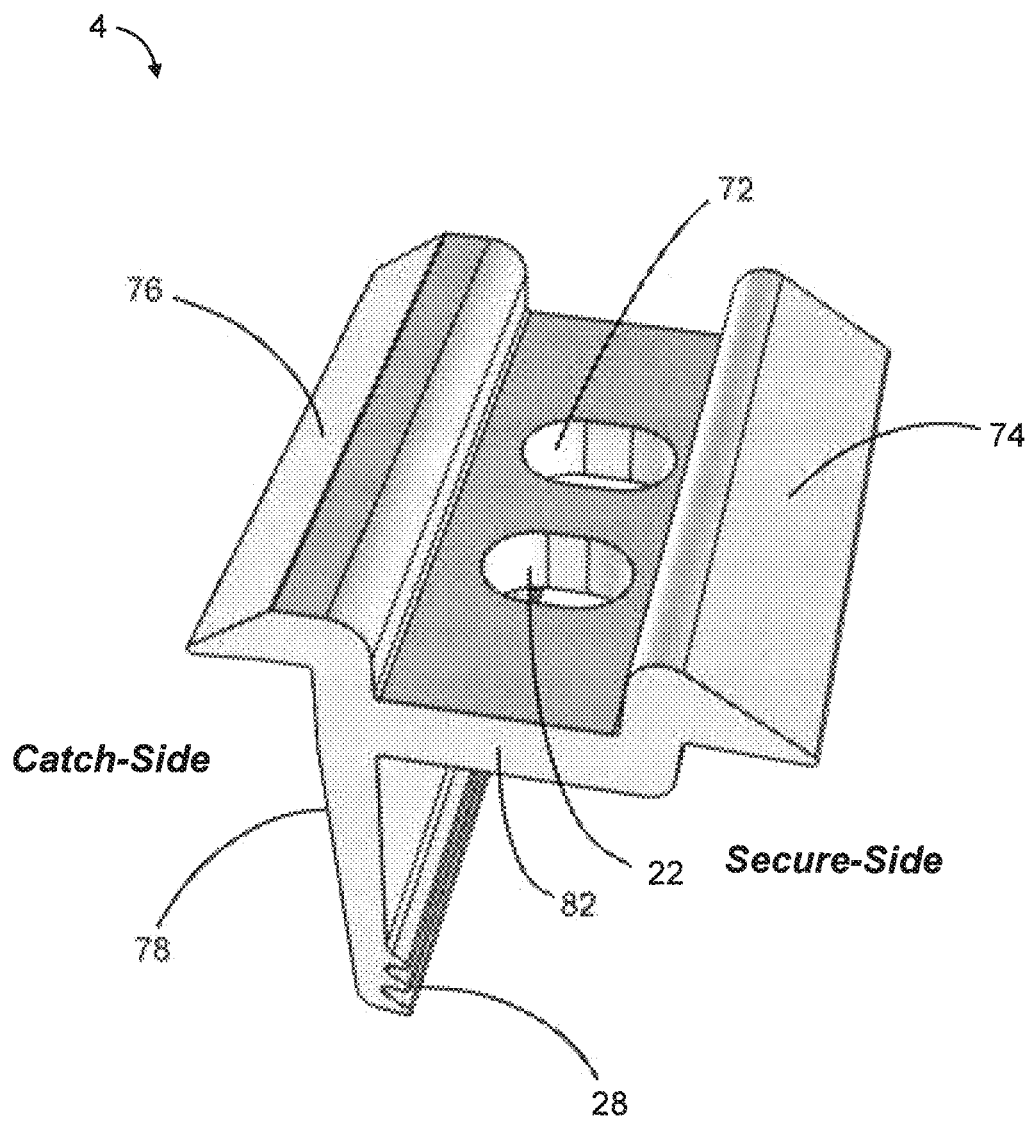
FIG. 41 shows an isometric perspective view of a cap, according to an embodiment.

FIG. 41 shows an isometric perspective view of a cap 4, according to an embodiment. Cap 4 includes an extruded body including a horizontal upper portion 82; integral overhanging catch-side wing 76; integral overhanging secure-side wing 74; and integral (downwardly-protruding) vertical support leg 78 with a plurality of inwardly-facing, corrugations (teeth) 28, 28', 28" and corresponding grooves 29, 29' disposed at the bottom end of leg 78. The size of teeth 28 get progressively larger moving down the leg 78 towards the bottom of leg 78. Cap 4 includes a pair of slotted apertures 22 and 72 disposed in upper portion 82. One aperture aligns with clamping bolt 1, and the other aperture aligns with height adjustment bolt 3, providing access to pass a tool through to rotate bolt 3.

Figure 42:
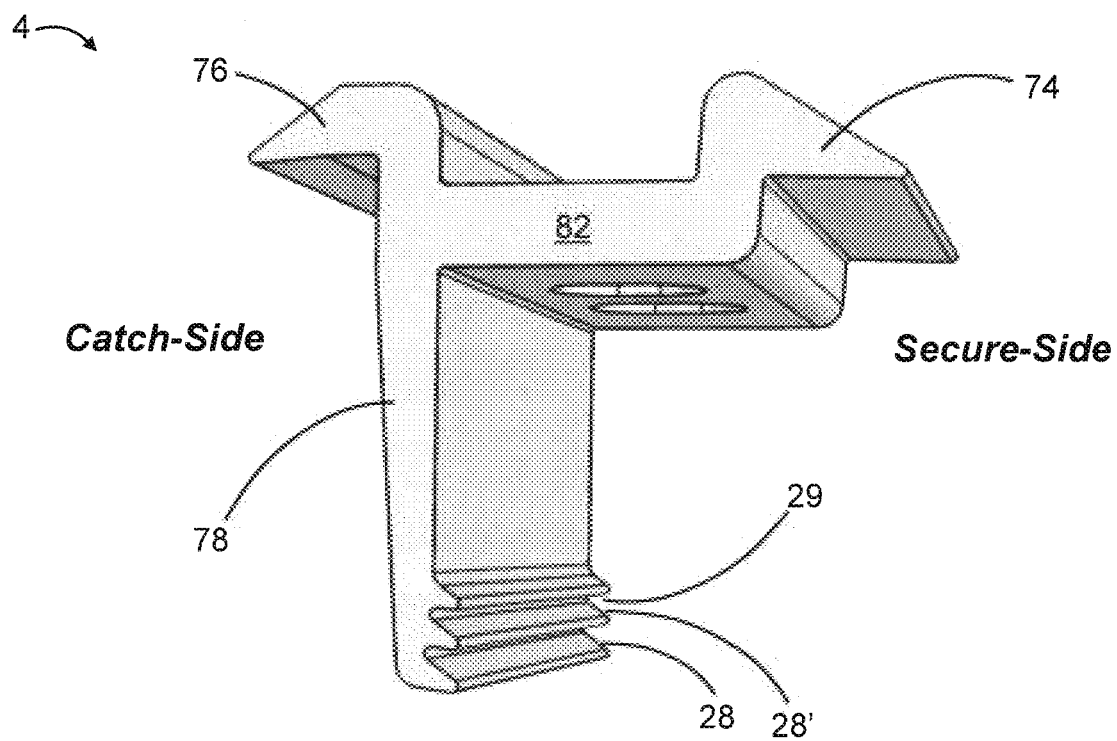
FIG. 42 shows an isometric perspective view of a cap, according to an embodiment.

FIG. 42 shows an isometric perspective view of a cap 4, according to an embodiment. Cap 4 includes an extruded body including a horizontal upper portion 82; integral overhanging catch-side wing 76; integral overhanging secure-side wing 74; and integral (downwardly-protruding) vertical support leg 78 with a plurality of inwardly-facing, horizontal, parallel corrugations (teeth) 28, 28', 28" and corresponding grooves 29, 29' disposed at the bottom end of leg 78. The size of teeth 28 get progressively larger moving down the leg 78 towards the bottom of leg 78. Cap 4 includes a pair of slotted apertures 22 and 72 disposed in upper portion 82. One aperture aligns with clamping bolt 1, and the other aperture aligns with height adjustment bolt 3, providing access to pass a tool through to rotate bolt 3.

Figure 43A:
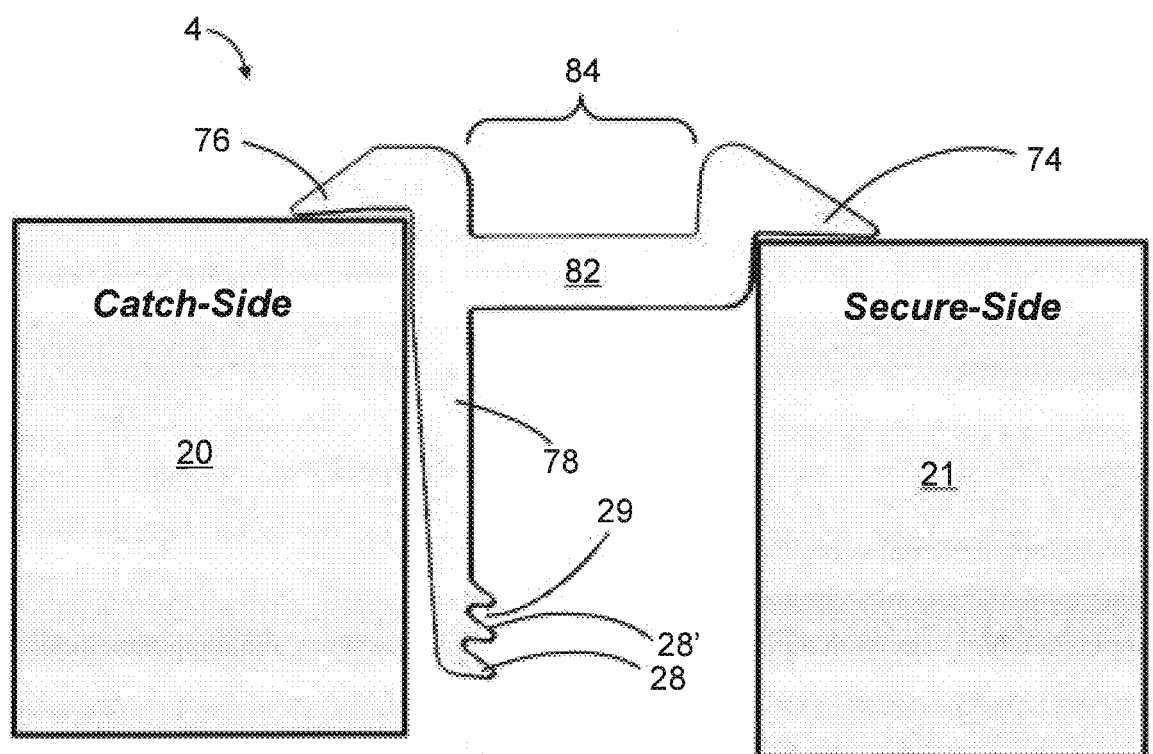
FIG. 43A shows an elevation side view of a cap, according to an embodiment.

FIG. 43A shows an elevation side view of a cap 4, according to an embodiment. Cap 4 includes an extruded body including a horizontal upper portion 82; integral overhanging catch-side wing 76; integral overhanging secure-side wing 74; and integral (downwardly-protruding) vertical support leg 78 with a plurality of inwardly-facing, horizontal, parallel corrugations (teeth) 28, 28', 28" and corresponding grooves 29, 29' disposed at the bottom end of leg 78. The size of teeth 28 get progressively larger moving down the leg 78 towards the bottom of leg 78. Recess 84 is disposed above upper horizontal portion 82. Ends of solar panels 20 and 21 are shown.

Figure 43B:
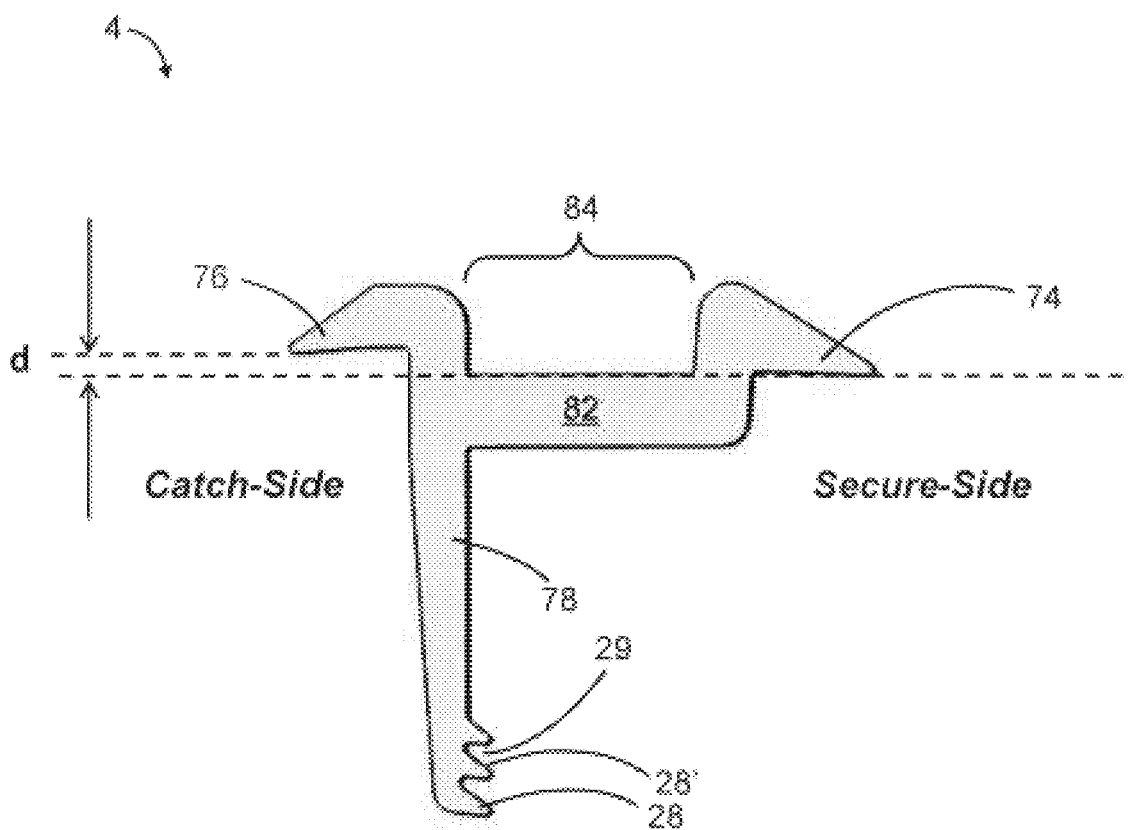
FIG. 43B shows an elevation side view of a cap, according to an embodiment.

FIG. 43B shows an elevation side view of a cap 4, according to an embodiment. Cap 4 includes an extruded body including a horizontal upper portion 82; integral overhanging catch-side wing 76; integral overhanging secure-side wing 74; and integral (downwardly-protruding) vertical support leg 78 with a plurality of inwardly-facing, horizontal, parallel corrugations (teeth) 28, 28', 28" and corresponding grooves 29, 29' disposed at the bottom end of leg 78. The lower (clamping) surface of secure-side wing 74 is lower than (offset from) the lower (clamping) surface of catch-side 76 by a distance=d. Examples of the distance, d, may range from 1-3 mm. The purpose of the vertical offset distance "d" is to accommodate, and compensate for, the tilted spring ledge 57/58 on the catch-side of assembly 18.

Figure 44:
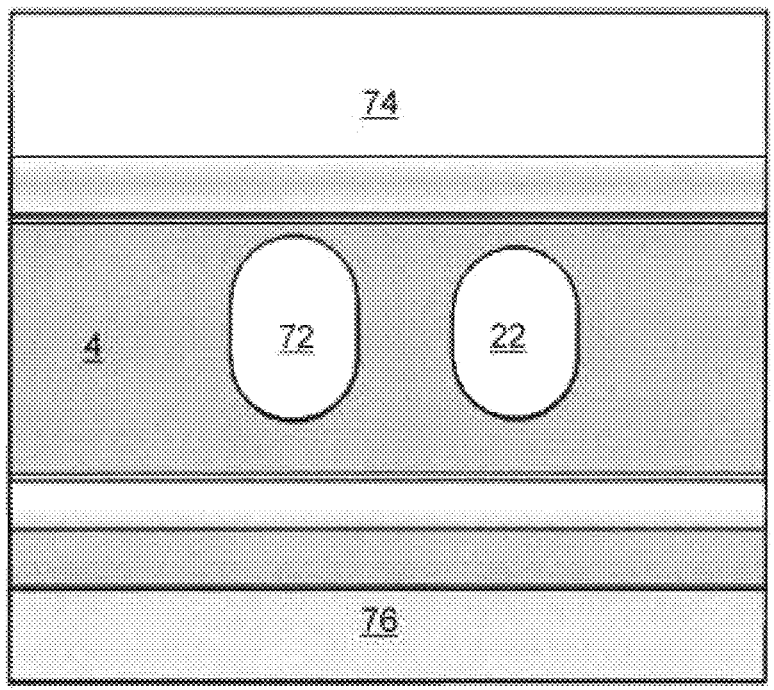
FIG. 44 shows a top view of a cap, according to an embodiment.

FIG. 44 shows a top view of a cap 4, according to an embodiment. Cap 4 includes an extruded body including a horizontal upper portion 82; integral overhanging catch-side wing 74; integral overhanging secure-side wing 76; and integral (downwardly-protruding) vertical support leg 78. Cap 4 includes a pair of slotted apertures 22 and 72 disposed in upper portion 82. One aperture aligns with clamping bolt 1, and the other aperture aligns with height adjustment bolt 3, providing access to pass a tool through to rotate bolt 3. Slotted aperture 72 is slightly longer than slotted aperture 22.

Figure 45:
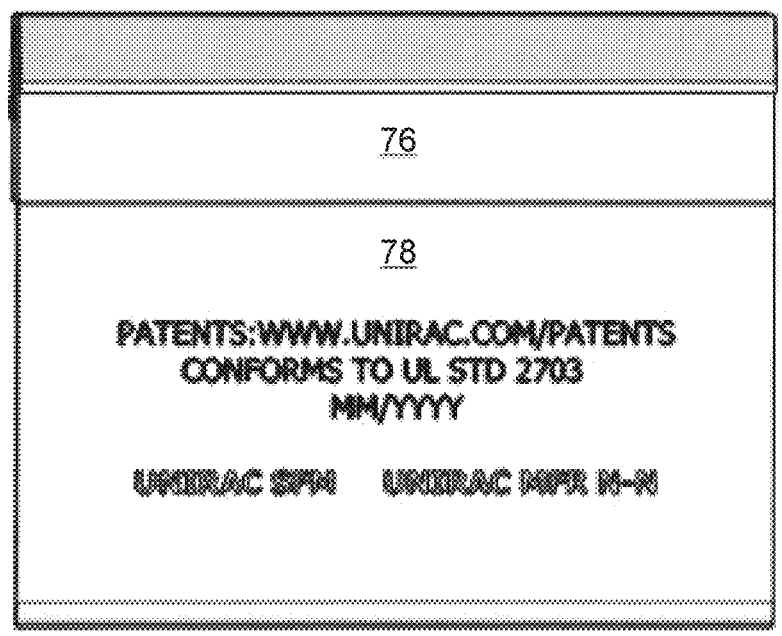
FIG. 45 shows an elevation front view of a cap, according to an embodiment.

FIG. 45 shows an elevation front view of a cap 4, according to an embodiment. Cap 4 includes an extruded body including a horizontal upper portion 82; integral overhanging catch-side wing 74; integral overhanging secure-side wing 76; and integral (downwardly-protruding) vertical support leg 78. Patent virtual marking, Unirac Part Number information, and conformation information may be included. However, in embodiments, such information may be omitted from the vertical support leg 78 and/or any other component.

Figure 46:
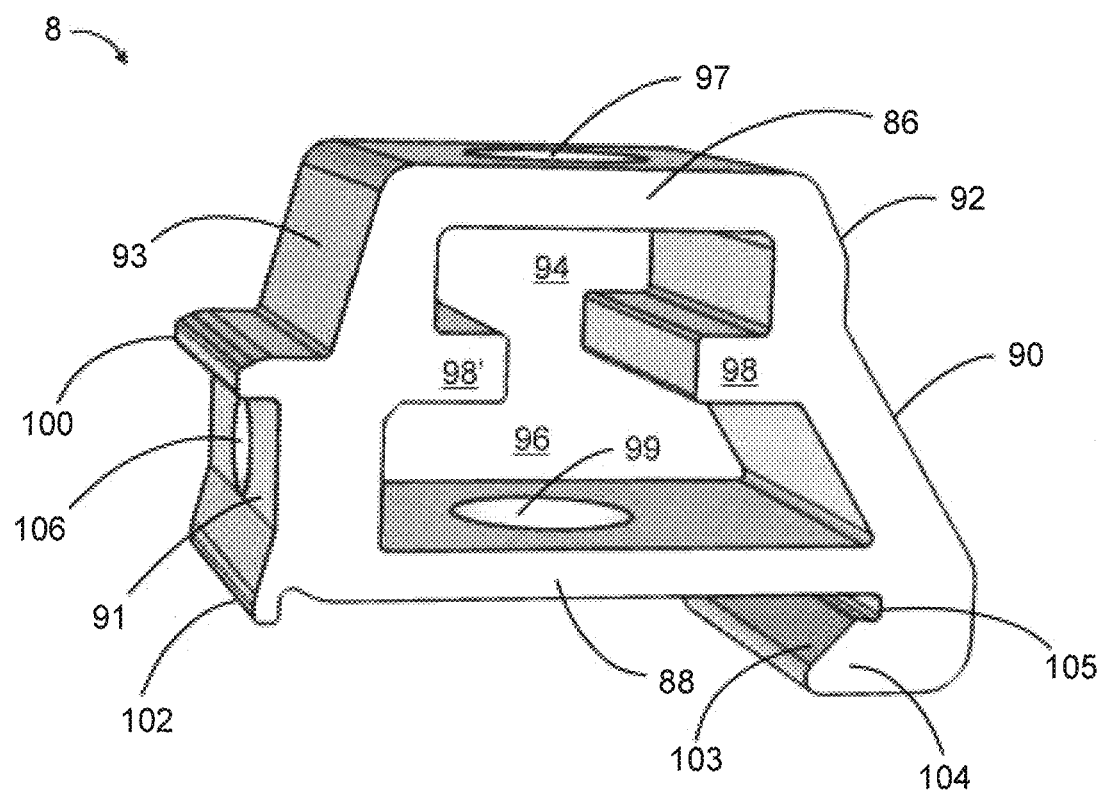
FIG. 46 shows an isometric perspective view of a tower bracket, according to an embodiment.

FIG. 46 shows an isometric perspective view of a tower bracket 8, according to an embodiment. Tower 8 is an extruded body, including: a lower hollow volume 96; and upper hollow volume 94; a lower horizontal portion 88 including a lower aperture 90; an upper horizontal portion 86 including an upper aperture 97; a pair of inwardly-facing wings 98, 98' disposed in-between hollow volumes 94 and 96; a first left-side integral sidewall 91 disposed to the left of lower hollow volume 96; a second left-side integral sidewall 93 disposed to the left of upper hollow volume 94; an first right-side integral sidewall 90 disposed to the right of lower hollow volume 96; a second right-side integral sidewall 92 disposed to the right of upper hollow volume 94; a right-side hook 104 and an inwardly-facing angled ramp 103; a small horizontal recess 105 disposed above hook 104; an outwardly-extending protrusion 100 disposed on the left-side of tower 8; a downwardly-extending protrusion 102 disposed on the bottom left-hand corner of tower 8; and a threaded horizontal aperture 106 disposed through the first left-side sidewall 91. The width of tower 8 is wider at its bottom than at its top. The horizontal distance between inwardly-facing wings 98 and 98' is sufficiently large so that height adjustment bolt 3 may pass through un-impeded. A third hollow volume 95 is disposed in-between wings 98 and 98'.

Figure 47:
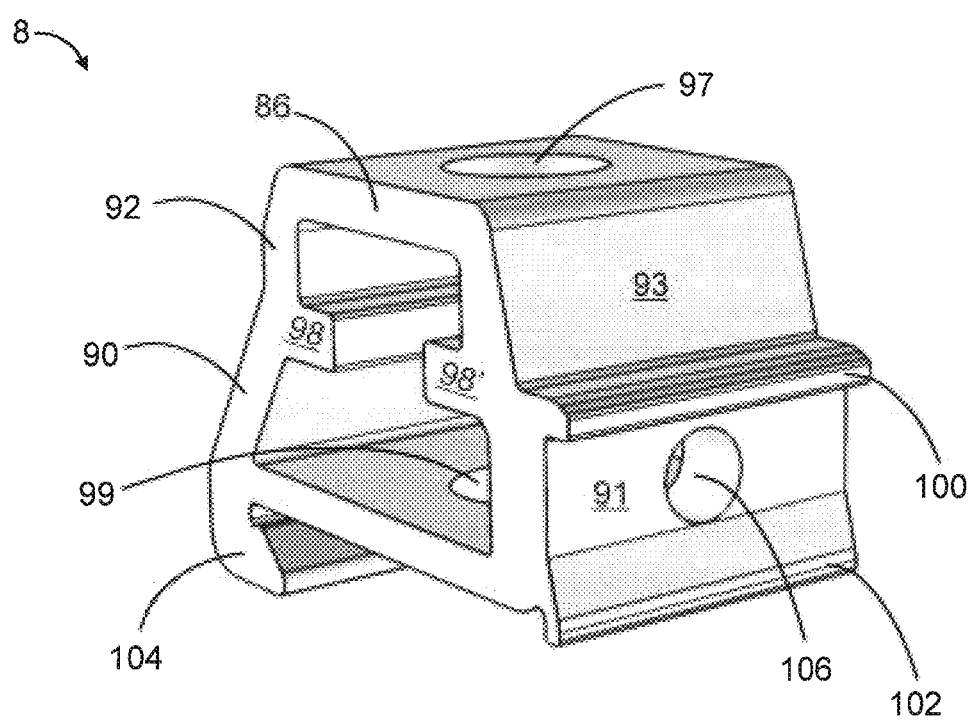
FIG. 47 shows an isometric perspective view of a tower bracket, according to an embodiment.

FIG. 47 shows an isometric perspective view of a tower bracket 8, according to an embodiment. Tower 8 is an extruded body, including: a lower hollow volume 96; and upper hollow volume 94; a lower horizontal portion 88 including a lower aperture 90; an upper horizontal portion 86 including an upper aperture 97; a pair of inwardly-facing wings 98, 98' disposed in-between hollow volumes 94 and 96; a first left-side integral sidewall 91 disposed to the left of lower hollow volume 96; a second left-side integral sidewall 93 disposed to the left of upper hollow volume 94; an first right-side integral sidewall 90 disposed to the right of lower hollow volume 96; a second right-side integral sidewall 92 disposed to the right of upper hollow volume 94; a right-side hook 104 and an inwardly-facing angled ramp 103; a small horizontal recess 105 disposed above hook 104; an outwardly-extending protrusion 100 disposed on the left-side of tower 8; a downwardly-extending protrusion 102 disposed on the bottom left-hand corner of tower 8; and a threaded horizontal aperture 106 disposed through the first left-side sidewall 91. The width of tower 8 is wider at its bottom than at its top. The horizontal distance between inwardly-facing wings 98 and 98' is sufficiently large so that height adjustment bolt 3 may pass through un-impeded. A third hollow volume 95 is disposed in-between wings 98 and 98'.

Figure 48:
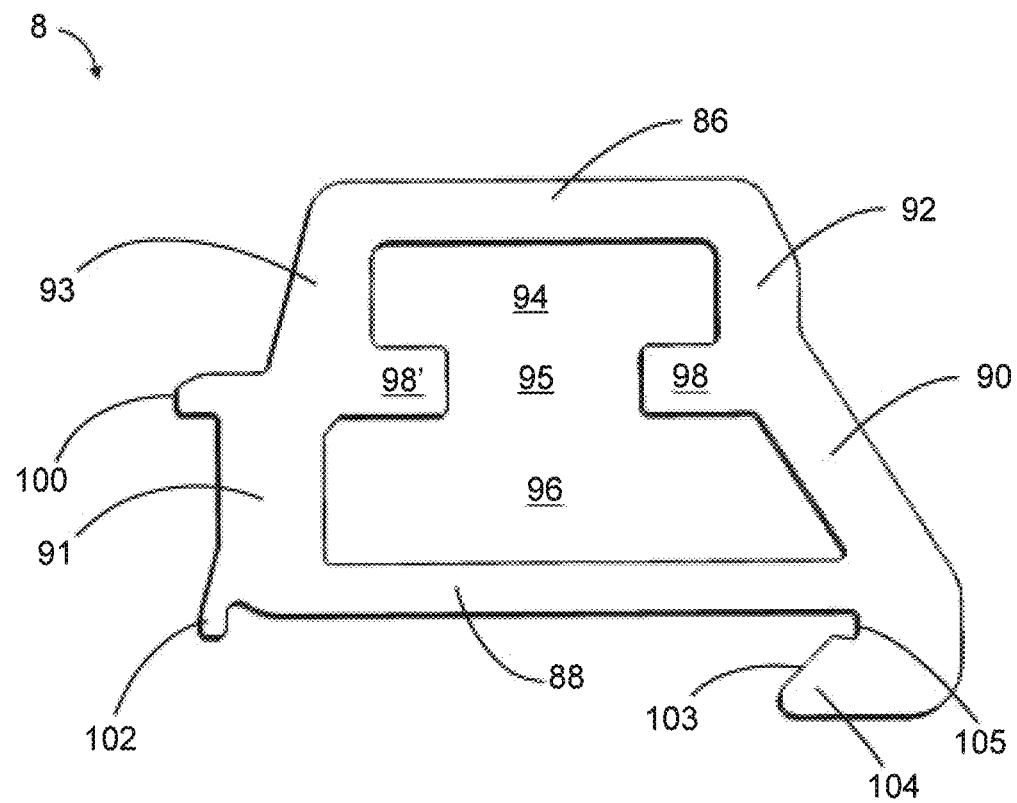
FIG. 48 shows an elevation side view of a tower bracket, according to an embodiment.

FIG. 48 shows an elevation side view of a tower bracket 8, according to an embodiment. Tower 8 is an extruded body, including: a lower hollow volume 96; and upper hollow volume 94; a lower horizontal portion 88 including a lower aperture 99; an upper horizontal portion 86 including an upper aperture 97; a pair of inwardly-facing wings 98, 98' disposed in-between hollow volumes 94 and 96; an first left-side integral sidewall 91 disposed to the left of lower hollow volume 96; a second left-side integral sidewall 93 disposed to the left of upper hollow volume 94; a first right-side integral sidewall 90 disposed to the right of lower hollow volume 96; a second right-side integral sidewall 92 disposed to the right of upper hollow volume 94; a right-side hook 104 and an inwardly-facing angled ramp 103; a small horizontal recess 105 disposed above hook 104; an outwardly-extending protrusion 100 disposed on the left-side of tower 8; and a downwardly-extending protrusion 102 disposed on the bottom left-hand corner of tower 8. The width of tower 8 is wider at its bottom than at its top. The horizontal distance between inwardly-facing wings 98 and 98' is sufficiently large so that height adjustment bolt 3 may pass through un-impeded. A third hollow volume 95 is disposed in-between wings 98 and 98'.

Figure 49:
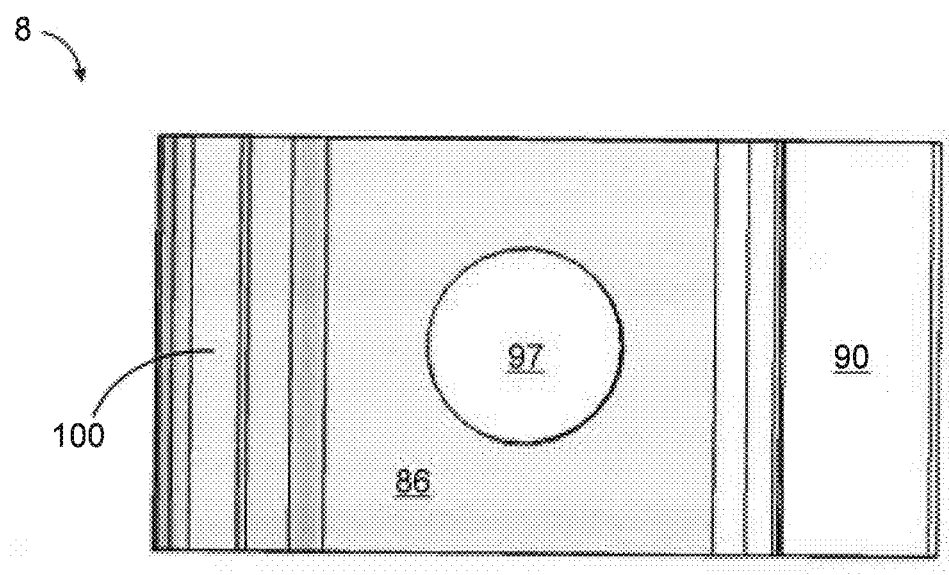
FIG. 49 shows a top view of a tower bracket, according to an embodiment.

FIG. 49 shows a top view of a tower bracket 8, according to an embodiment. Tower 8 includes an upper horizontal portion 86 with a central aperture 97 disposed therethrough, and a first right-side integral sidewall 90.

Figure 50:
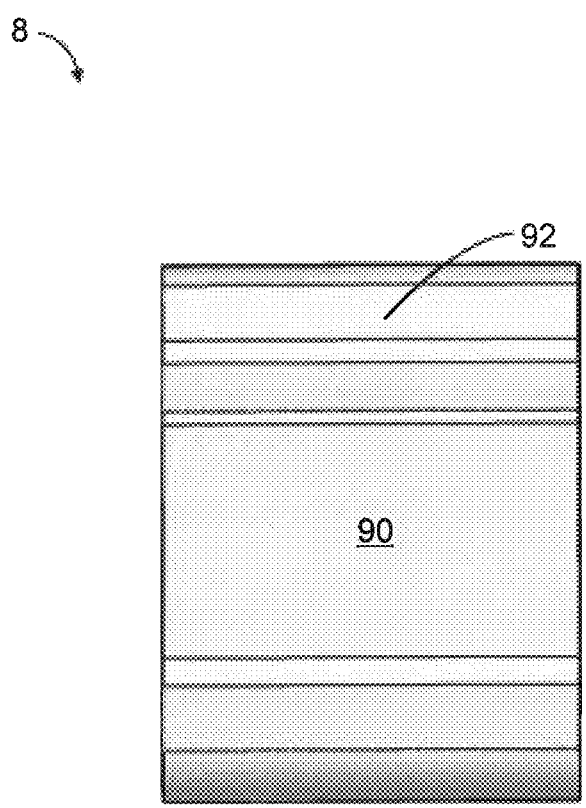
FIG. 50 shows an elevation rear view of a tower bracket, according to an embodiment.

FIG. 50 shows an elevation rear view of a tower bracket 8, according to an embodiment. Tower 8 includes a first right-side integral sidewall 90, and a second right-side integral sidewall 92.

Figure 51:
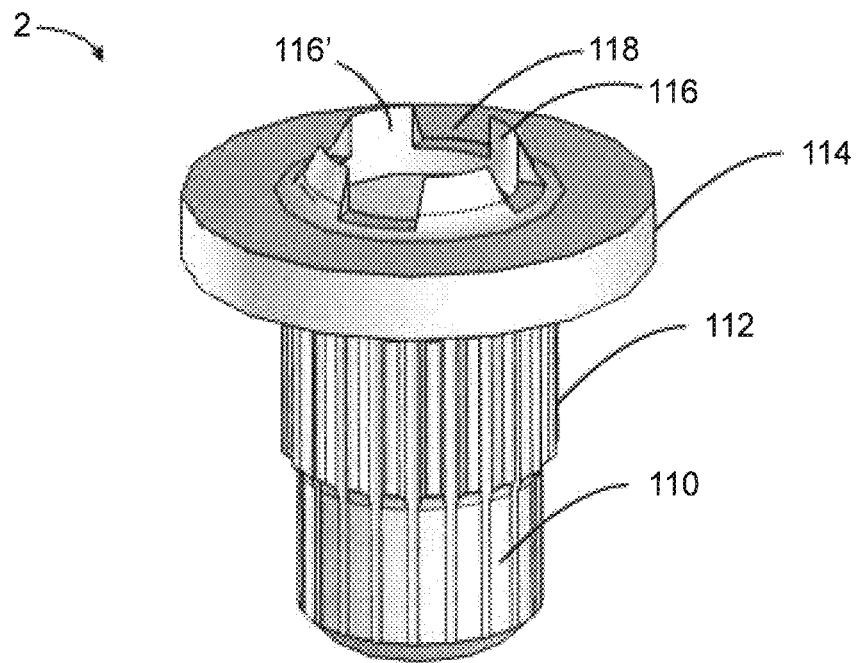
FIG. 51 shows an isometric perspective view of an electrical bonding pin, according to an embodiment.
Figure 52:
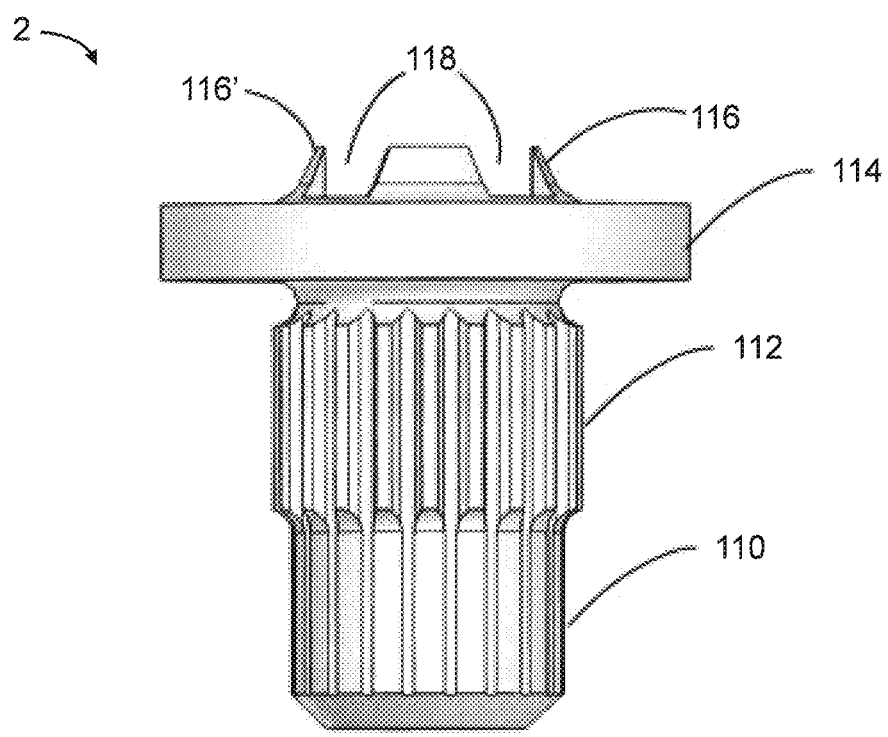
FIG. 52 shows an elevation side view of an electrical bonding pin, according to an embodiment.

FIG. 51 shows an isometric perspective view of an electrical bonding pin 2, according to an embodiment. Pin 2, which may be made of stainless steel, is generally-cylindrical with a plurality of vertical knurlings (ridges and grooves) 112 disposed on an outer circumference of solid cylinder 110. Pin 2 is swaged into hole 70 in base 6 (see FIG. 35). At the top of cylinder 110 is a horizontal disk 114 with a plurality of sharp projections 116, 116', etc. disposed on top of disk 114. The diameter of disk 114 is greater than the diameter of cylinder 110. The plurality of sharp projections 116, 116' may include a cylindrical protrusion that has a plurality of cuts 118 around the cylindrical protrusion that leave the plurality of sharp projections 116, 116'. Sharp projections 116 may be ground to a sharp point or a sharp line (like a razor blade), as shown in FIGS. 51 and 52. Sharp projections 116, 116' may protrude approximately 0.5-1.0 mm from the surface of disk 114.

FIG. 52 shows an elevation side view of an electrical bonding pin 2, according to an embodiment. Pin 2, which may be made of stainless steel, is generally-cylindrical with a plurality of vertical knurlings (ridges and grooves) 112 disposed on an outer circumference of solid cylinder 110. Pin 2 is swaged into hole 70 in base 6 (see FIG. 35). At the top of cylinder 110 is a horizontal disk 114 with a plurality of sharp projections 116, 116', etc. disposed on top of disk 114. The diameter of disk 114 is greater than the diameter of cylinder 110. The plurality of sharp projections 116, 116' may include a cylindrical protrusion that has a plurality of cuts 118 around the cylindrical protrusion that leave the plurality of sharp projections 116, 116'. Sharp projections 116, 116' may be ground to a sharp point or a sharp line (like a razor blade), as shown in FIGS. 51 and 52. Sharp projections 116, 116' may protrude approximately 0.2-1.0 mm from the surface of disk 114.

Figure 53:
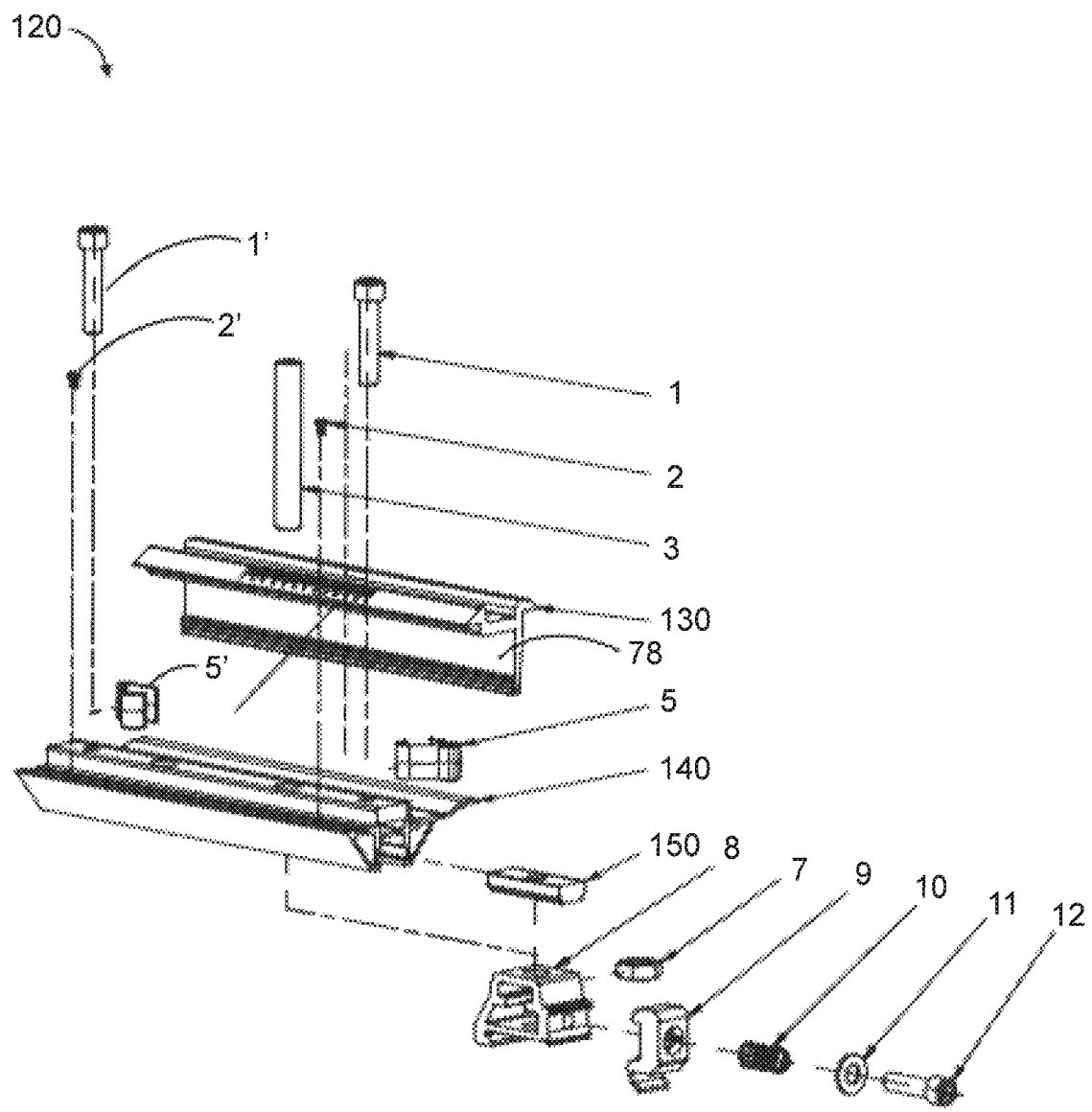
FIG. 53 shows an exploded isometric perspective view of an extended, rail-less, indexable mounting assembly, according to an embodiment.

FIG. 53 shows an exploded isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. In an embodiment, the assembly may include more than two clamping bolts and/or less than two clamping bolts. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2 disposed in a horizontal groove 30. Height adjustment bolt 3 passes through aperture in base 140, and engages threaded sliding nut 150. Clamping bolts 1, 1' engages threaded apertures in base 140. Rotation of bolt 3 about its longitudinal axis causes base 140 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened.

Figure 54:
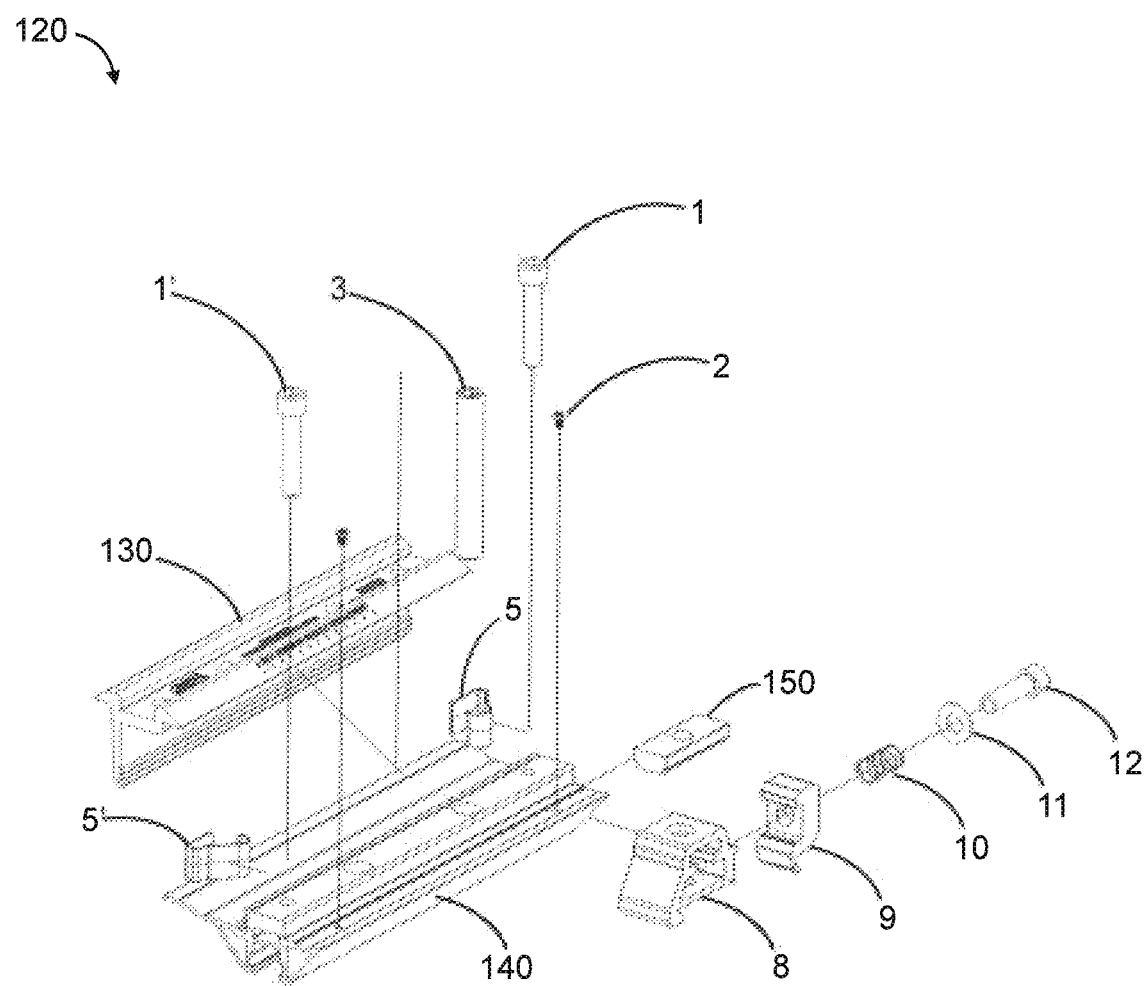
FIG. 54 shows an exploded isometric perspective view of an extended, rail-less, indexable mounting assembly, according to an embodiment.

FIG. 54 shows an exploded isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 140 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened.

Figure 55:
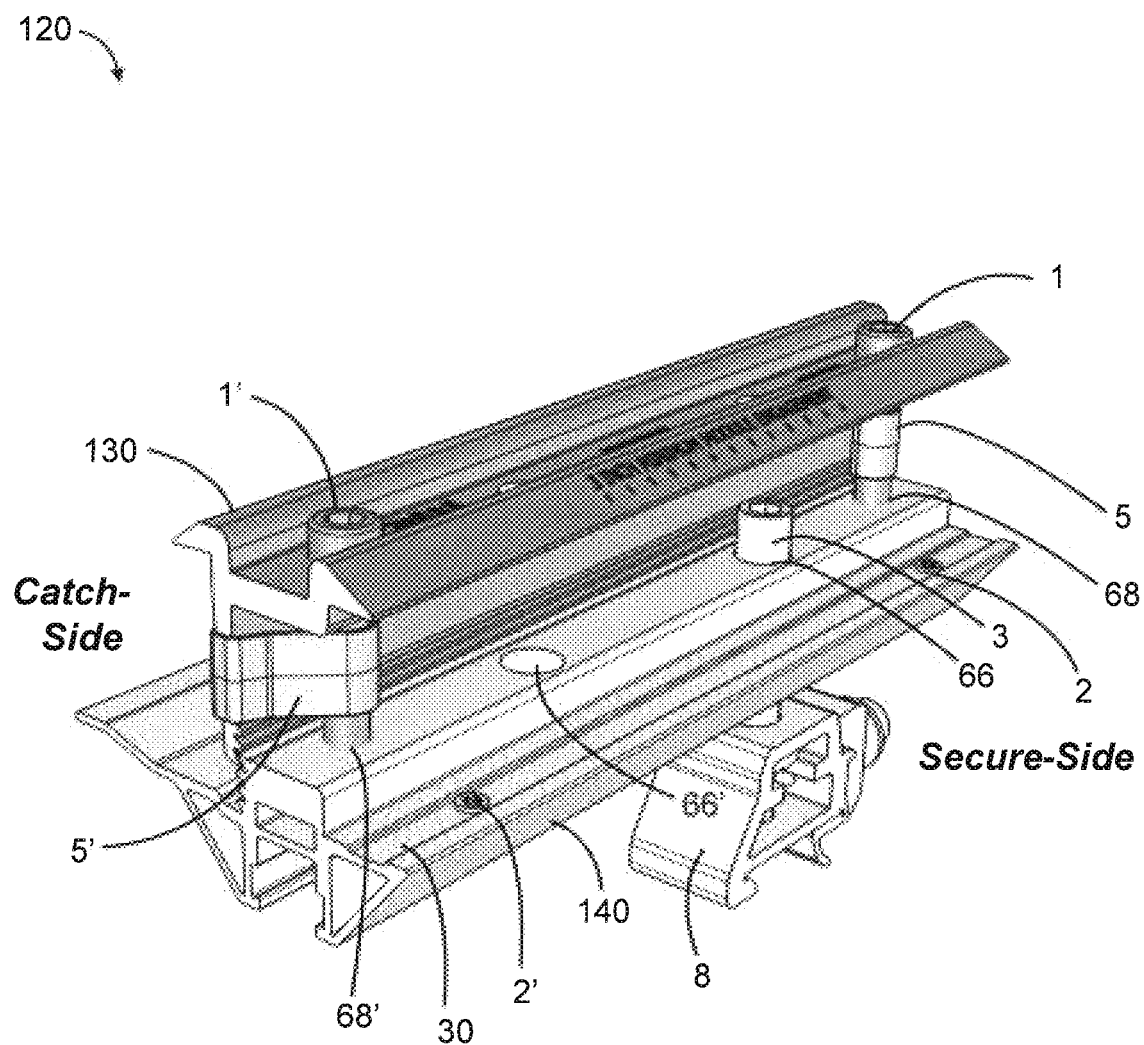
FIG. 55 shows an isometric perspective view of an extended, rail-less, indexable mounting assembly, according to an embodiment.

FIG. 55 shows an isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 140 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened.

Figure 56:
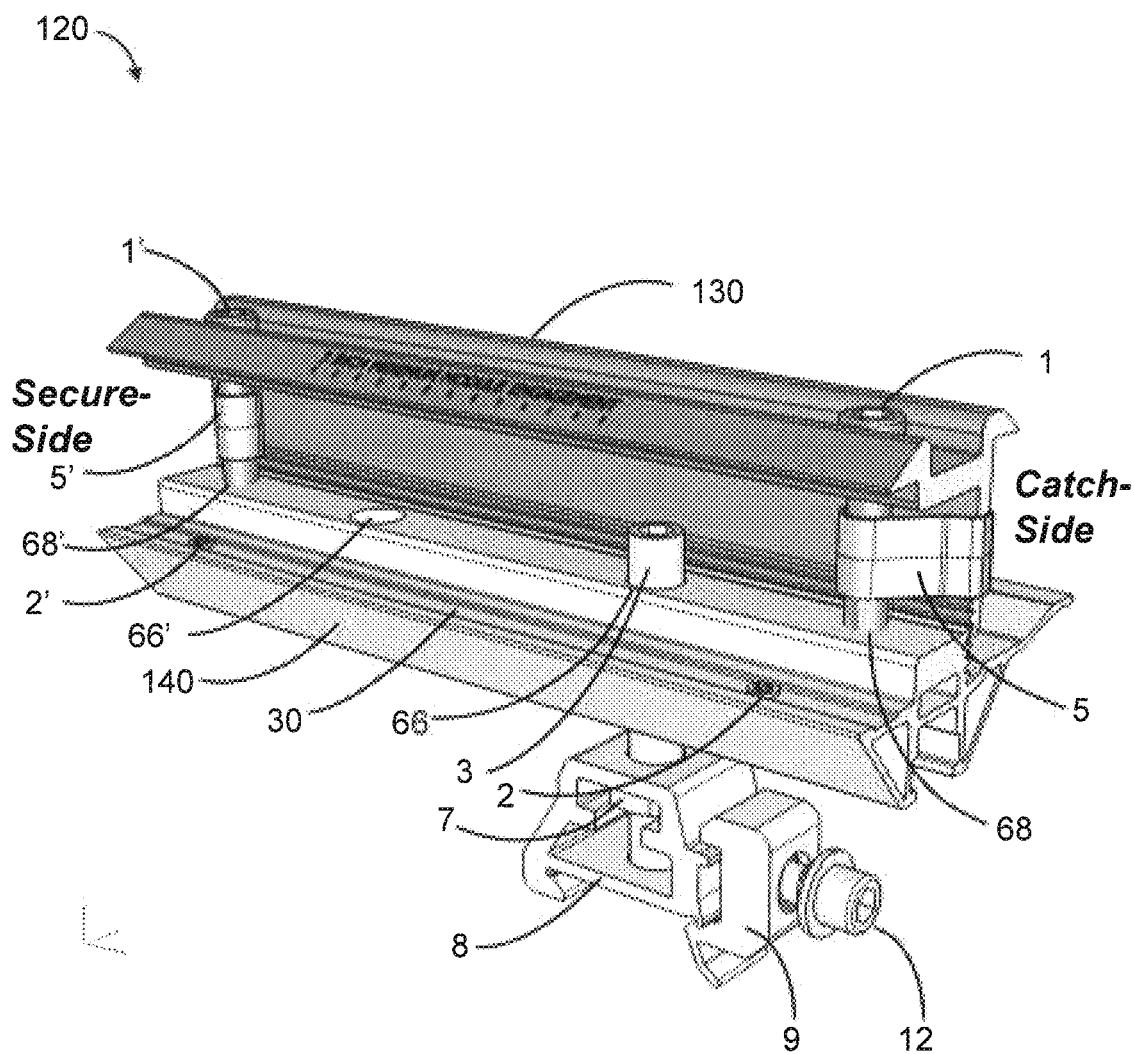
FIG. 56 shows an isometric perspective view of an extended, rail-less, indexable mounting assembly, according to an embodiment.

FIG. 56 shows an isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 relative to clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 140 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened.

Figure 57:
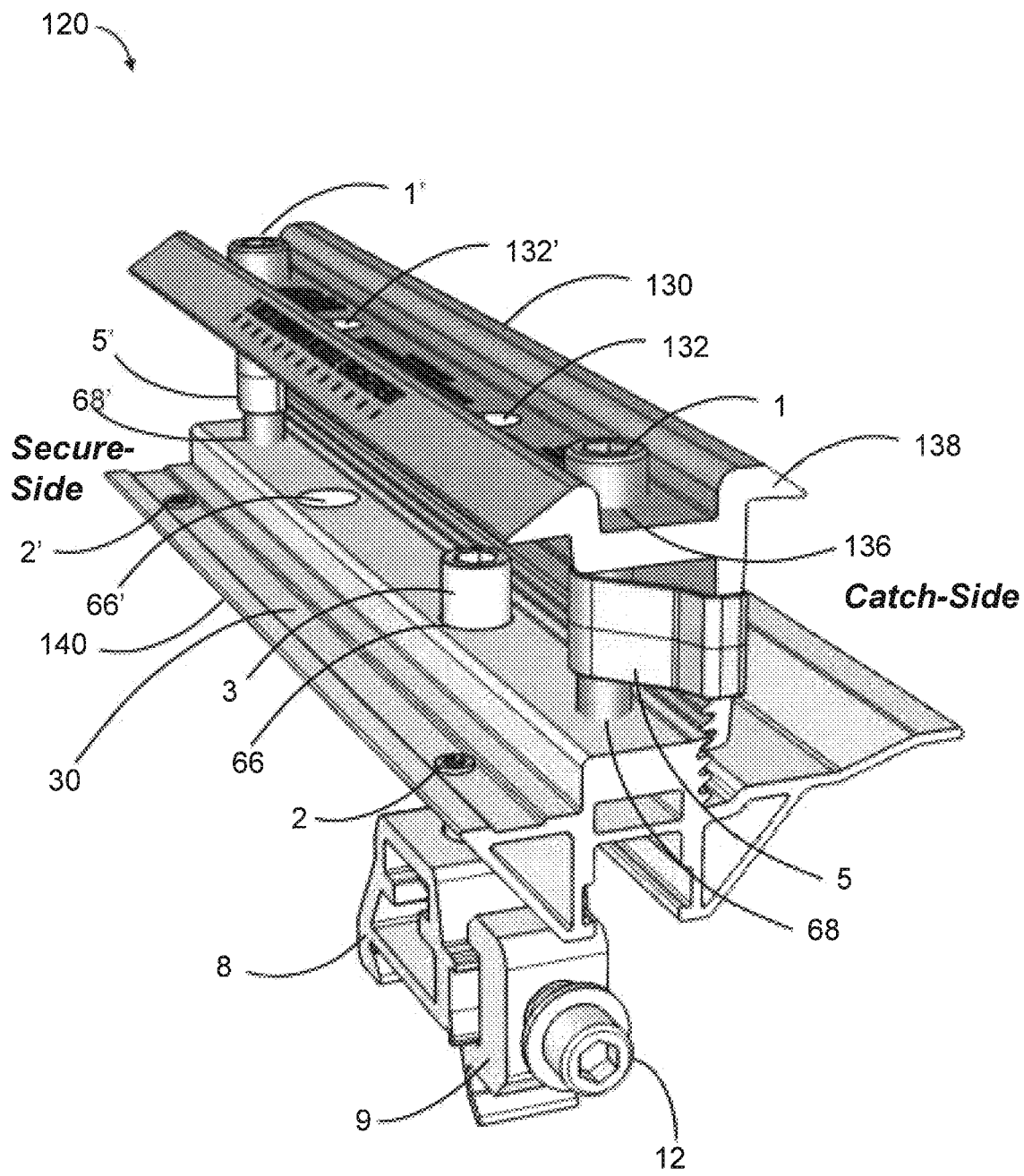
FIG. 57 shows an isometric perspective view of an extended, rail-less, indexable mounting assembly, according to an embodiment.

FIG. 57 shows an isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 140 to move up or down. The lower end of height adjustment bolt 3 is held by a pair of un-threaded apertures in tower bracket 8.

Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened.

Figure 58:
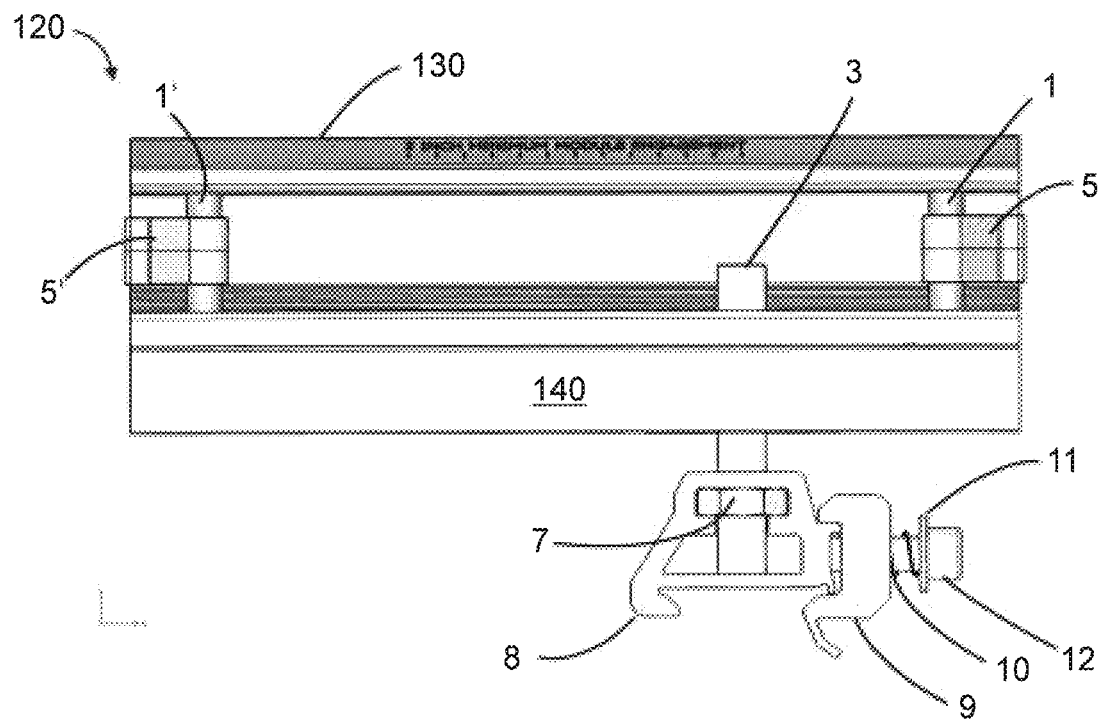
FIG. 58 shows an elevation side view of an extended, rail-less, indexable mounting assembly, according to an embodiment.

FIG. 58 shows an elevation side view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 140 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened.

Figure 59A:
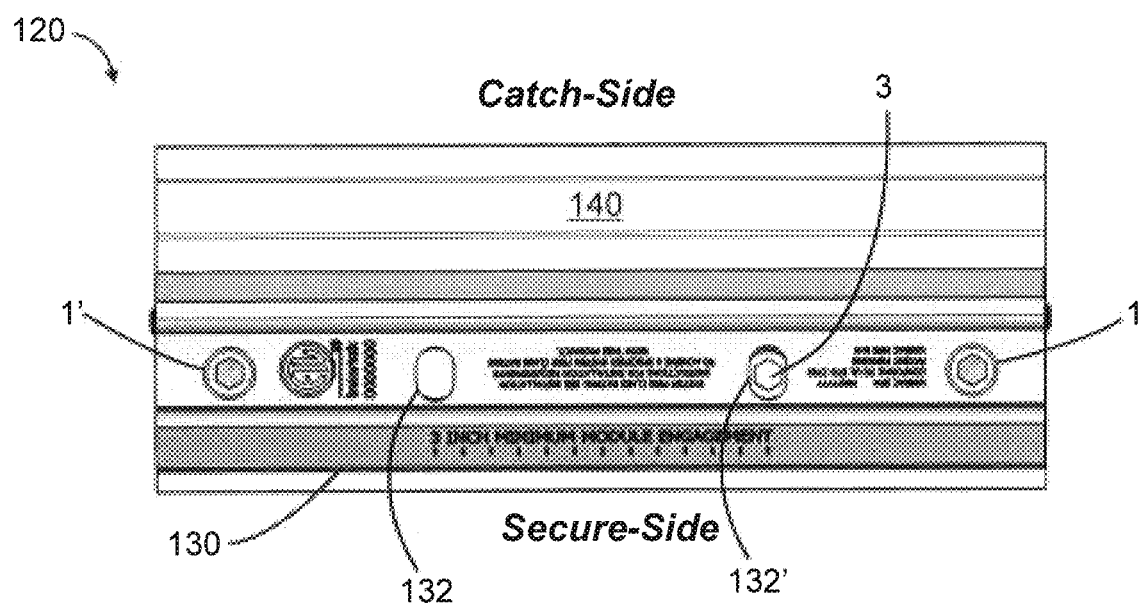
FIG. 59A shows a top view of an extended, rail-less, indexable mounting assembly, according to an embodiment.

FIG. 59A shows a top view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 140 to move up or down. The lower end of height adjustment bolt 3 is held by a pair of un-threaded apertures in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 when bolt 12 is tightened. Cap 130 further includes a pair of slotted apertures 132, 132' for providing access for a hexagonal tool (not shown) to rotate height adjustment bolt 3 through apertures 132 or 132', depending on the longitudinal location of the single height adjustment bolt 3.

Figure 59B:
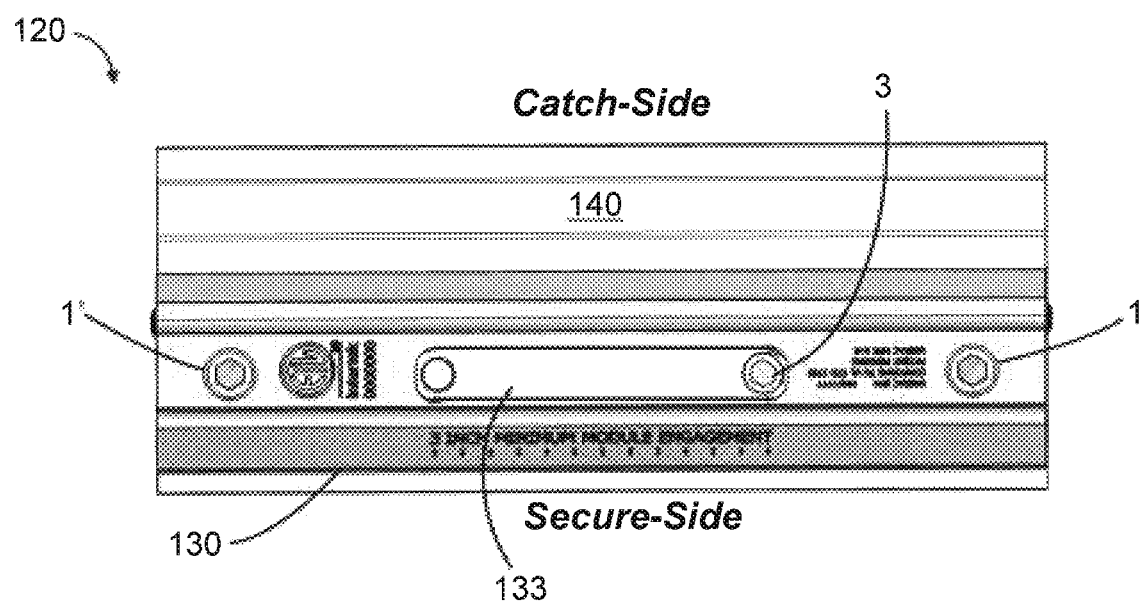
FIG. 59B shows a top view of an extended, rail-less, indexable mounting assembly, according to an embodiment.

FIG. 59B shows a top view of an extended, rail-less, indexable mounting assembly 120, according to an embodiment. In such an embodiment, the pair of slotted apertures 132, 132' may optionally be replaced by a single slot 133 that goes across the entire distance in-between previous apertures 132 and 132'.

Figure 60:
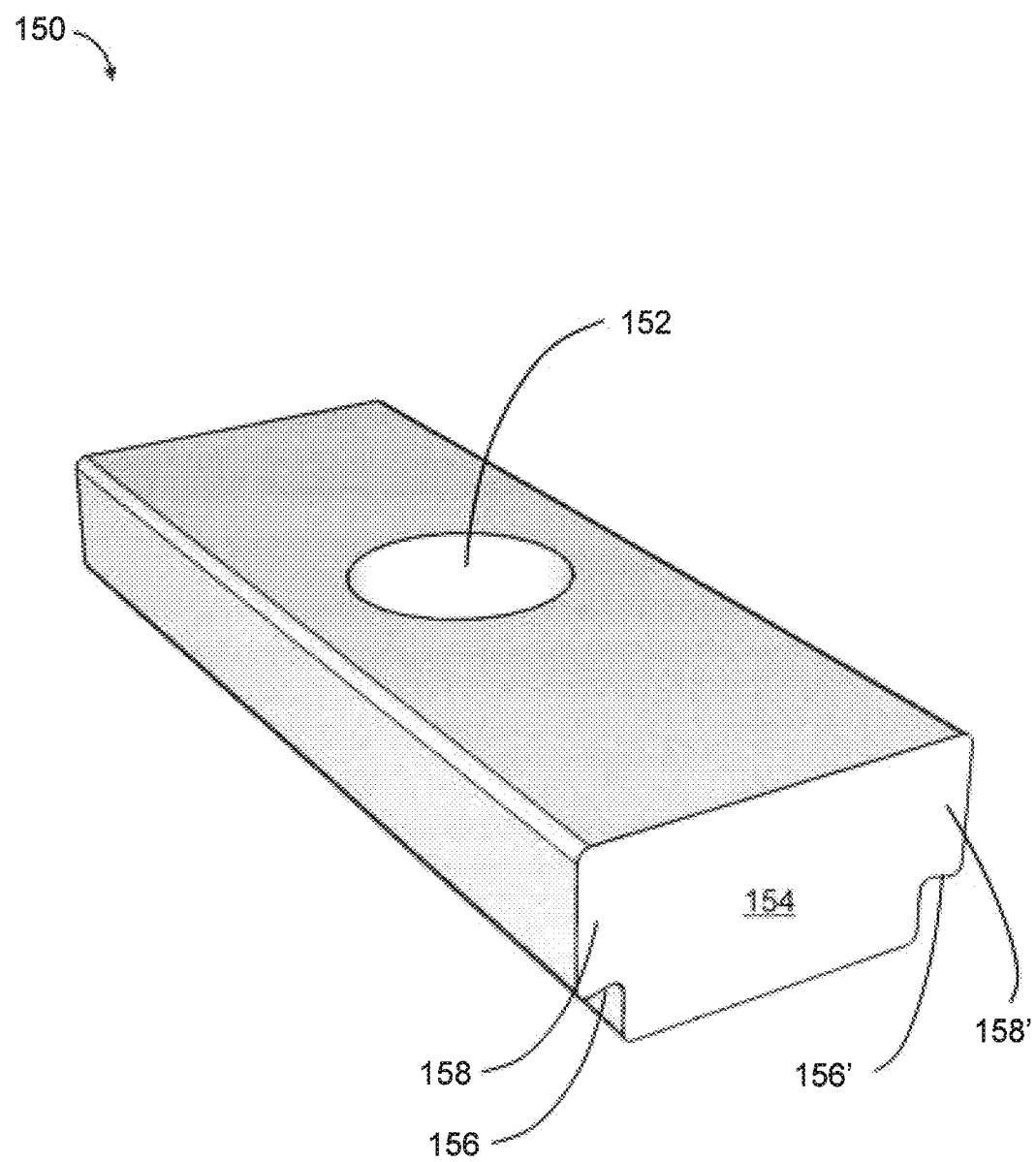
FIG. 60 shows an isometric perspective view of a sliding nut, according to an embodiment.

FIG. 60 shows an isometric perspective view of a sliding nut 150, according to an embodiment. Sliding nut 150 includes an extruded body 154, including a threaded aperture 152, and a pair of overhanging wings 158, 158' located above a pair of corners 156, 156', respectively.

Figure 61:
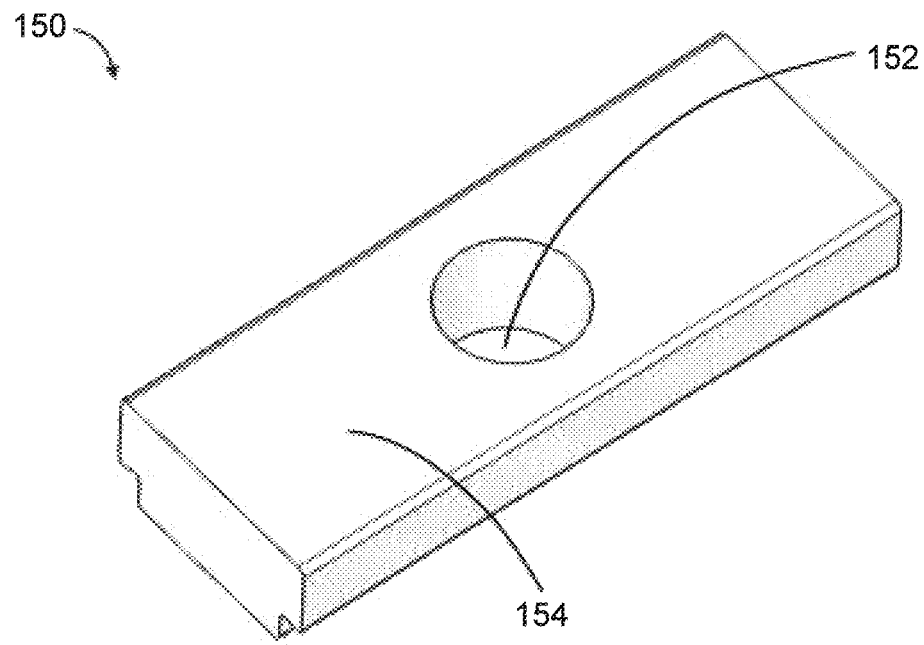
FIG. 61 shows an isometric perspective view of a sliding nut, according to an embodiment.

FIG. 61 shows an isometric perspective view of a sliding nut 150, according to an embodiment. Sliding nut 150 includes an extruded body 154, including a threaded aperture 152, and a pair of overhanging wings 158, 158' located above a pair of corners 156, 156', respectively.

Figure 62:
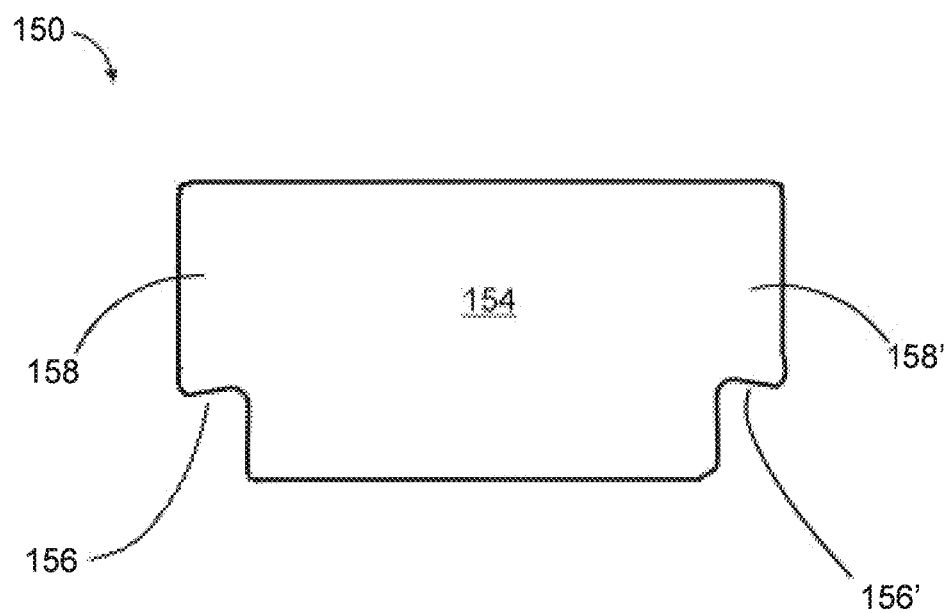
FIG. 62 shows an elevation end view of a sliding nut, according to an embodiment.

FIG. 62 shows an elevation end view of a sliding nut 150, according to an embodiment. Sliding nut 150 includes an extruded body 154, including a threaded aperture 152, and a pair of overhanging wings 158, 158' located above a pair of corners 156, 156', respectively.

Figure 63:
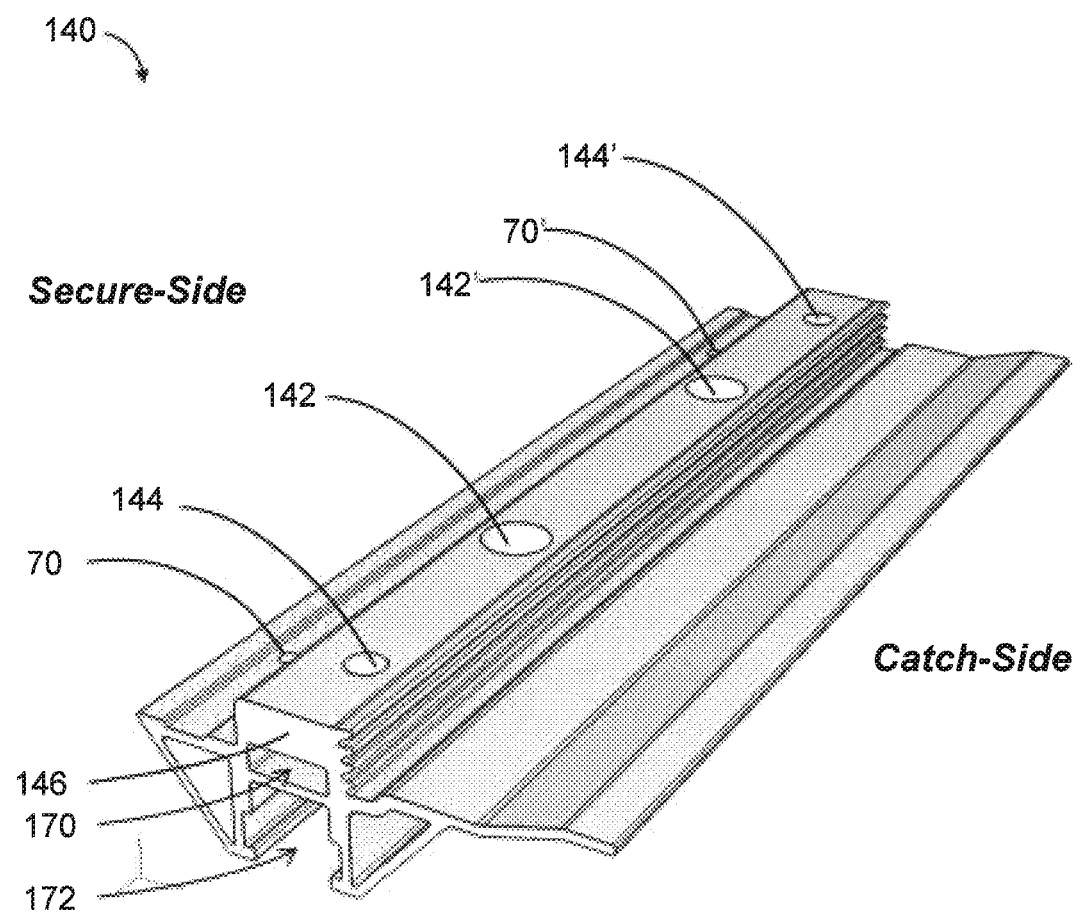
FIG. 63 shows an isometric perspective view of an extended base, according to an embodiment.

FIG. 63 shows an isometric perspective view of an extended base 140, according to an embodiment. Base 140 includes an extruded body including a pair of threaded apertures 144, 144' for engaging a pair of clamping bolts 1, 1', respectively; and a pair of threaded apertures 142, 142' for engaging a single height adjustment bolt 3 (depending on which aperture the bolt 3 is located within). All four apertures are disposed in an upper horizontal portion 146. Base 140 further includes an upper horizontal hollow volume 170, and a lower horizontal hollow volume 172 that is open on its bottom end. Base 140 further includes a pair of holes 70, 70' for holding electrical bonding pins 2, 2', respectively.

Figure 64:
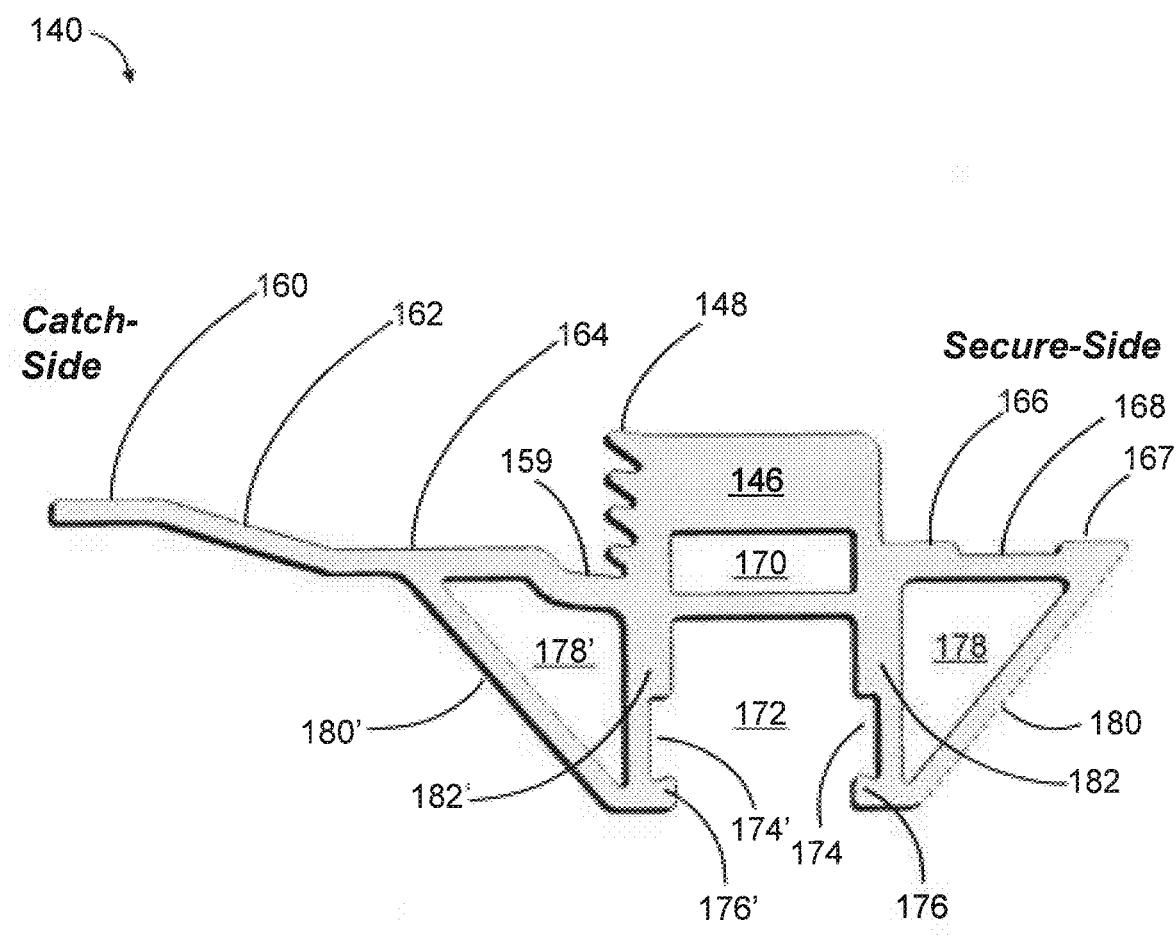
FIG. 64 shows an elevation end view of an extended base, according to an embodiment.

FIG. 64 shows an elevation end view of an extended base 140, according to an embodiment. Base 140 includes an extruded body including a pair of threaded apertures 144, 144' for engaging a pair of clamping bolts 1, 1', respectively; and a pair of threaded apertures 142, 142' for engaging a single height adjustment bolt 3 (depending on which aperture the bolt 3 is located within). All four apertures are disposed in an upper horizontal portion 146. Base 140 further includes an upper horizontal hollow volume 170, and a lower horizontal hollow volume 172 that is open on its bottom end. Lower horizontal hollow volume 172 includes a pair of recesses 174, 174' and bottom shoulders 176, 176', respectively sized to match the dimensions of sliding nut 150 (with a small clearance between them).

Figure 65:
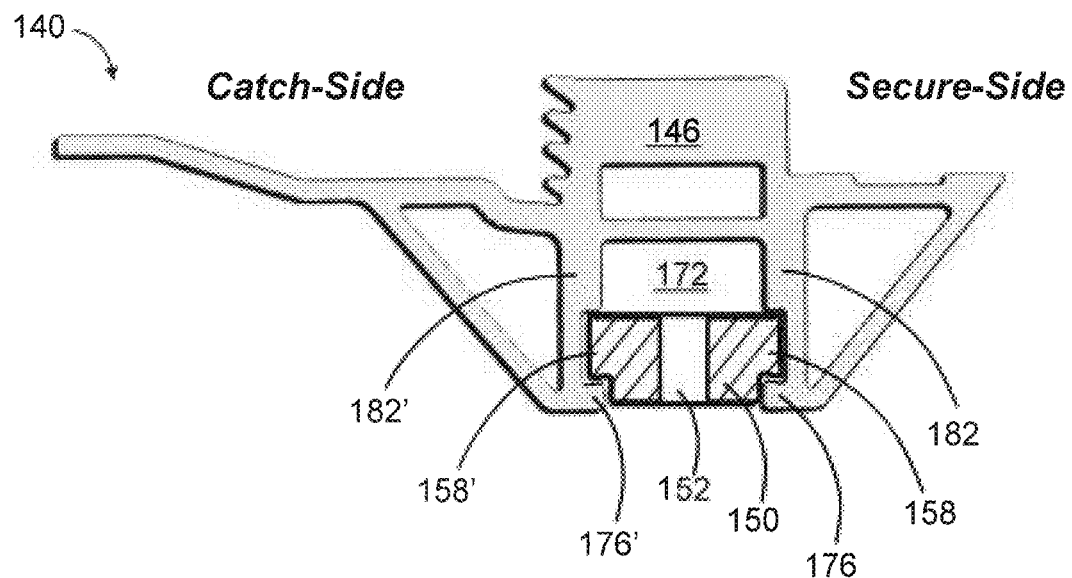
FIG. 65 shows an elevation end view of an extended base, according to an embodiment.

FIG. 65 shows an elevation end view of an extended base 140, according to an embodiment. Lower horizontal hollow volume 172 includes a pair of recesses 174, 174' and bottom shoulders 176, 176', respectively sized to match the dimensions of sliding nut 150 (with a small clearance between them to allow nut 150 to slide freely in the slot 172) Wings 158, 158' of nut 150 rest on shoulders 176, 176', respectively, of base 140. In other words, wings 158, 158' are disposed inside of recesses 174, 174' of base 140. Sliding nut 150 has a threaded aperture 152.

Figure 66:
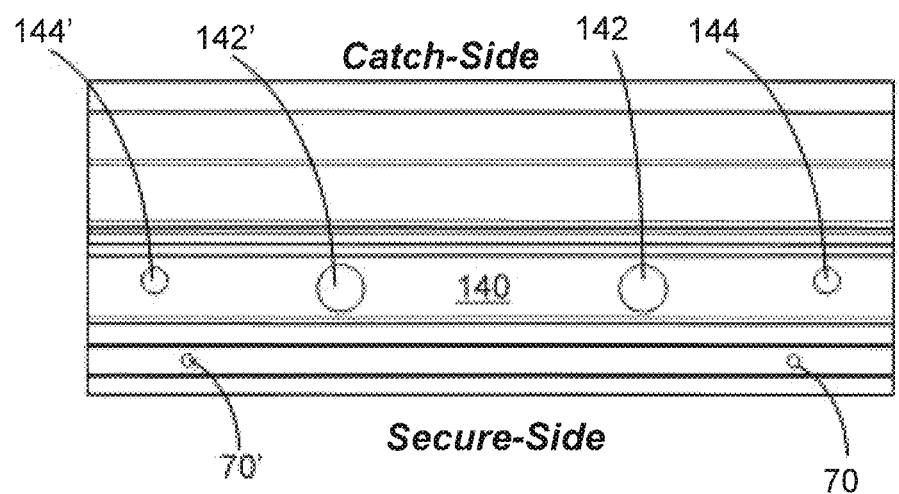
FIG. 66 shows top view of an extended base, according to an embodiment.

FIG. 66 shows top view of an extended base 140, according to an embodiment. Base 140 includes an extruded body including a pair of threaded apertures 144, 144' for engaging a pair of clamping bolts 1, 1', respectively; and a pair of threaded apertures 142, 142' for engaging a single height adjustment bolt 3 (depending on which aperture the bolt 3 is located within). Base 140 further includes a pair of holes 70, 70' for holding electrical bonding pins 2, 2', respectively.

Figure 67:
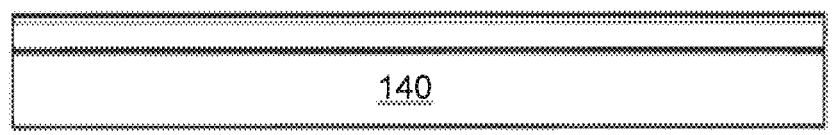
FIG. 67 shows an elevation side view of an extended base, according to an embodiment.

FIG. 67 shows an elevation side view of an extended base 140, according to an embodiment.

Figure 68:
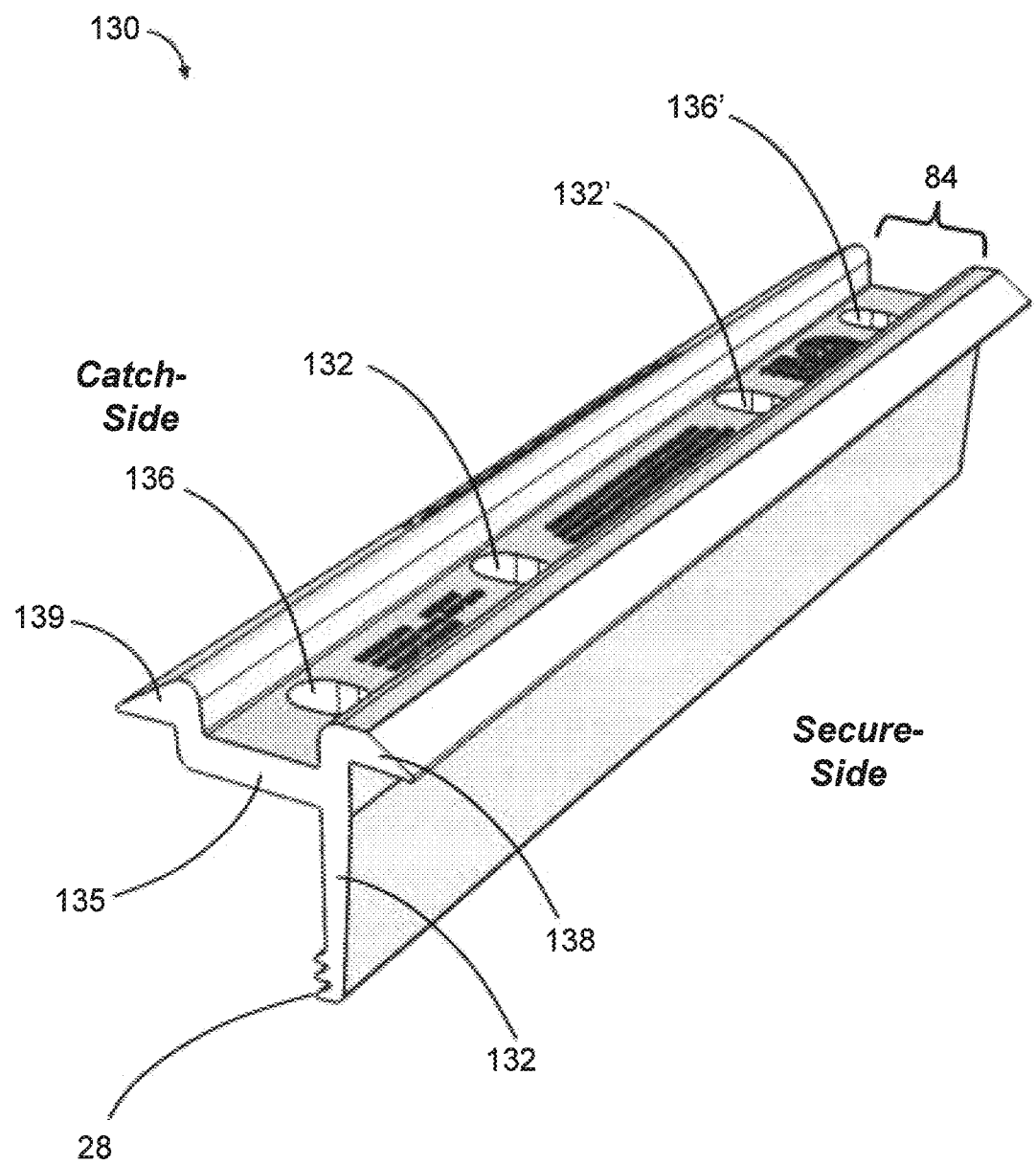
FIG. 68 shows an isometric perspective view of an extended cap, according to an embodiment.

FIG. 68 shows an isometric perspective view of an extended cap 130, according to an embodiment. Extended cap 130 includes an extruded body, including a horizontal upper portion 135, an integral overhanging secure-side wing 138 and an integral overhanging catch-side wing 139, an integral vertical support leg 132, and a plurality of inwardly-facing corrugations (teeth) 28, 28' (with corresponding grooves 29 disposed in-between adjacent teeth 28, 28'). Cap 130 includes four slotted apertures: apertures 132, 132' for accessing height adjustment bolt 3 with a hexagonal tool; and apertures 136, 136' for passing through a clamping bolt 1, 1'. Cap 130 further includes a recess 84 disposed in-between the pair of wings 138, 139.

Figure 69:
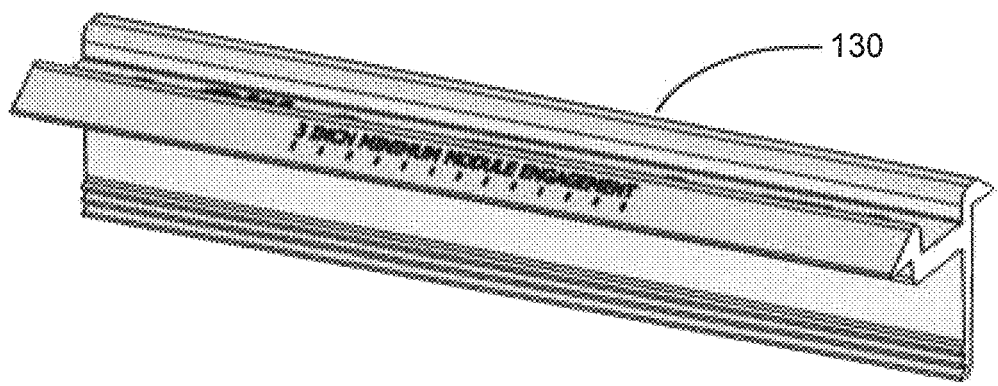
FIG. 69 shows an isometric perspective view of an extended cap, according to an embodiment.

FIG. 69 shows an isometric perspective view of an extended cap, according to an embodiment.

Figure 70:
FIG. 70 shows an elevation side view of an extended cap, according to an embodiment.

FIG. 70 shows an elevation side view of an extended cap, according to an embodiment.

Figure 71:
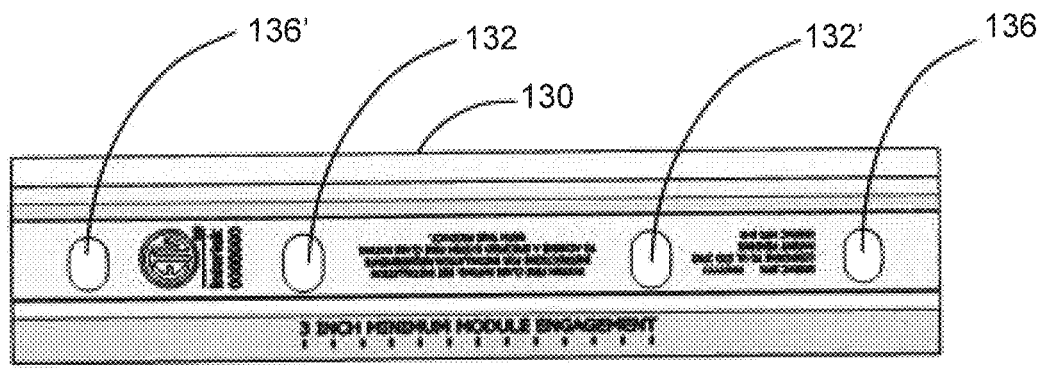
FIG. 71 shows a top view of an extended cap, according to an embodiment.

FIG. 71 shows a top view of an extended cap, according to an embodiment. Cap 130 includes four slotted apertures: apertures 132, 132' for accessing height adjustment bolt 3 with a hexagonal tool; and apertures 136, 136' for passing through a clamping bolt 1, 1'.

Figure 72:
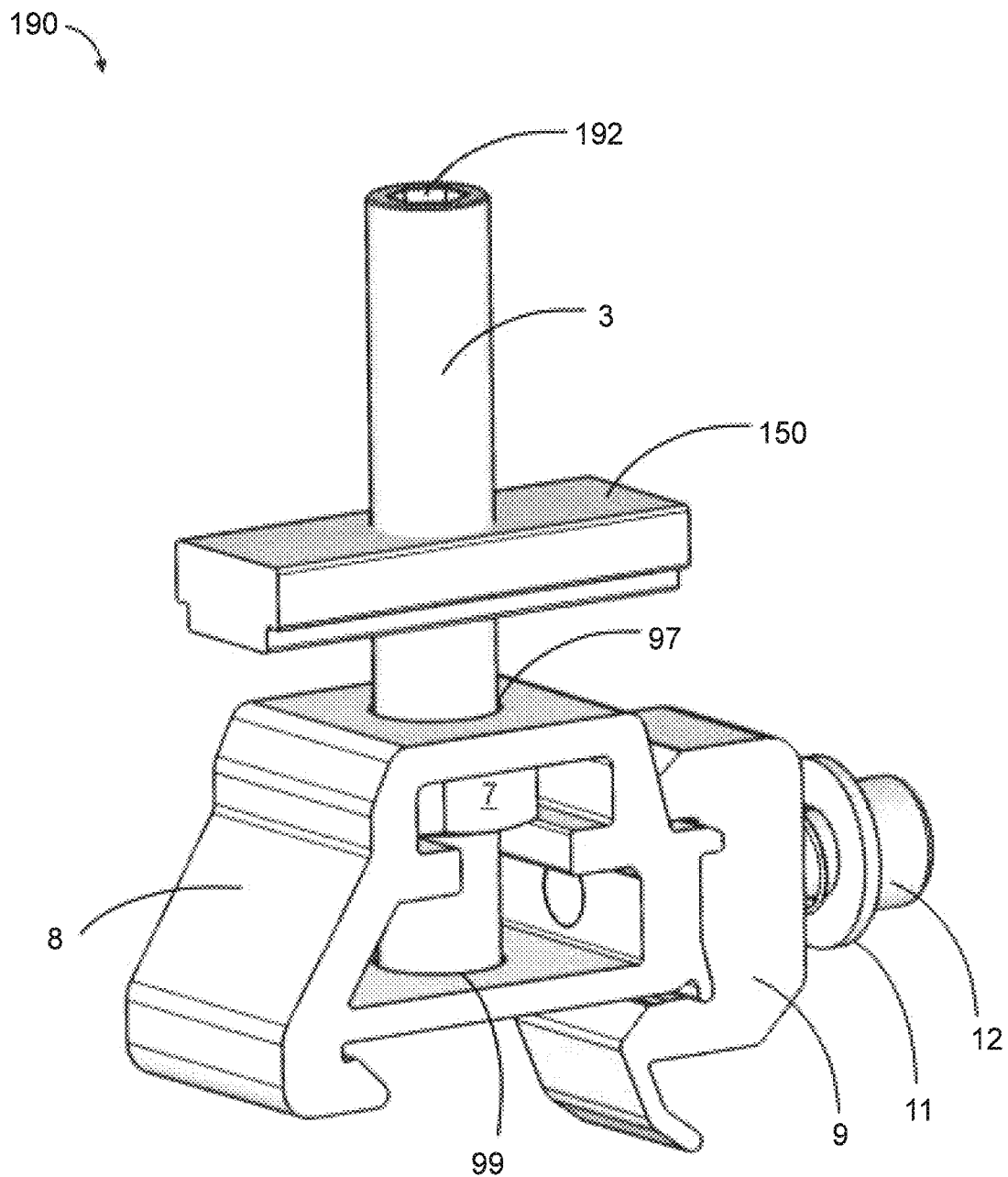
FIG. 72 shows an isometric perspective view of an extended, rail-less, indexable mounting assembly, according to an embodiment.

FIG. 72 shows an isometric perspective view of an extended, rail-less, indexable mounting assembly 190, according to an embodiment. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 73:
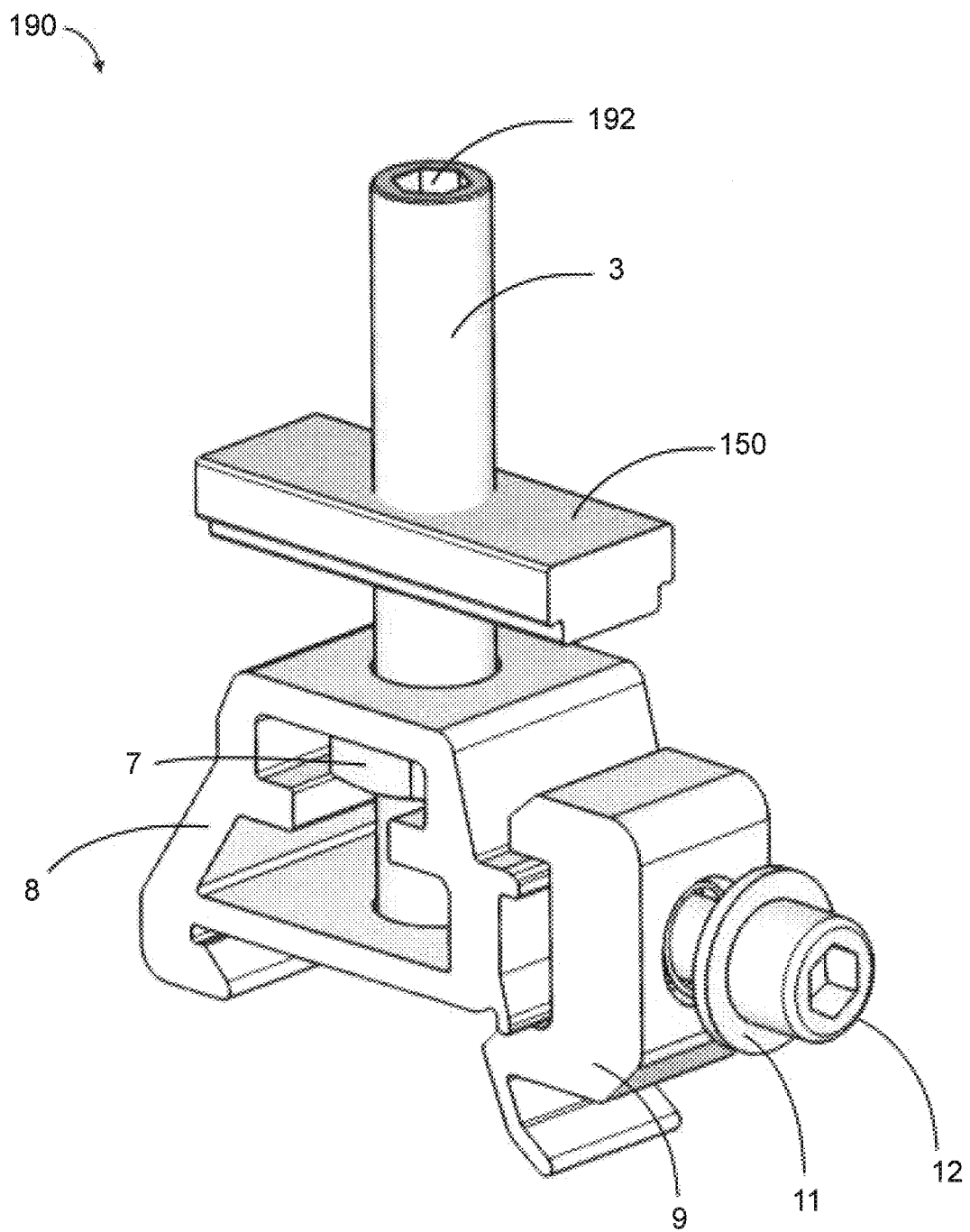
FIG. 73 shows an isometric perspective view of an extended, rail-less, indexable mounting assembly, according to an embodiment.

FIG. 73 shows an isometric perspective view of an extended, rail-less, indexable mounting assembly 190, according to an embodiment. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 74:
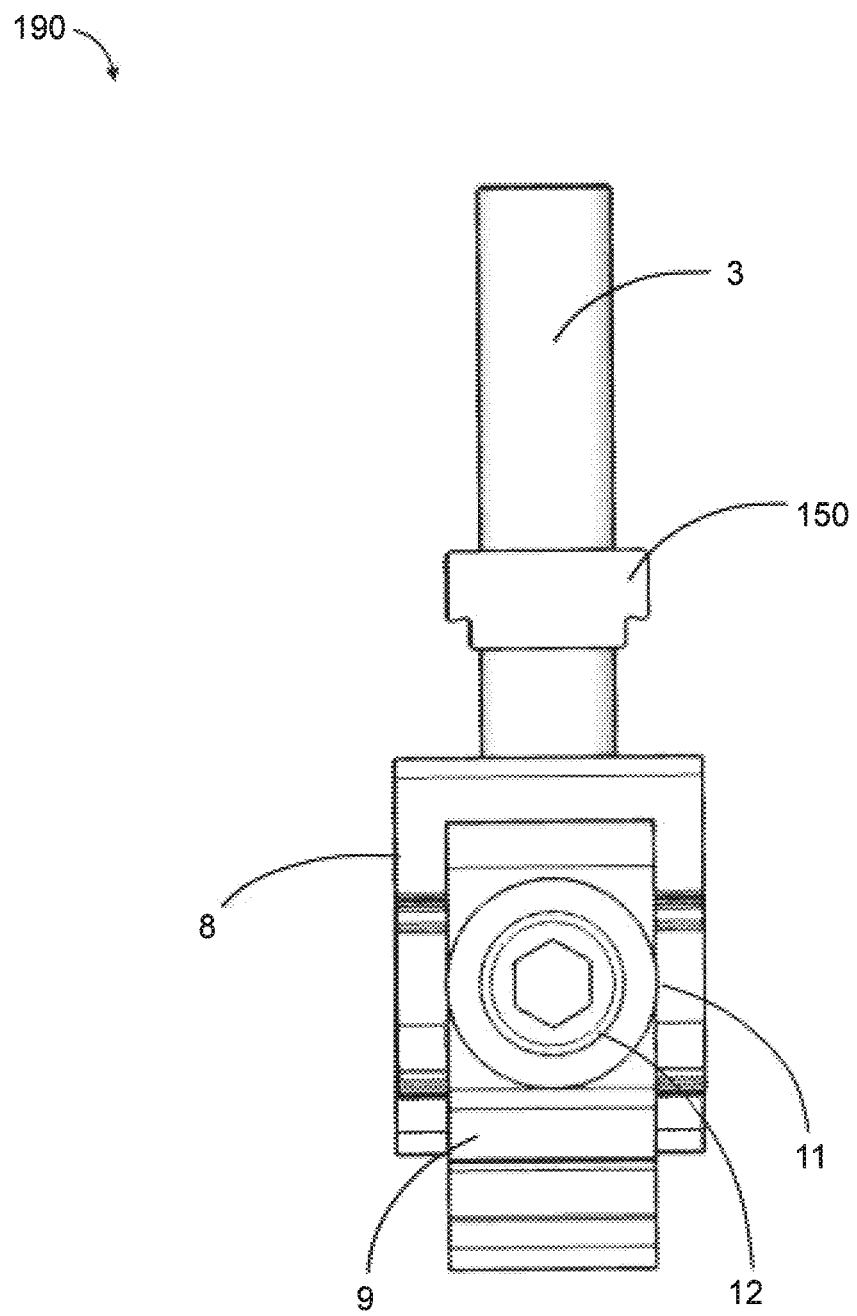
FIG. 74 shows an elevation end view of an extended, rail-less, indexable mounting assembly, according to an embodiment.

FIG. 74 shows an elevation end view of an extended, rail-less, indexable mounting assembly 190, according to an embodiment. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 75:
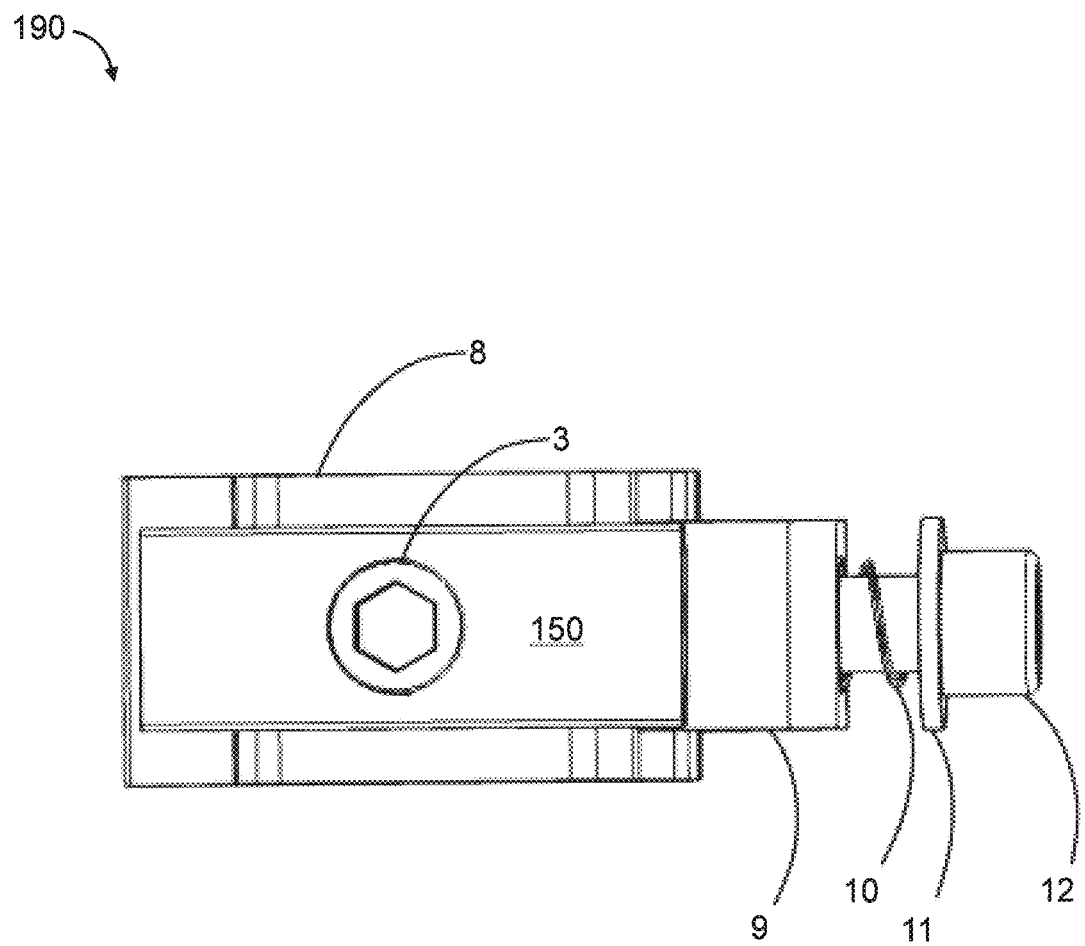
FIG. 75 shows a top view of an extended, rail-less, indexable mounting assembly, according to an embodiment.

FIG. 75 shows a top view of an extended, rail-less, indexable mounting assembly, according to an embodiment. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 76:
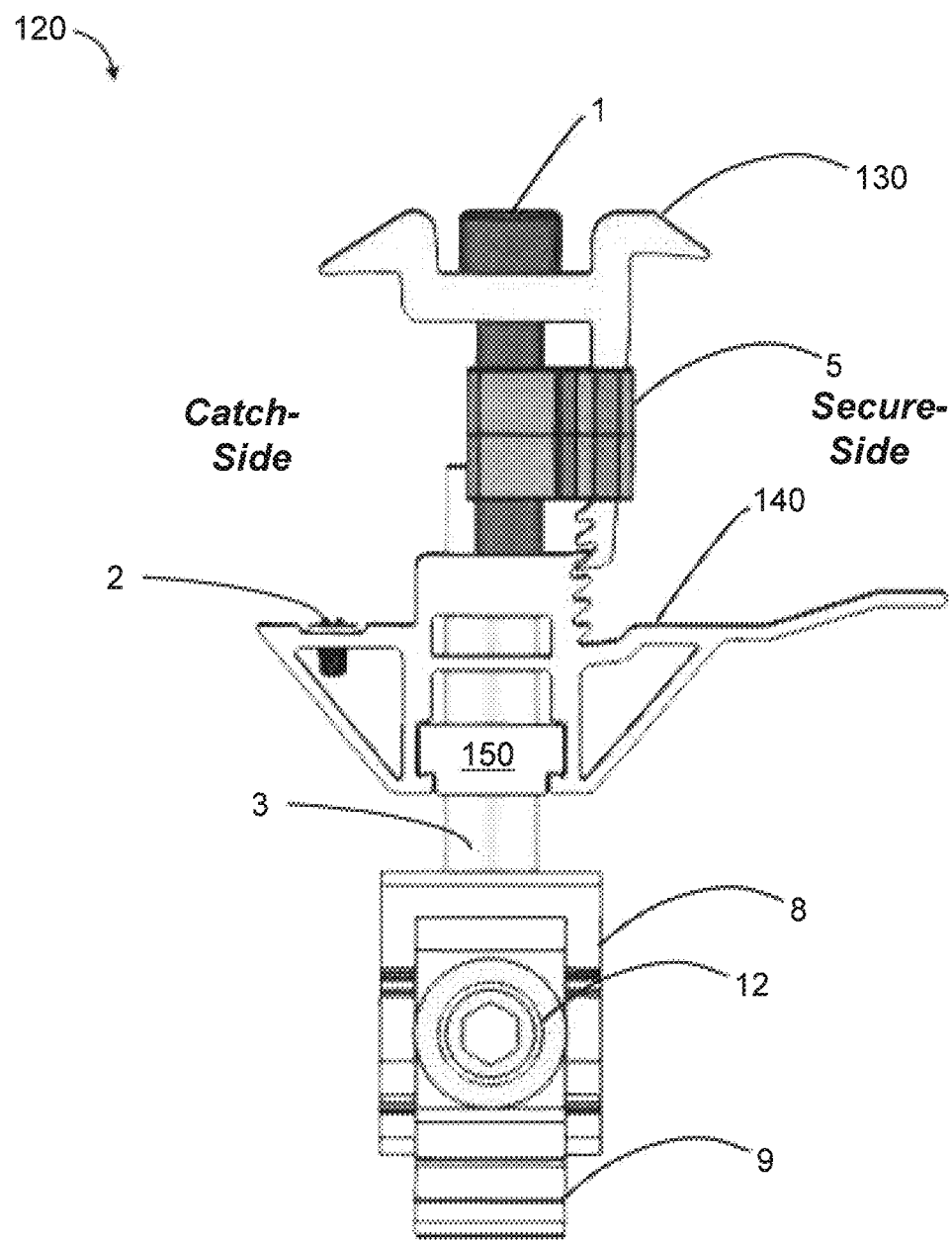
FIG. 76 shows an elevation end view of an extended, rail-less, indexable mounting assembly, according to an embodiment.

FIG. 76 shows an elevation end view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 77:
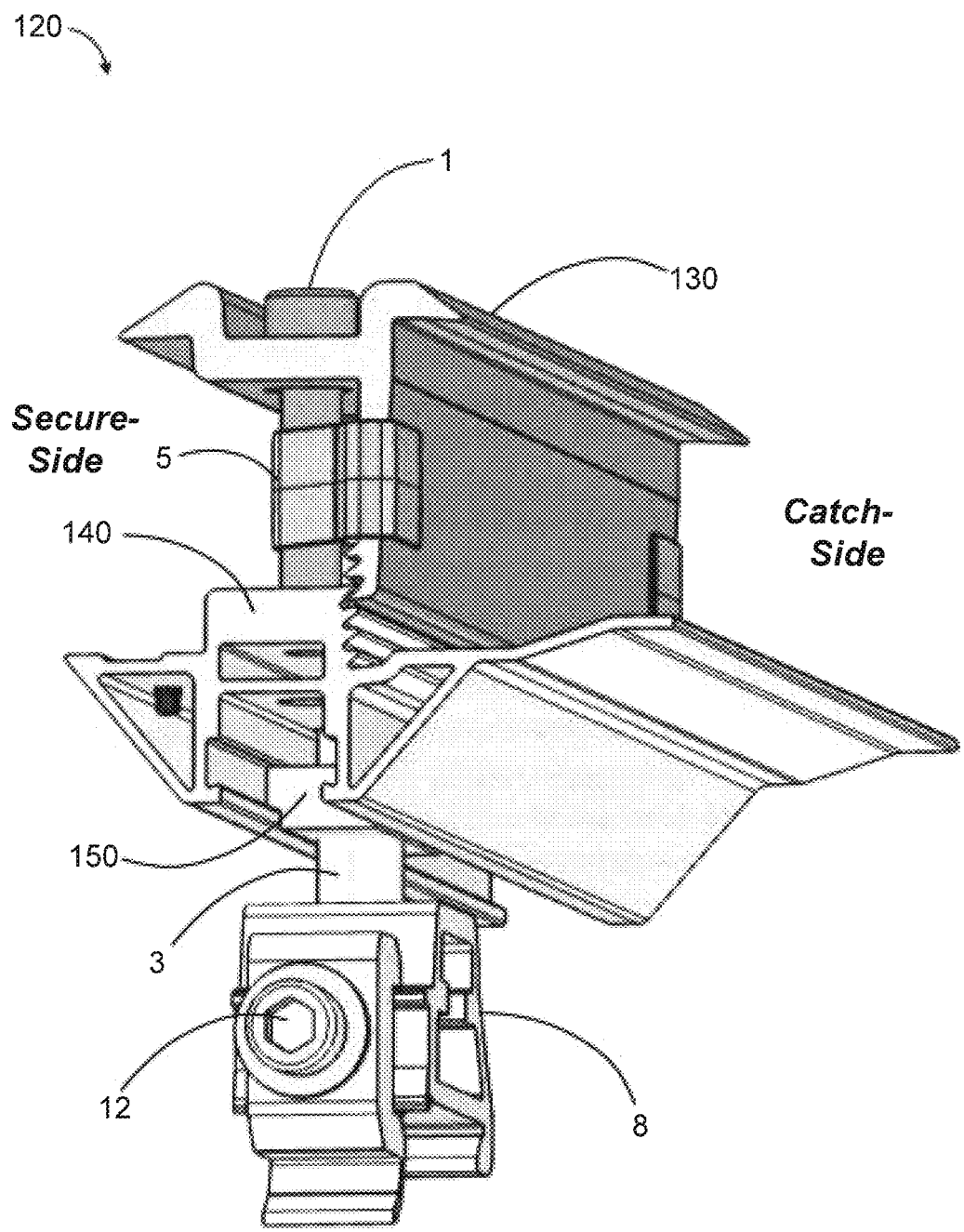
FIG. 77 shows an isometric perspective view of an extended, rail-less, indexable mounting assembly, according to an embodiment.

FIG. 77 shows an isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 includes a pair of electrical bonding pins 2, 2' disposed in a horizontal groove 30. Height adjustment bolt 3 passes through aperture 66 in base 140, and engages threaded sliding nut 150. Clamping bolts 1, 1' engages threaded apertures 68, 68' in base 140. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 78:
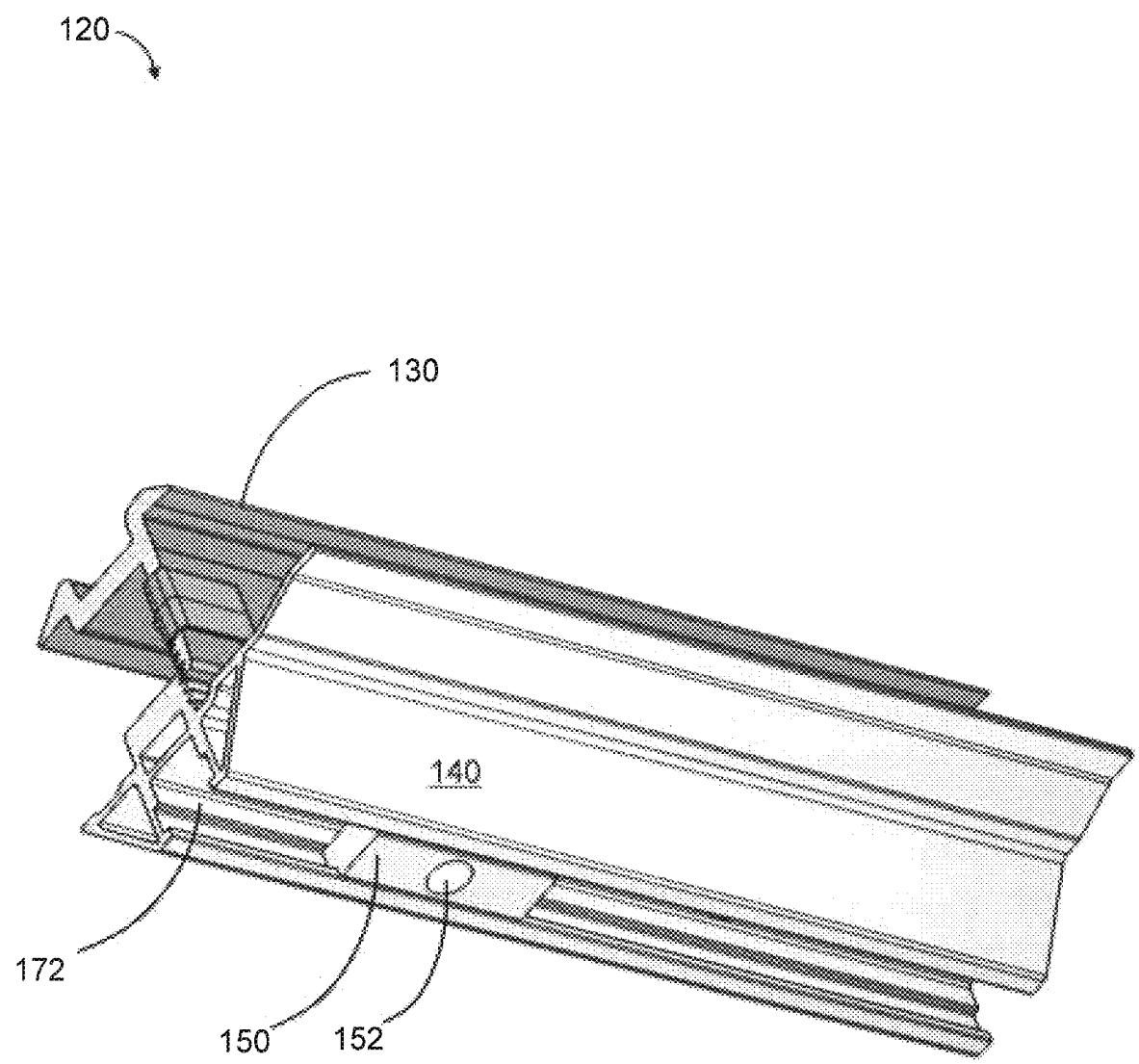
FIG. 78 shows an isometric perspective view of an extended, rail-less, indexable mounting assembly, according to an embodiment.

FIG. 78 shows an isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Sliding nut 150, with aperture 153 for height adjustment bolt 3, is disposed inside of slot (channel) 172 of base 140. Sliding nut 150 is prevented from rotating (when bolt 3 is rotated) by base 140.

Figure 79:
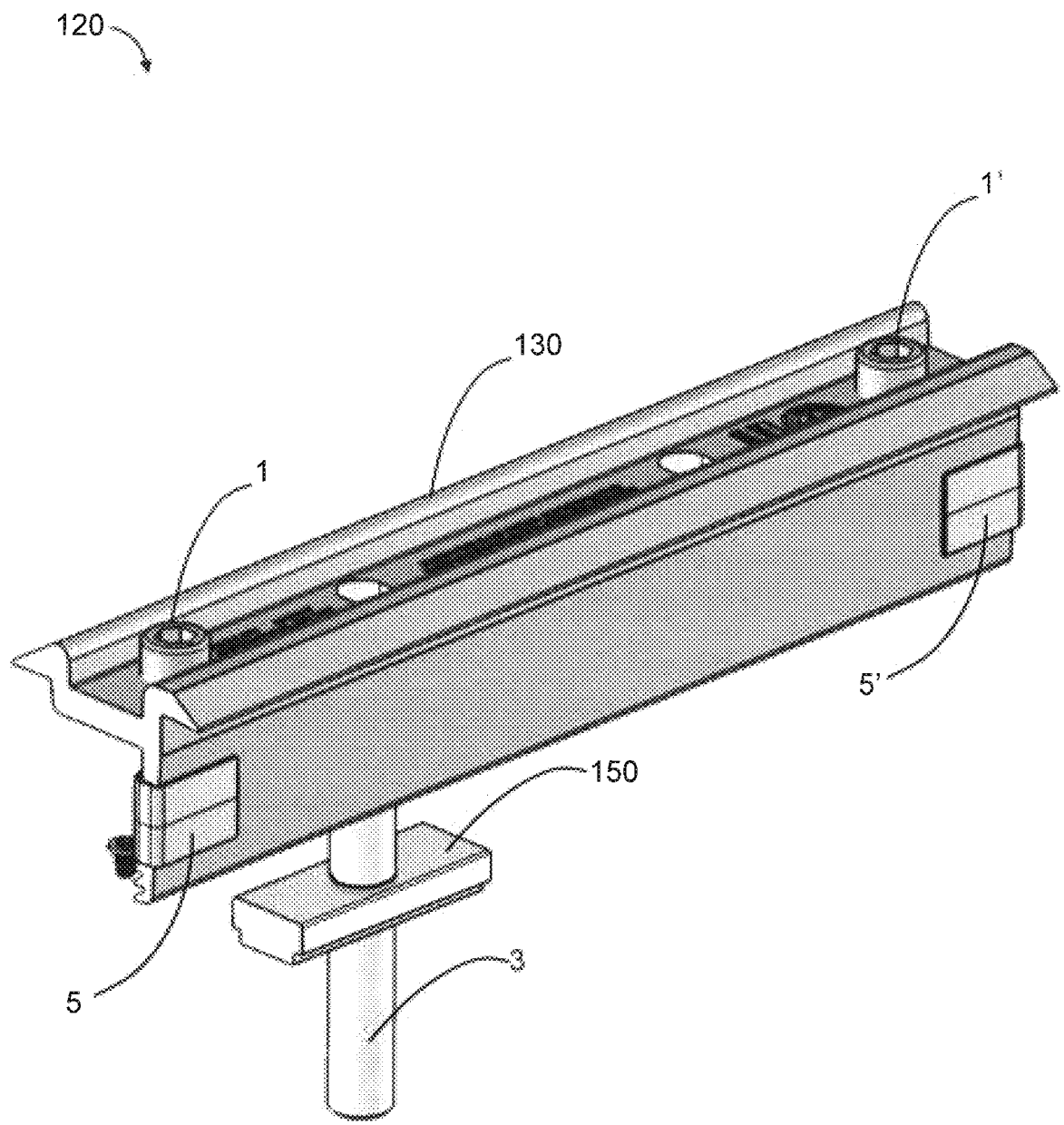
FIG. 79 shows an isometric perspective view of an extended, rail-less, indexable mounting assembly, according to an embodiment.

FIG. 79 shows an isometric perspective view of an extended, rail-less, indexable mounting assembly 120, according to an embodiment. Base 140 and tower bracket sub-assembly 8 are removed for clarity. Extended cap 130 is shown, along with height adjustment bolt 3, sliding nut 150, spring clip 5 and clamping bolts 1, 1'.

Figure 80:
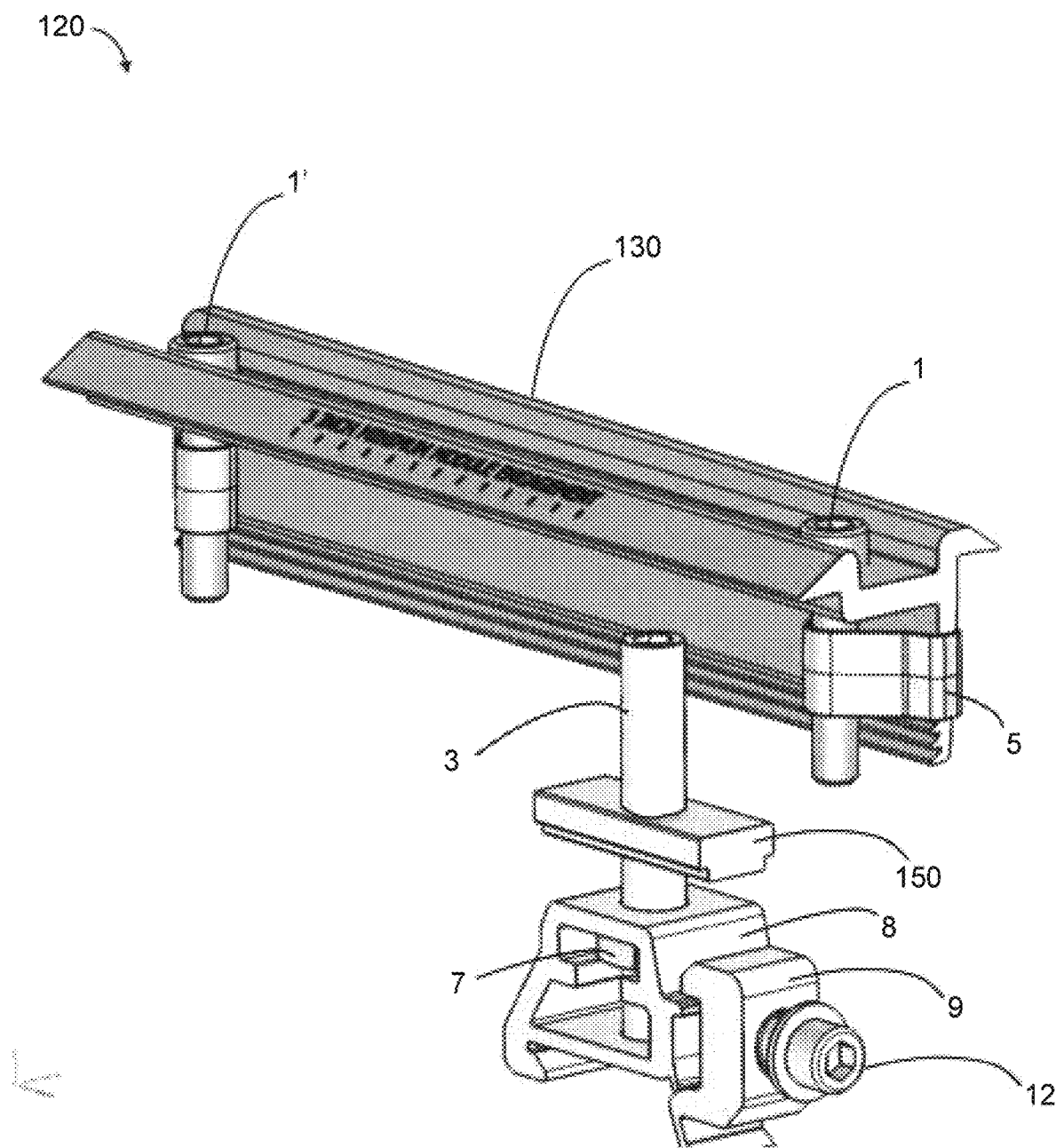
FIG. 80 shows an isometric perspective view of an extended, rail-less, indexable mounting assembly, according to an embodiment.

FIG. 80 shows an isometric perspective view of an extended, rail-less, indexable mounting assembly 120, according to an embodiment. Assembly 120 includes a pair of clamping bolts 1, 1' that clamp a solar panel (not shown) in-between an indexable (adjustable) extended cap 130 and an extended base 140. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base 140 by forcing engagement of the indexable teeth. Base 140 is removed for clarity. Rotation of bolt 3 about its longitudinal axis causes base 6 to move up or down. Sliding nut 150 is prevented from rotating (when bolt 3 is rotated) by base 140. The lower end of height adjustment bolt 3 is held by a pair of un-threaded apertures 99, 97 in tower bracket 8. Collar/jam nut 7 allows bolt 3 to rotate freely, but prevents bolt 3 from lifting up out of tower 8 due to wind loads. Dovetail clamp 9, spring 10, washer 11, and horizontal attachment bolt 12 clamps tower 8 to slider channel 14 (not shown) when bolt 12 is tightened.

Figure 81:
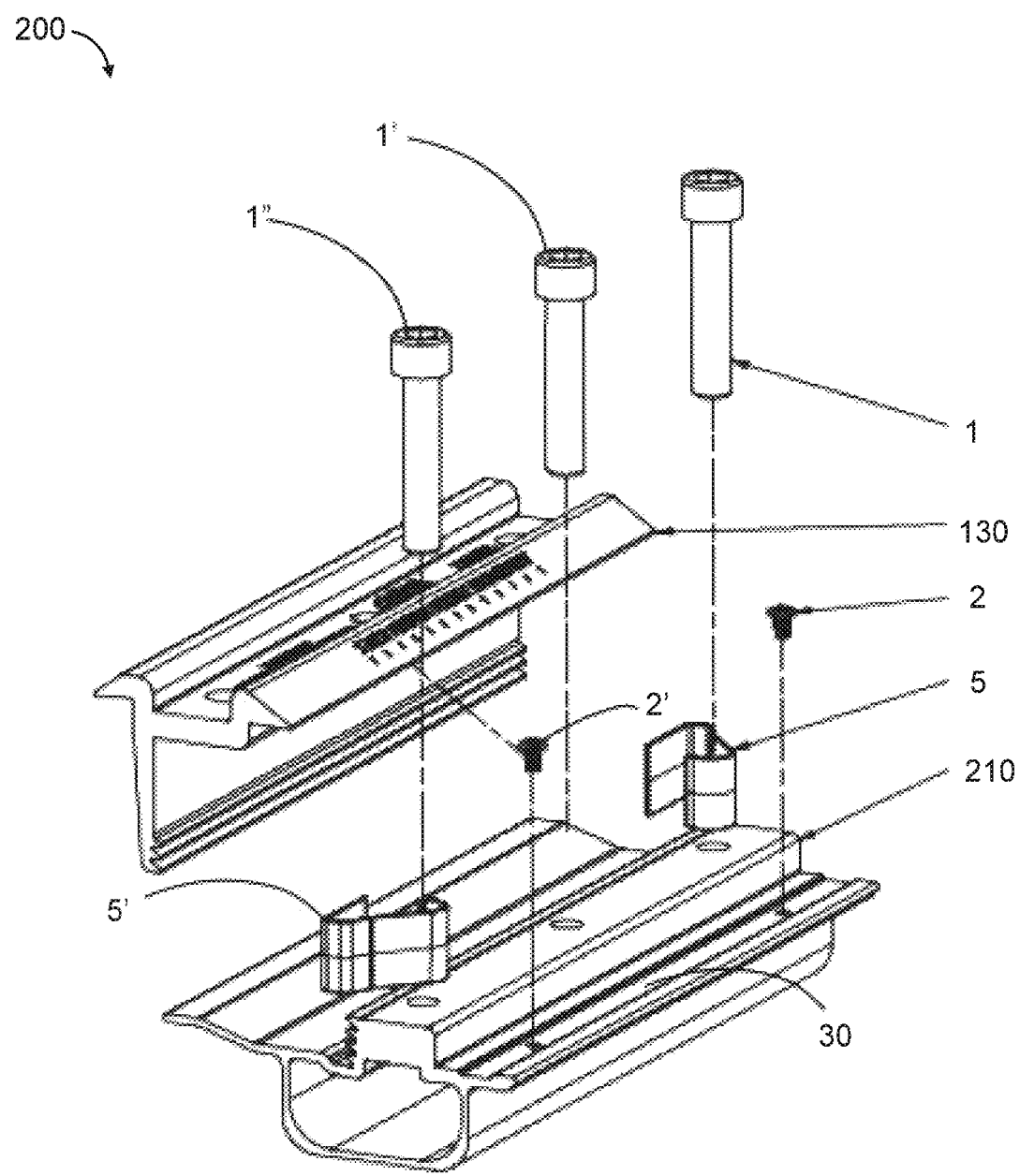
FIG. 81 shows an exploded isometric perspective view of an extended, rail-less, indexable splice assembly, according to an embodiment.

FIG. 81 shows an exploded isometric perspective view of an extended, rail-less, indexable splice assembly 200, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base splice 210 by forcing engagement of the indexable teeth. Electrical bonding pins 2, 2' are disposed in groove 30 of base splice 210 on the secure-side. In an embodiment, the splice assembly 200 may omit a height adjustment bolt. However, in an embodiment, the splice assembly 200 may include a height adjustment bolt and/or other mechanisms for adjusting the height of the splice assembly 200. A third clamping bolt 1", is added to the middle of splice assembly 200 increase strength and stability of the spliced panel assembly 200.

Figure 82:
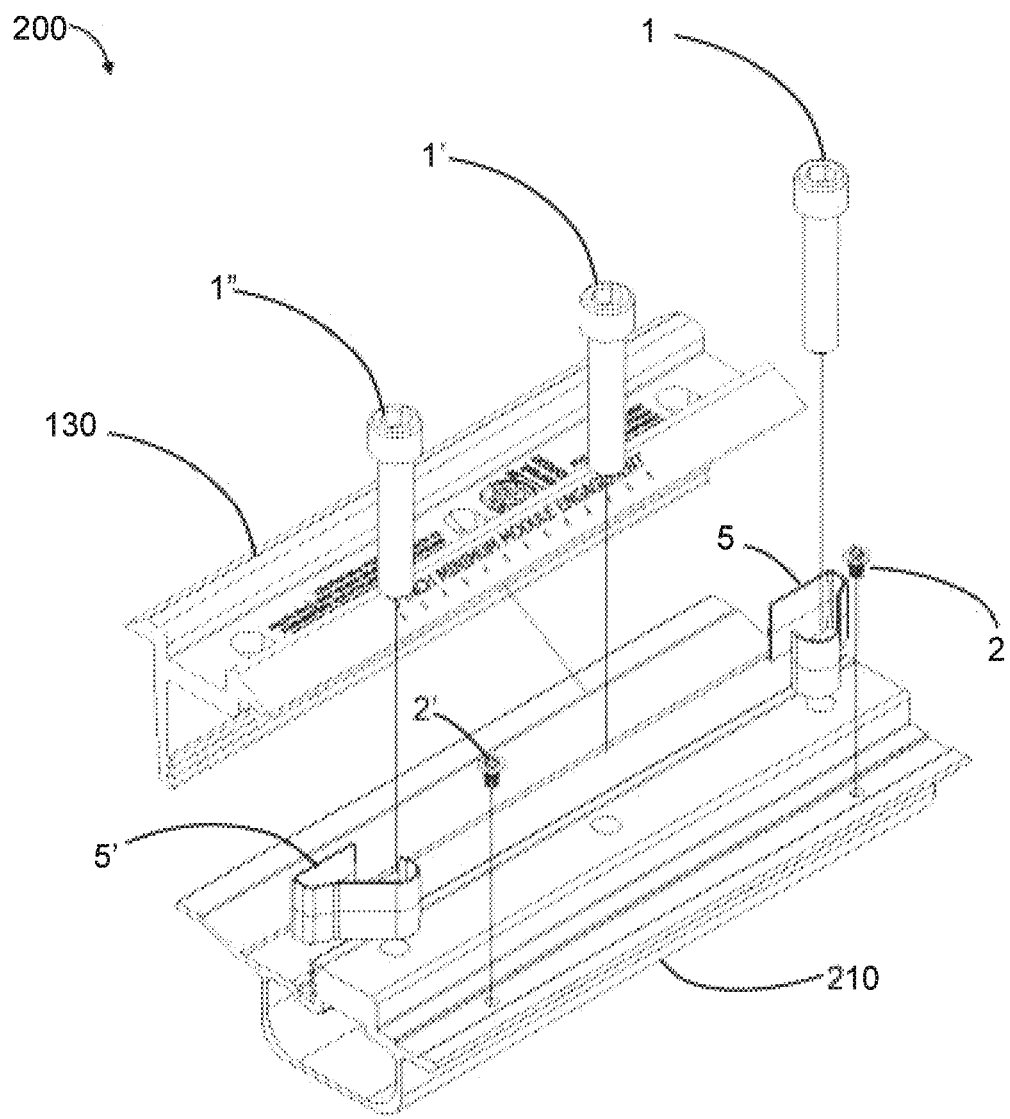
FIG. 82 shows an exploded isometric perspective view of an extended, rail-less, indexable splice assembly, according to an embodiment.

FIG. 82 shows an exploded isometric perspective view of an extended, rail-less, indexable splice assembly, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base splice 210 by forcing engagement of the indexable teeth. Electrical bonding pins 2, 2' are disposed in groove 30 of base splice 210 on the secure-side. A third clamping bolt 1", is added to the middle of splice assembly 200 increase strength and stability of the spliced panel assembly 200.

Figure 83:
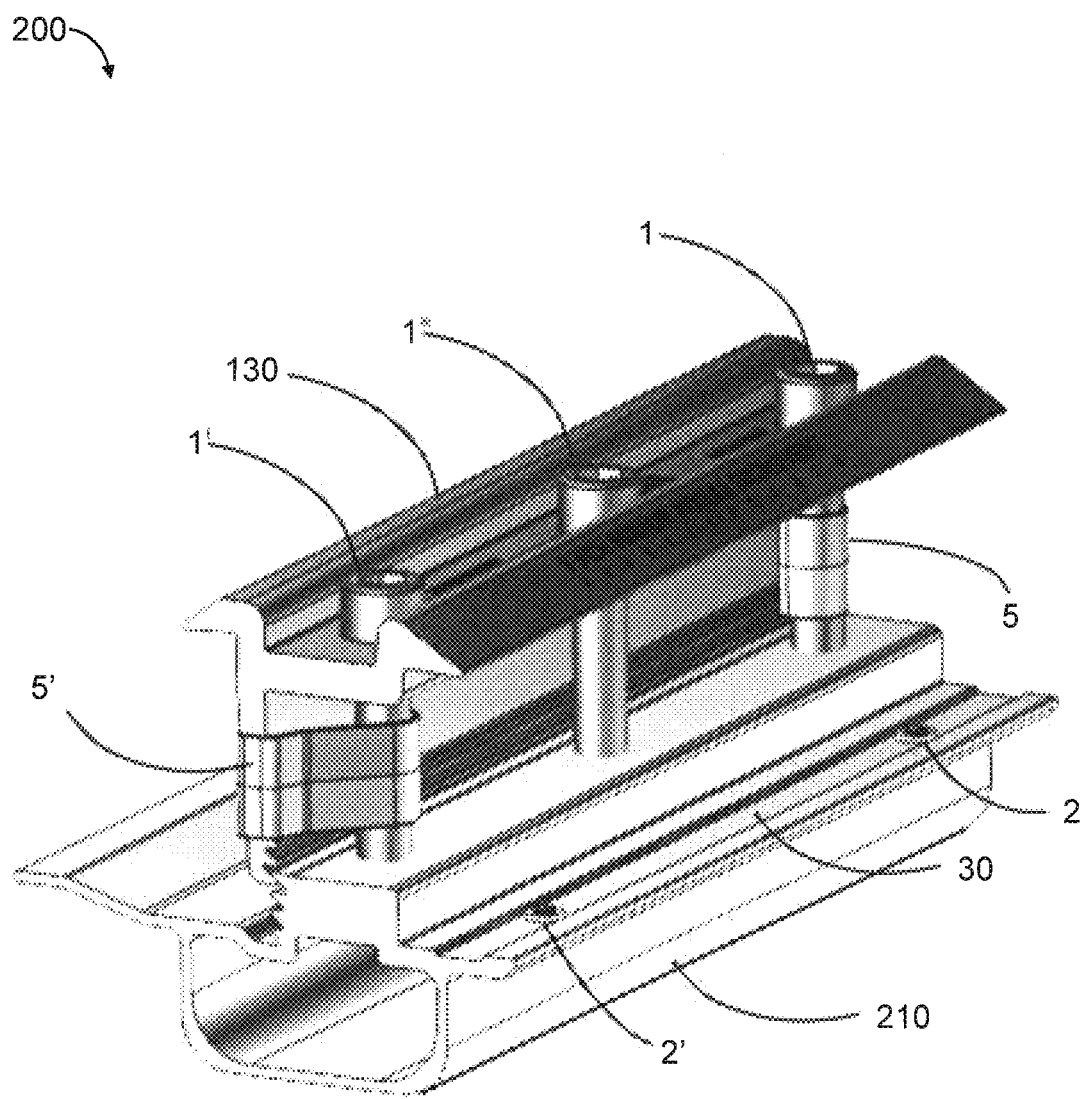
FIG. 83 shows an isometric perspective view of an extended, rail-less, indexable splice assembly, according to an embodiment.

FIG. 83 shows an isometric perspective view of an extended, rail-less, indexable splice assembly, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base splice 210 by forcing engagement of the indexable teeth. Electrical bonding pins 2, 2' are disposed in groove 30 of base splice 210 on the secure-side. A third clamping bolt 1", is added to the middle of splice assembly 200 increase strength and stability of the spliced panel assembly 200.

Figure 84:
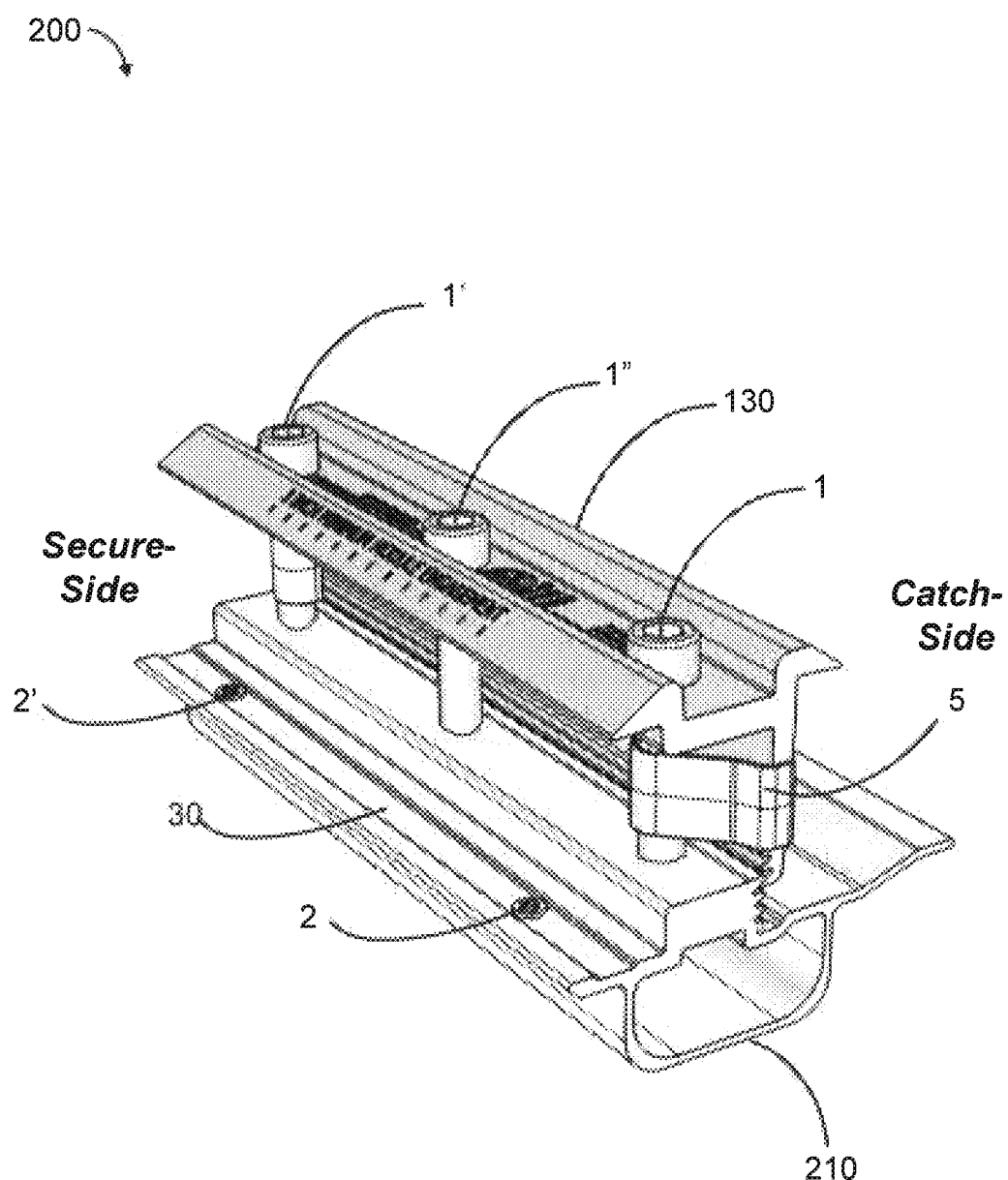
FIG. 84 shows an isometric perspective view of an extended, rail-less, indexable splice assembly, according to an embodiment.

FIG. 84 shows an isometric perspective view of an extended, rail-less, indexable splice assembly, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base splice 210 by forcing engagement of the indexable teeth. Electrical bonding pins 2, 2' are disposed in groove 30 of base splice 210 on the secure-side. A third clamping bolt 1", is added to the middle of splice assembly 200 increase strength and stability of the spliced panel assembly 200.

Figure 85:
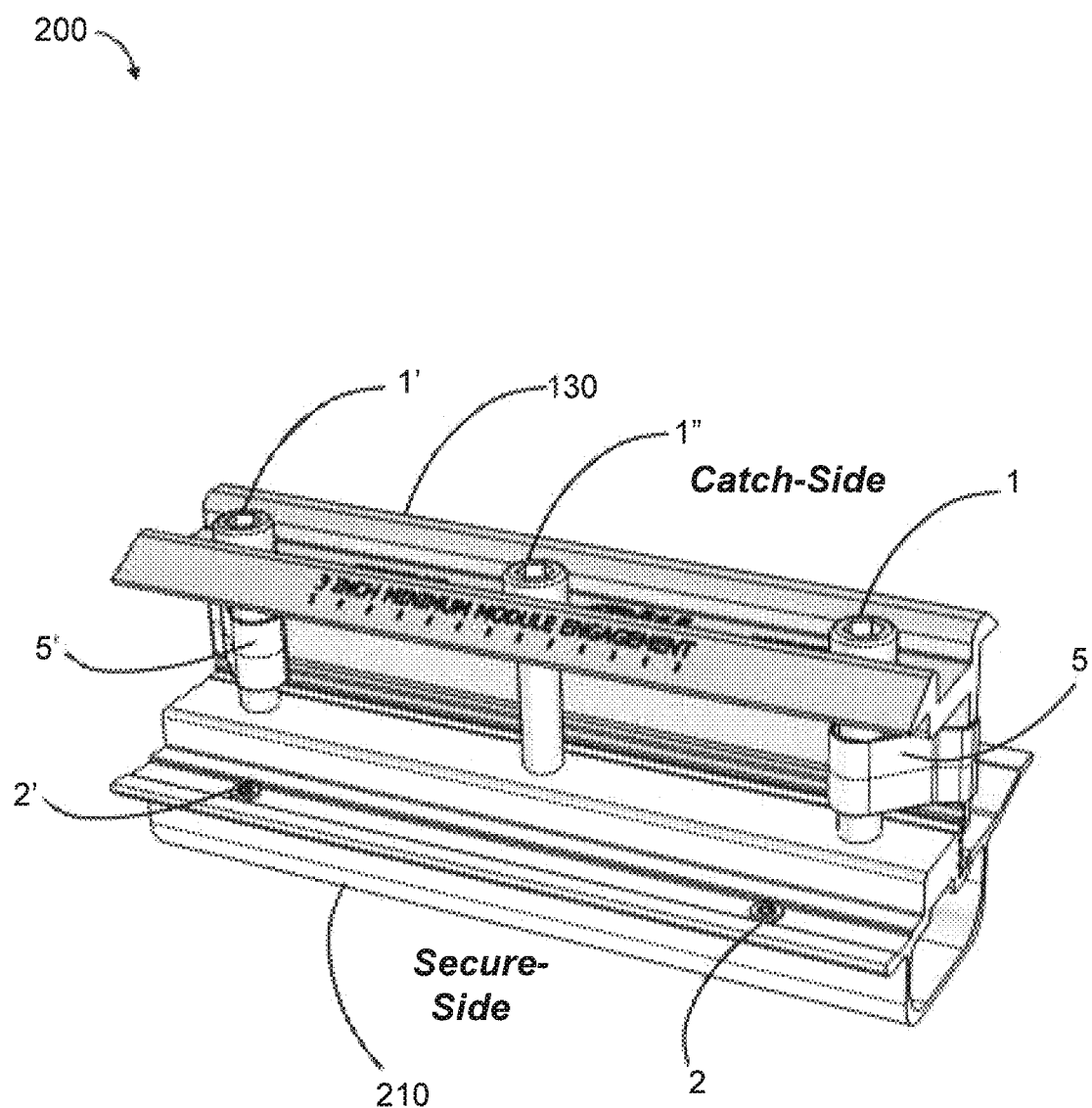
FIG. 85 shows an isometric perspective view of an extended, rail-less, indexable splice assembly, according to an embodiment.

FIG. 85 shows an isometric perspective view of an extended, rail-less, indexable splice assembly, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base splice 210 by forcing engagement of the indexable teeth. Electrical bonding pins 2, 2' are disposed in groove 30 of base splice 210 on the secure-side. A third clamping bolt 1", is added to the middle of splice assembly 200 increase strength and stability of the spliced panel assembly 200.

Figure 86:
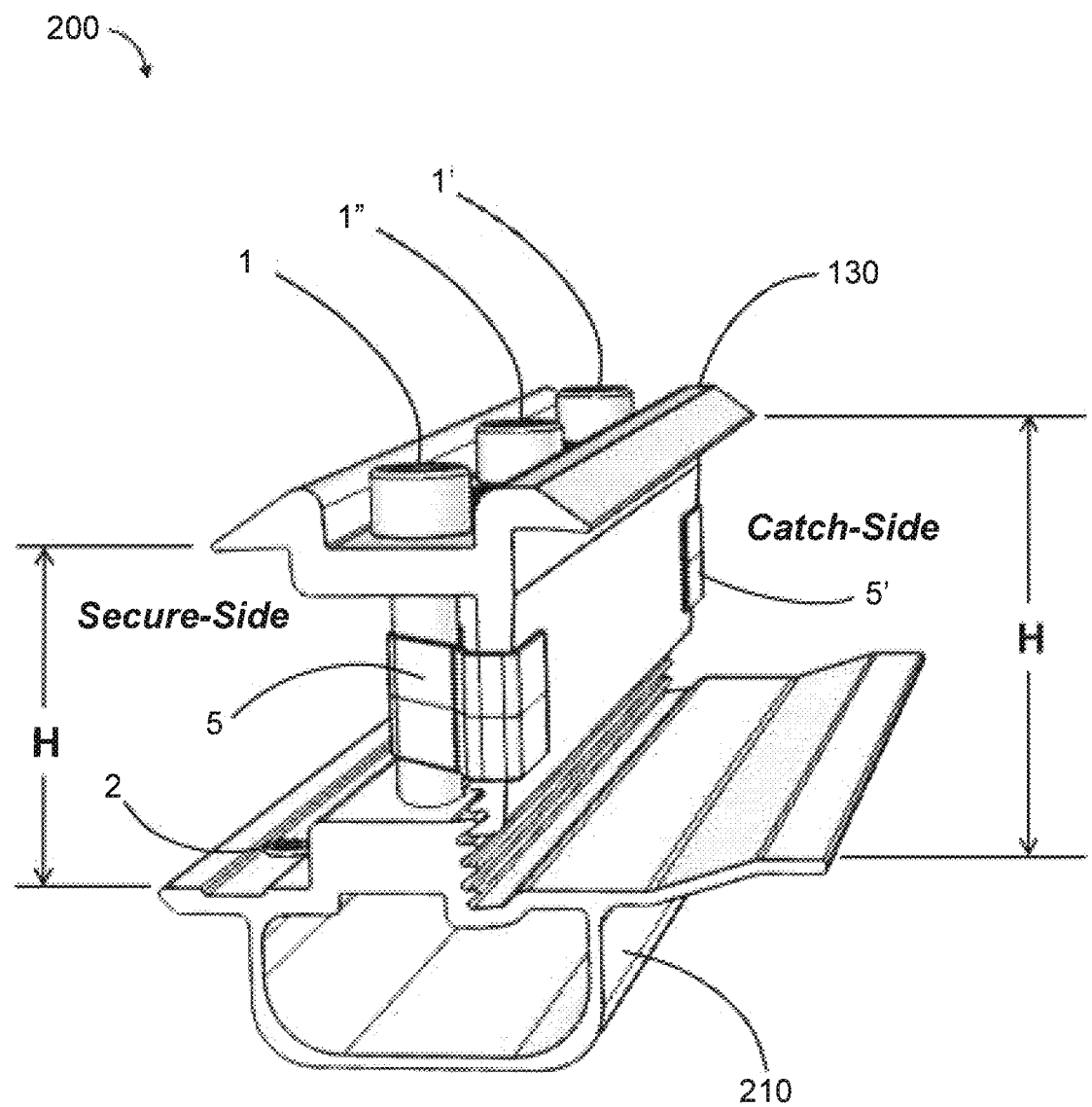
FIG. 86 shows an isometric perspective view of an extended, rail-less, indexable splice assembly, according to an embodiment.

FIG. 86 shows an isometric perspective view of an extended, rail-less, indexable splice assembly, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 and the base splice 210 by forcing engagement of the indexable teeth. Electrical bonding pins 2, 2' are disposed in groove 30 of base splice 210 on the secure-side. A third clamping bolt 1", is added to the middle of splice assembly 200 increase strength and stability of the spliced panel assembly 200.

Figure 87:
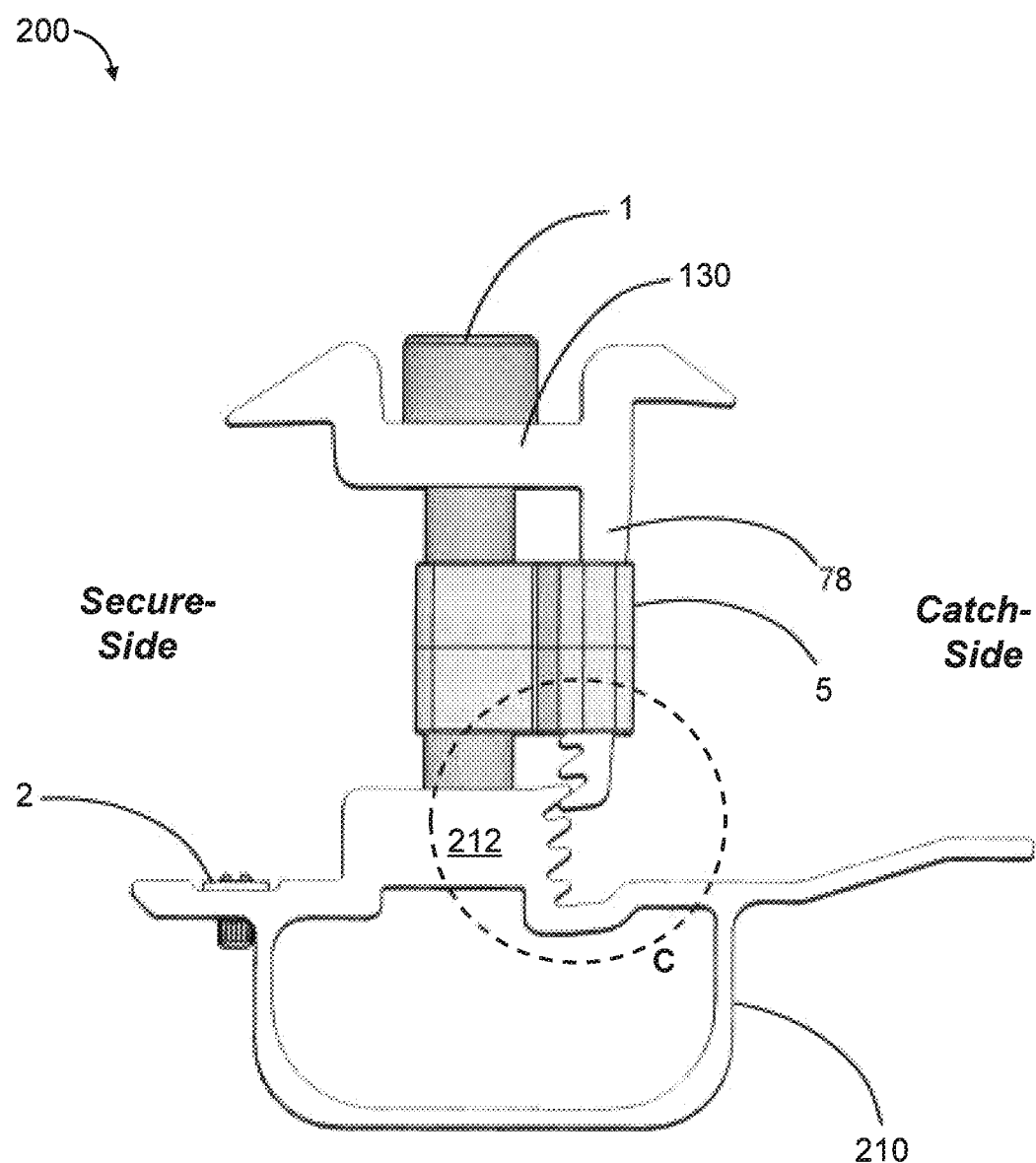
FIG. 87 shows an elevation end view of an extended, rail-less, indexable splice assembly, according to an embodiment.

FIG. 87 shows an elevation end view of an extended, rail-less, indexable splice assembly, according to an embodiment. Assembly 200 includes a pair of clamping bolts 1, 1' that clamp a solar panel (not shown) in-between an indexable (adjustable) extended cap 130 and a base splice 210. Spring clips 5, 5' clip onto clamping bolts 1, 1' on one end, and clips onto vertical leg 78 (that protrudes downwardly from cap 4) on the other end, thereby maintaining a position of the cap 130 against the clamping bolt 1 by forcing engagement of the indexable teeth. Electrical bonding pins 2, 2' are disposed in groove 30 of base splice 210 on the secure-side. A third clamping bolt 1", is added to the middle of splice assembly 200 increase strength and stability of the spliced panel assembly 200.

Figure 88:
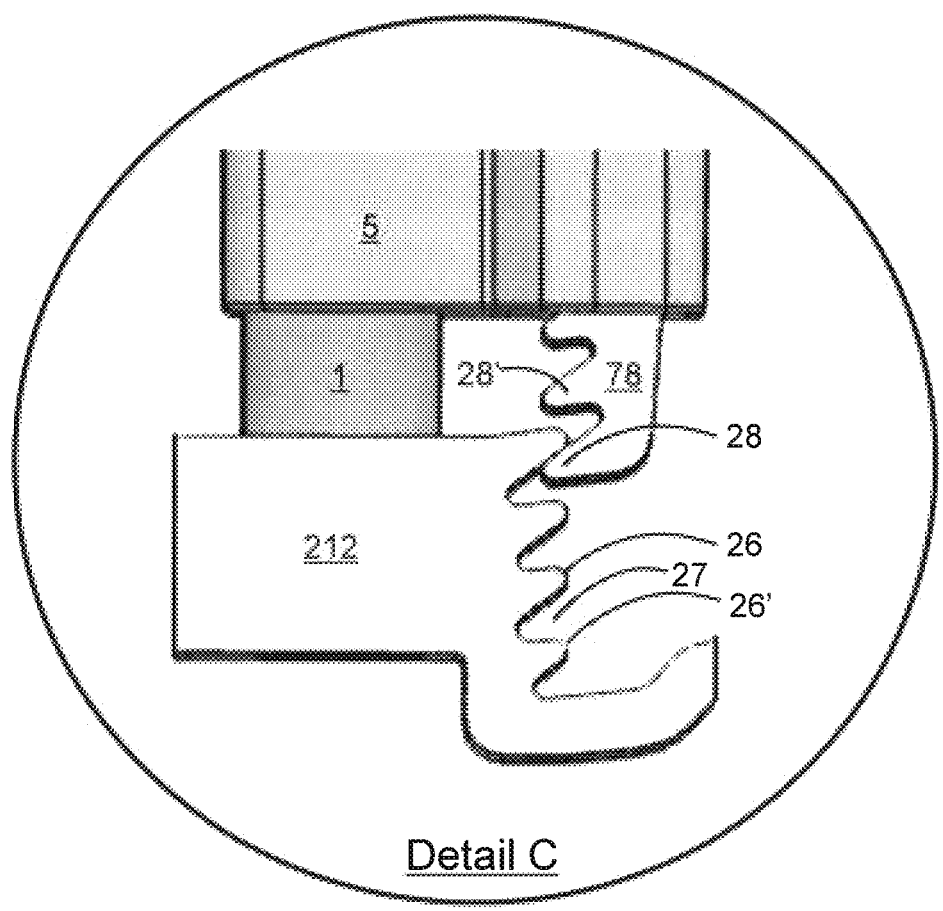
FIG. 88 shows a detailed elevation end view of an extended, rail-less, indexable splice assembly, according to an embodiment.

FIG. 88 shows a detailed elevation end view (Detail "C") of an extended, rail-less, indexable splice assembly, according to an embodiment. Horizontal upper portion 212 of base splice 210 includes a plurality of corrugations (teeth) 26, 26' and corresponding grooves 27 disposed in-between adjacent teeth. Likewise, vertical leg 78 includes a plurality of corrugations (teeth) 28, 28' and corresponding grooves 29 disposed in-between adjacent teeth. The height, H, of the solar panel frame thickness may be easily adjusted by (1) dis-engaging the upper set of teeth 28, 28' from the lower set of teeth 26, 26'; (2) increasing or decreasing the height, H; and (3) re-engaging a new set of upper and lower teeth. In an embodiment, the spring clip maintains proximity of the base splice 210 corrugations 26 and 26' and the vertical leg 78 corrugations 28 and 28'. The spring clip 5 exerts a restoring force on the base splice 210 and the vertical leg 78. For example, the base splice 210 and the vertical leg 78 may be separated by a force exerted on them (e.g., an installer separating them by hand and/or other means) and once that force is removed from the base splice 210 and/or the vertical leg 78 the spring clip 5 exerts a restoring force on the base splice and the vertical leg to reengage the corresponding corrugations.

Figure 89:
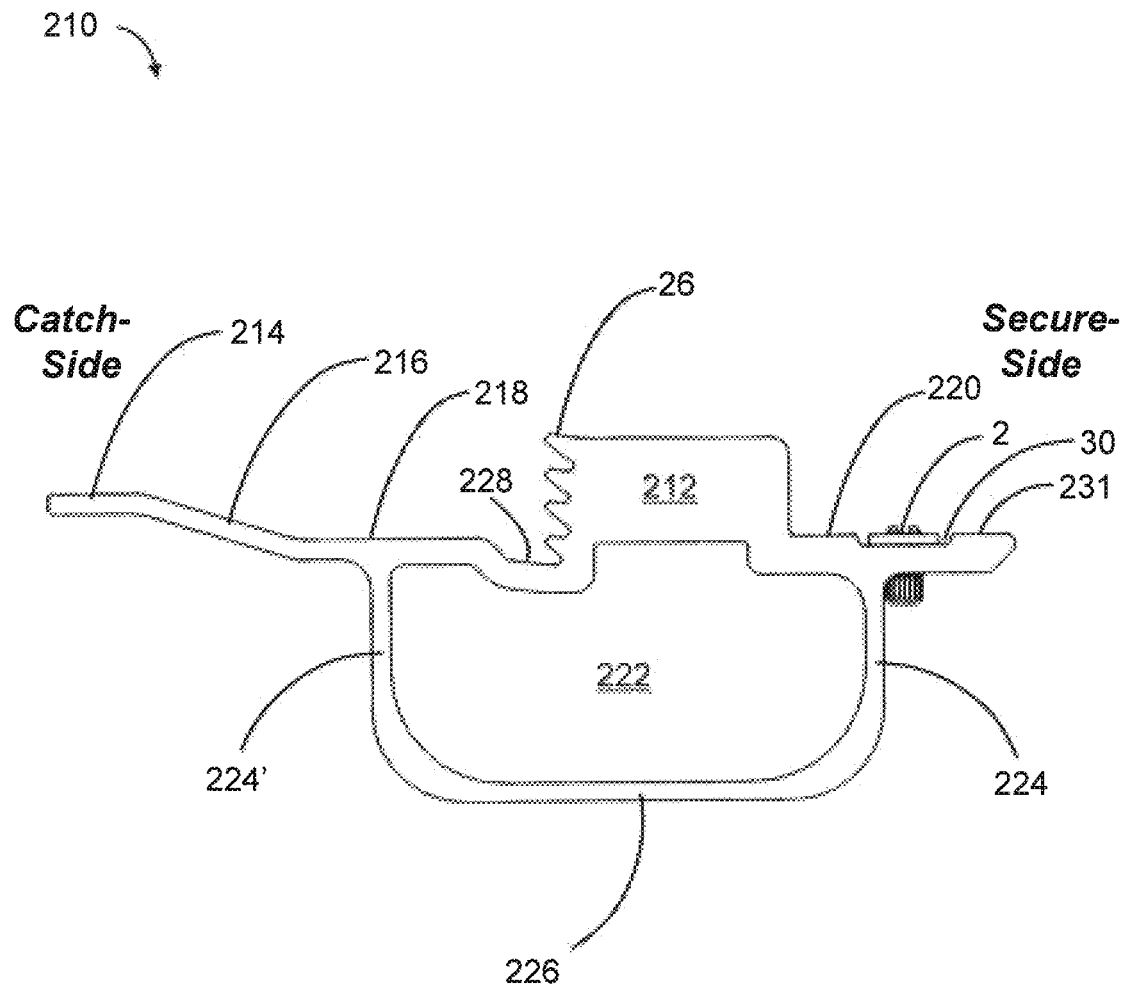
FIG. 89 shows an elevation end view of an extended, rail-less, indexable base splice, according to an embodiment.

FIG. 89 shows an elevation end view of an extended, rail-less, indexable base splice 210, according to an embodiment. Base splice 210 includes an extruded body, including: a horizontal upper portion 212 connected to secure-side support ledges 220, 231, and connected to catch-side support ledges 228, 218, 216, 214. Horizontal upper portion 212 of base splice 210 includes a plurality of outwardly-facing horizontal, parallel corrugations (teeth) 26, 26' and corresponding grooves 27 disposed in-between adjacent teeth. Base splice 210 further includes a horizontal bottom portion 226 that is integrally connected to sidewalls 224, 224' (which may be vertical, or slightly splayed outwards or inwards); thereby forming an enclosure with a horizontal hollow interior volume 222. Sidewall 224' is connected to horizontal portion 218; and sidewall 224 is connected to horizontal portion 220. Base splice 210 may be open at both ends.

Figure 90:
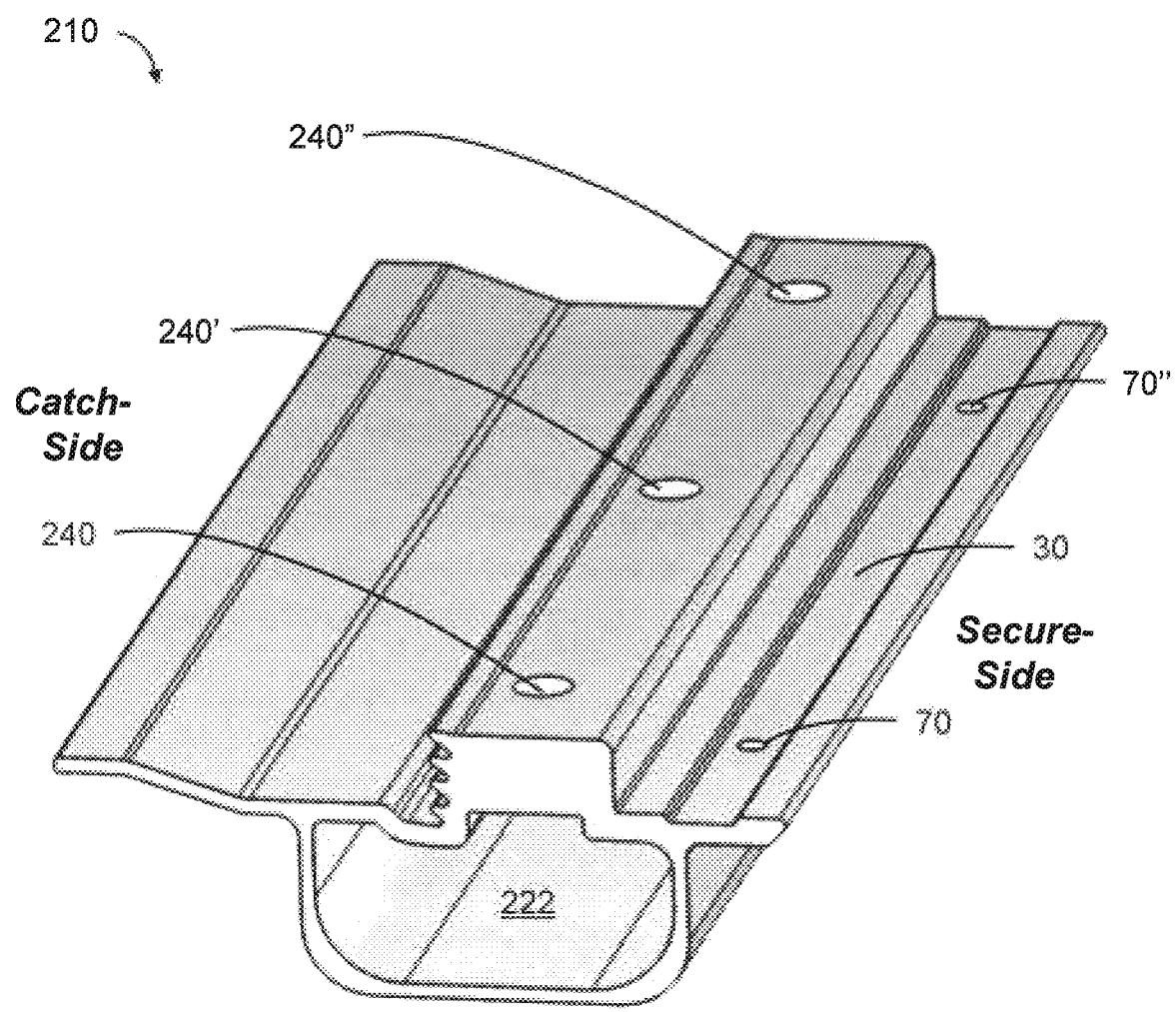
FIG. 90 shows an isometric perspective view of an extended, rail-less, indexable base splice, according to an embodiment.

FIG. 90 shows an isometric perspective view of an extended, rail-less, indexable base splice 210, according to an embodiment. Base splice 210 includes three threaded apertures: 240, 240', 240", which engage with three clamping bolts 1, 1', 1", respectively. Groove 30 includes a pair of holes 70, 70' for holding bonding pins 2, 2', respectively. Hollow interior volume 222 is noted.

Figure 91:
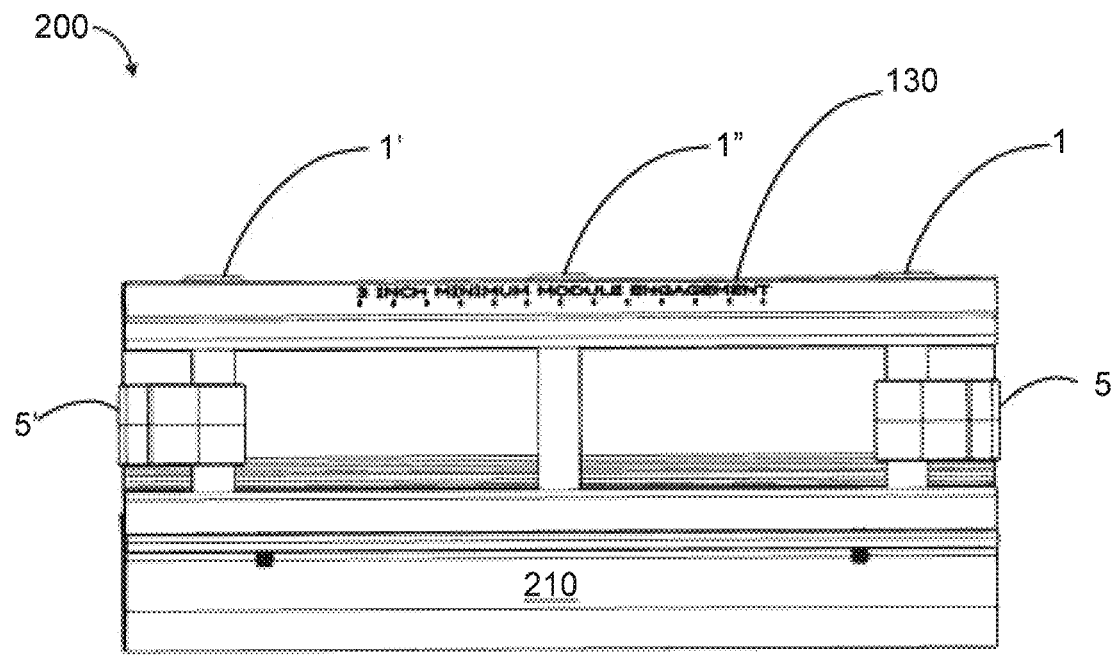
FIG. 91 shows an elevation side view of an extended, rail-less, indexable base splice, according to an embodiment.

FIG. 91 shows an elevation side view of an extended, rail-less, indexable base splice assembly 200, according to an embodiment. Assembly 200 includes: an extended cap 130 that is clamped to a base splice 210 by three clamping bolts 1, 1', 1" and a pair of spring clips 5, 5'.

Figure 92:
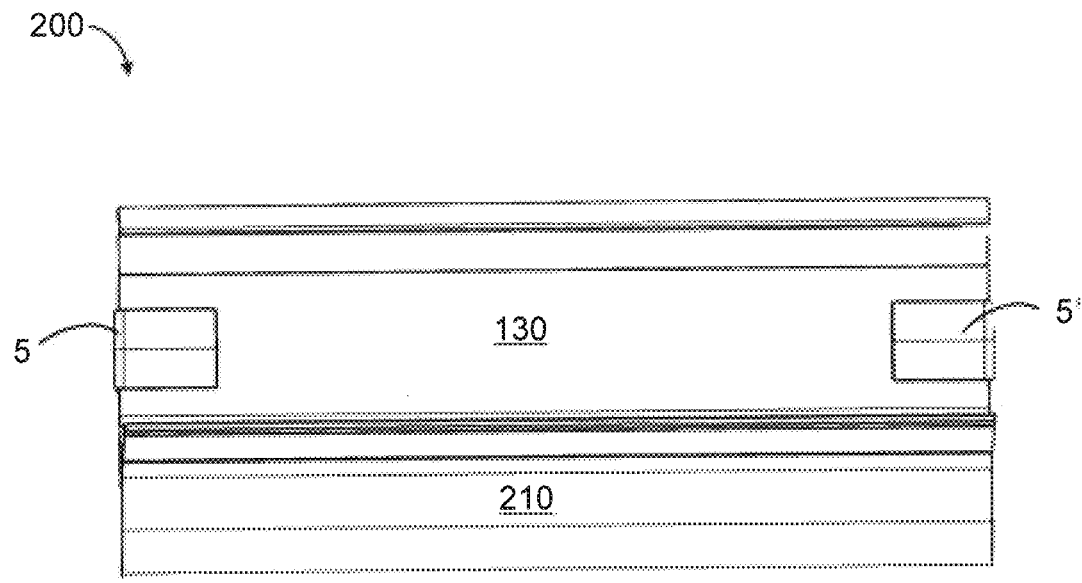
FIG. 92 shows an elevation backside view of an extended, rail-less, indexable splice assembly, according to an embodiment.

FIG. 92 shows an elevation backside view of an extended, rail-less, indexable splice assembly 200, according to an embodiment. Assembly 200 includes: an extended cap 130 that is clamped to a base splice 210 by three clamping bolts 1, 1', 1" and a pair of spring clips 5, 5'.

Figure 93:
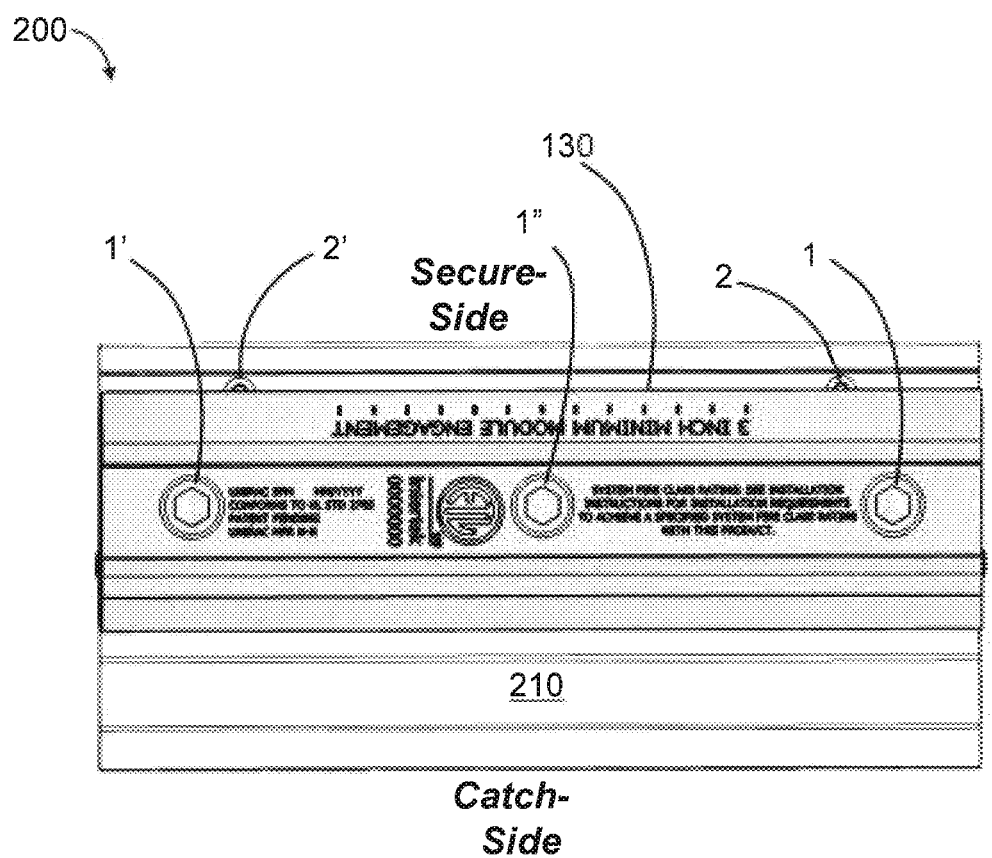
FIG. 93 shows a top view of an extended, rail-less, indexable splice assembly, according to an embodiment.

FIG. 93 shows a top view of an extended, rail-less, indexable splice assembly 200, according to an embodiment. Assembly 200 includes: an extended cap 130 that is clamped to a base splice 210 by three clamping bolts 1, 1', 1"; a pair of spring clips 5, 5'; and a pair of bonding pins 2, 2'.

Figure 94:
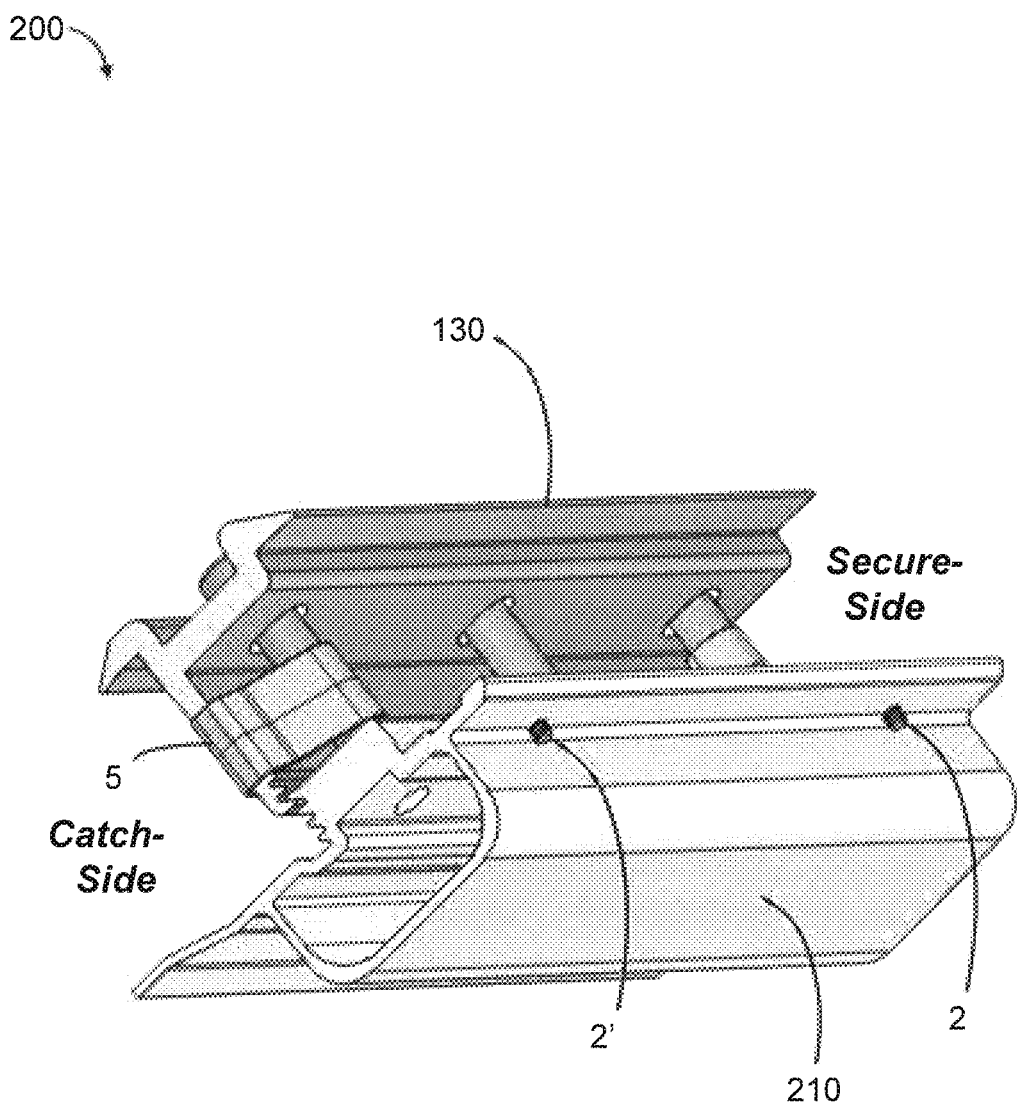
FIG. 94 shows of an isometric perspective extended, rail-less, indexable splice assembly, according to an embodiment.

FIG. 94 shows of an isometric perspective extended, rail-less, indexable splice assembly 200, according to an embodiment. Assembly 200 includes: an extended cap 130 that is clamped to a base splice 210 by three clamping bolts 1, 1', 1"; a pair of spring clips 5, 5'; and a pair of bonding pins 2, 2'.

In embodiments, an attachment mechanism may include a tower with a clamp that is urged (biased) towards the center of the tower. A latching clamp allows the clamp+tower sub-assembly to be "Clicked-On" (i.e., latched) to a rigid bar (called a "slider bar", "slider channel", or simply "slider") that is lag screwed to a roof or other support substrate. The tower, with a hook on one side, is mounted on the slider in a three-step process. First, the tower is hooked-on to one side of the slider by engaging the hook with a first lip (flange) of the slider. Then, in step 2, the tower is rotated down and then "Clicked-On" to the slider by automatically pushing (sliding) the clamp outwards sufficiently far so as to clear the opposite (second) lip of the slider. Once the tower has been "Clicked-On" and loosely attached to the slider (held, for example, by a spring force, and the tower attached by the action of interlocking surfaces), the tower may be easily slid by hand along the length of the slider to adjust its position North/South along the slider. The clamp's bias mechanism (which may be a coil spring, for example) provides sufficient force, and the design of the interlocking surfaces of the clamp+tower/slider assembly, is sufficiently strong, so as to make the assembly substantially-resistant to accidental release (such as accidental contact with an installer's foot, safety ropes hanging on the roof, etc.). Finally, in step 3, the clamp's fastener is tightened (torqued) tight, which permanently locks the tower onto the slider bar.

The tower itself may be coupled (attached) to any type of solar panel mounting structure or mechanism that is capable of holding (mounting) one or more solar panels. In particular, such a solar panel mounting structure may include a height-adjustable mechanism, which may be adjusted with a tool before, or after, the solar panels have been mounted. Note: the clamp+tower sub-assembly may be easily removed by releasing the clamp fastener (bolt), and then simply pulling back on the biased clamp and rotating the clamp+tower subassembly back off of the slider, and finally disengaging the tower's hook from the slider.

FIG. 95A-D shows elevation side views of an installation sequence of a Click-On attachment mechanism 3, according to an embodiment.

Figure 95A:
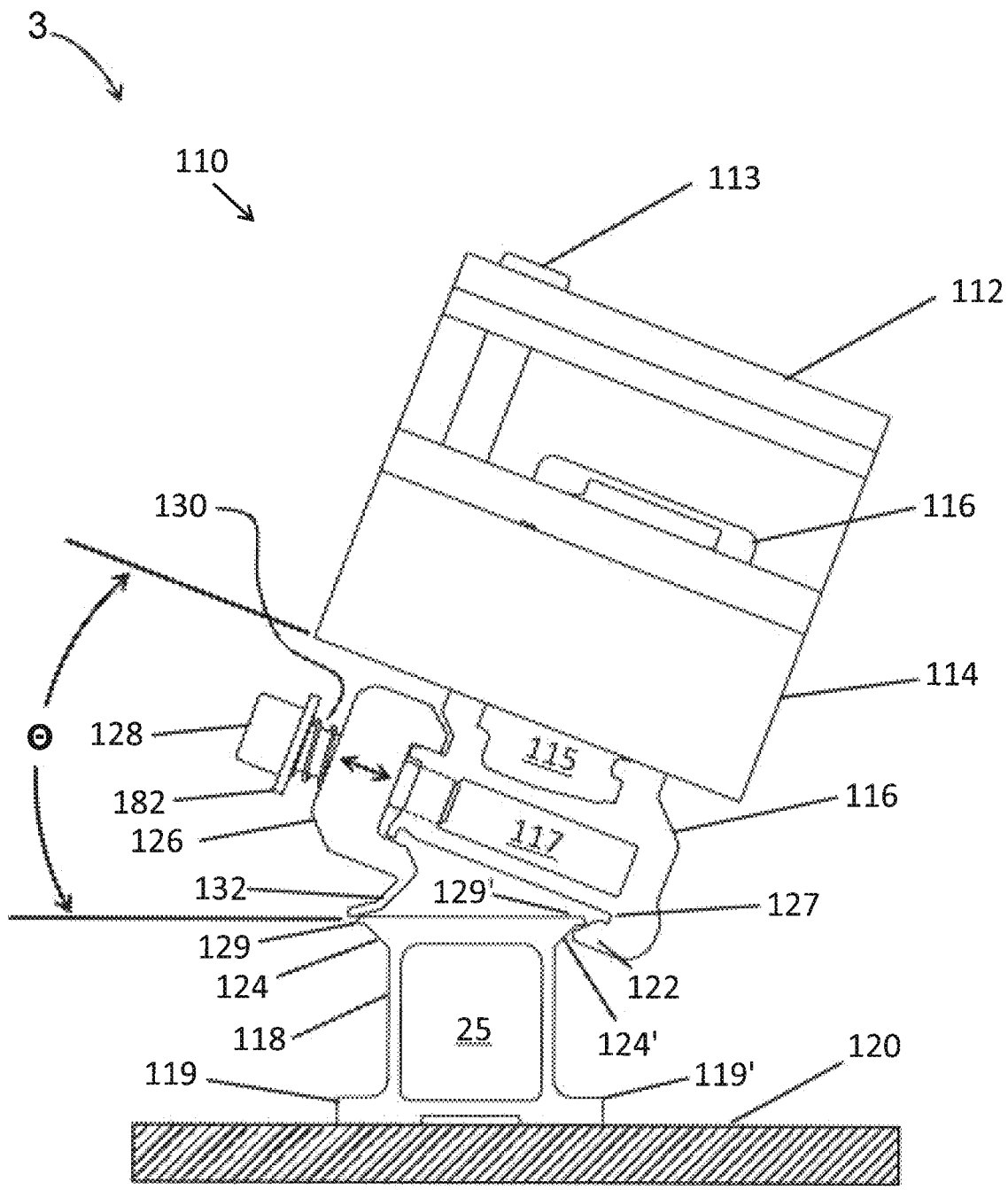
FIGS. 95A-D each show elevation side views of an installation sequence of a Click-On attachment mechanism, according to an embodiment.

FIG. 95A shows an initially skewed position ($\theta=20°$), where tower 116 is hooked onto slider 118, according to an embodiment. Here, asymmetric tower (stanchion) 116 has been hooked onto slider bar 118 by engaging notch 127 of tower hook 122 with slider lip 129' of angled (tapered/slanted) slider flange 124'. Tapered (slanted) flanges 124 and 214' may have angled faces oriented at, for example, 45° to the horizontal. In this skewed position of FIG. 95A, the lower flange 132 of clamp 126 is resting on top of the upper surface of slider 118, and clamp fastener 128 is in a backed-out (not-tightened) position, where dovetail clamp 126 is free to slide (translate) back and forth along horizontal fastener 128, urged forward by spring 130. In such an embodiment, upper solar panel mounting bracket 112 and lower solar panel mounting bracket 114 are attached to tower 116. Solar panel fastener 113 may be used to compress upper bracket 112 and lower bracket 114 together so as to mount and securely hold one or more solar panels (not shown) to tower 116 at a later stage in the installation process. Additionally, and/or alternatively, in an embodiment, the upper and lower brackets 112, 114 are made of a single, monolithic part, in which case the use of a solar panel fastener 113 may be eliminated. FIG. 95A also illustrates open volumes 115 and 117, a roof surface 120, a hollow volume 125, and a flat washer 182, all of which are further mentioned below.

Figure 95B:
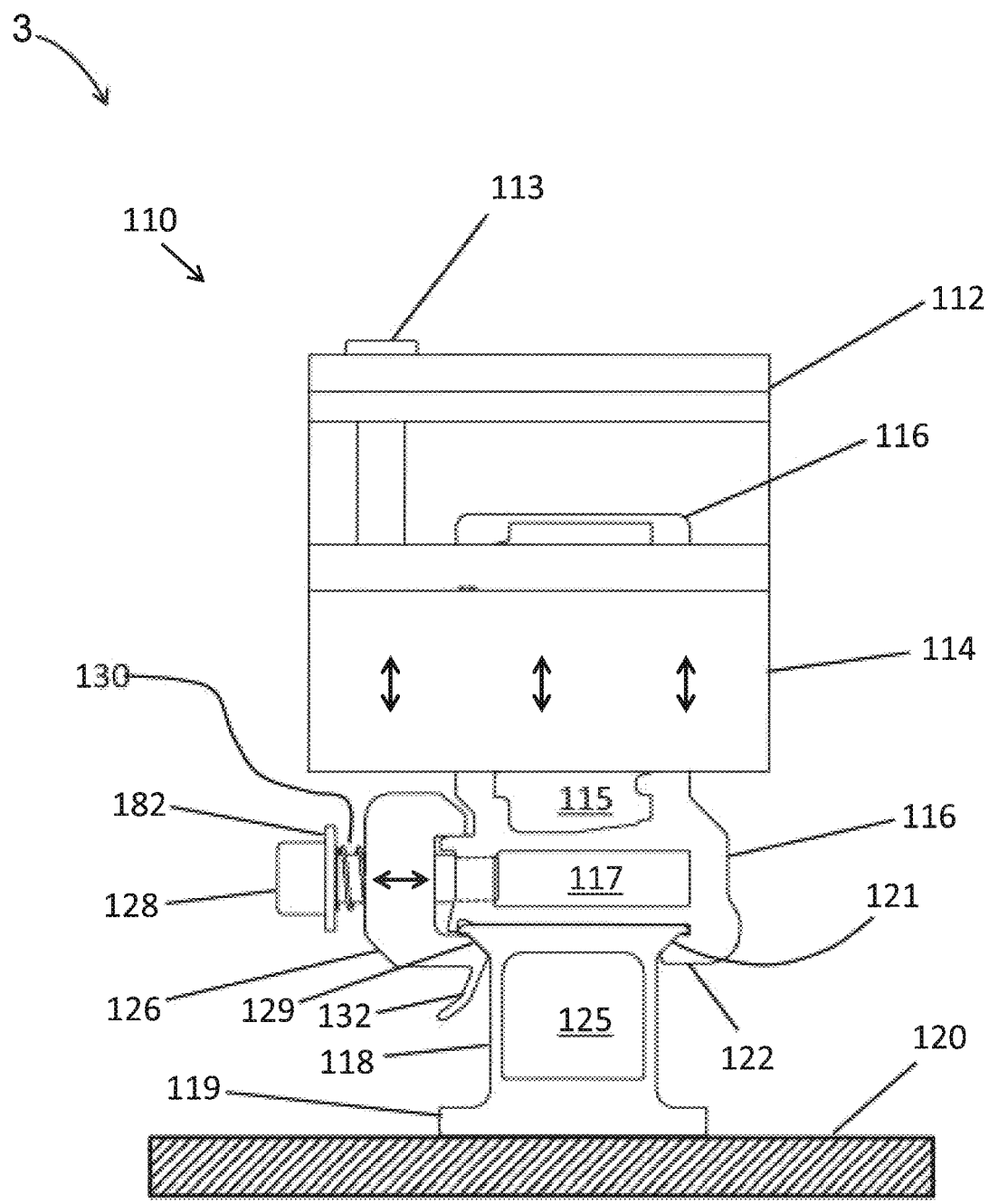

FIG. 95B shows an elevation view of an embodiment of the click-on tower assembly 110 in an attached position on slider 118. When the tower assembly 110 is rotated towards the horizontal position, dovetail clamp 126 is pushed back (outwards) by sliding of angled lower flange 132 against left lip 129 of slider 118 (thereby compressing spring 130) to increase the clearance around the slider lip 129. Then, mounting assembly 110 is rotated to the horizontal position ($\theta=0°$), whereupon the lower flange 132 clears the left lip 129 and dovetail clamp 126 is released, which causes dovetail clamp 126 to snap back into a latched position by action of spring 130. This action causes an audible "clicking" sound when dovetail clamp 126 forcefully contacts angled face 124 of slider 118. Spring 30 (which may be a coil spring, stacked Bellevue washers, angled tab(s), leaf spring, elastic band, or any other elastic means for biasing/urging) has sufficient strength so that the clicked-on (attached) assembly 110 may withstand gravity loads and minor installation forces (such as interference with safety ropes), which is substantially resistant to accidental release. Flat washer 182 is placed between spring 130 and the head of horizontal fastener 128. Additionally, indicated in FIG. 22B are the open volumes 115 and 117, the roof surface 120, and the hollow volume 125.

Figure 95C:
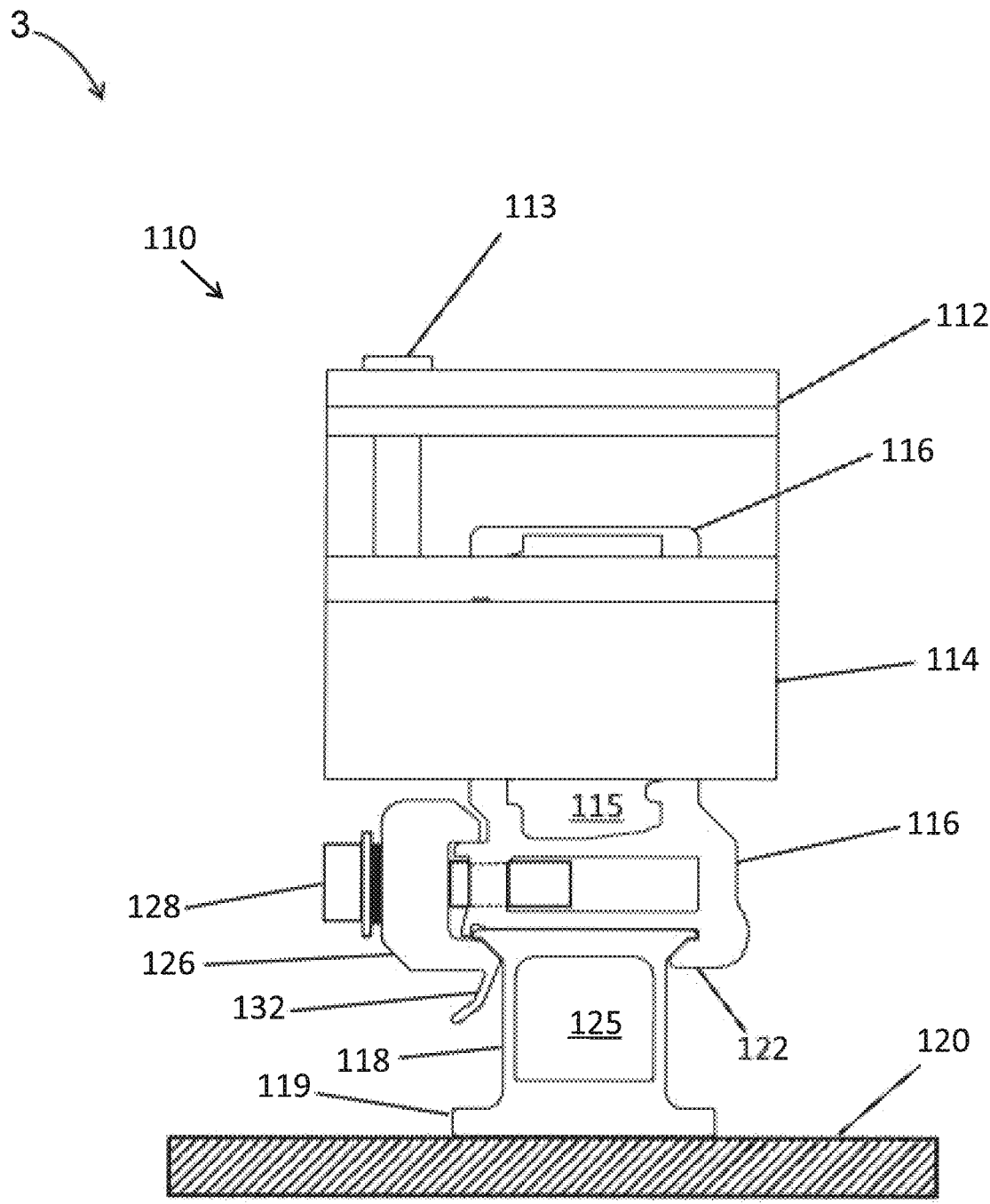

FIG. 95C shows an elevation view of an embodiment of a click-on tower assembly 110 in a clamped and locked position on slider 118. Here, horizontal clamp fastener 128 has been tightened and torqued to a level of torque sufficient to securely and permanently clamp (attach) tower 116 to slider 118. In an embodiment, the angle of mating surface 121 of hook 122 matches the corresponding angle of the right-side mating surface 124' of slider 118; and the angle of mating surface or slanted face 610 of dovetail clamp 126 matches the corresponding angle of left side mating surface 124 of slider 118. Both of these two angles may be 45°, for example. Horizontal clamp fastener 128 may be a cap-headed bolt (e.g., cap screw) with a hexagonal socket drive. Horizontal fastener 128 may also have an unthreaded (smooth) proximal portion near the cap-head end, to make it easier for dovetail clamp 126 to slide on horizontal bolt 128 during installation. In an embodiment, initial installation (i.e., clicking-on) of the clamp+tower sub-assembly onto slider 118 in FIGS. 95A and 95B is a "tool-less" operation that doesn't require any tools to accomplish. In an embodiment, pulling back of clamp 126 by hand is not necessary because clamp 26 automatically retracts and slides when the sub-assembly is hooked-on and rotated down into the horizontal position. Furthermore, slider 118 includes a pair of bottom flanges 119, 119' that run the longitudinal length of the slider. The open volume 115, the roof surface 120, and the hollow volume 125 are also indicated in FIG. 95C.

Figure 95D:
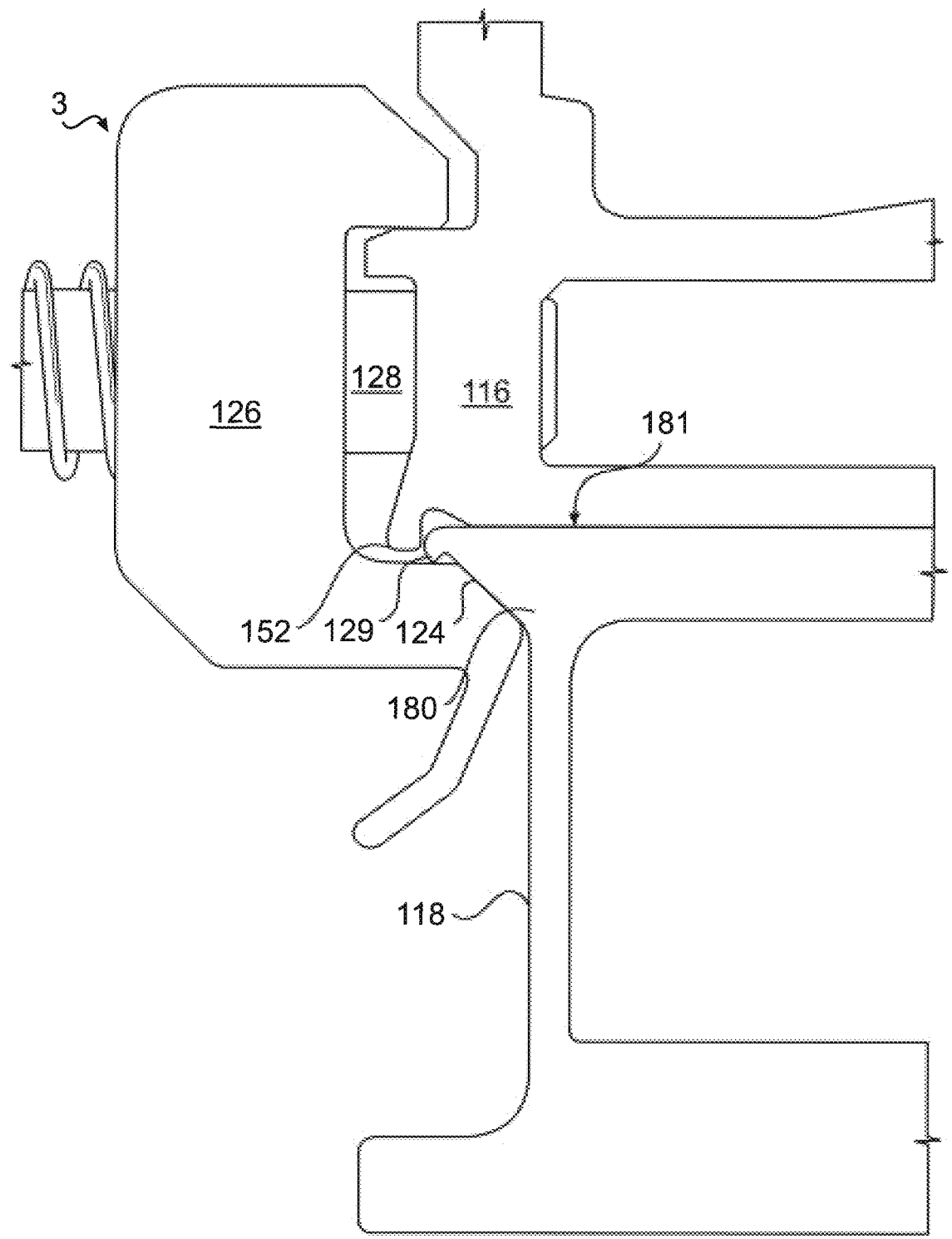

FIG. 95D shows a zoomed-in elevation view of an embodiment of a click-on tower sub-assembly 110 in an attached position on a slider 118. In this enlarged view, details of the clamp joint may be seen. In particular, the lower left corner of tower 116 includes a small protrusion (alignment lip) 152 which sticks out below the lower surface 181 of tower 116. When tower 116 is loosely attached to slider 118 via spring-loaded dovetail clamp 126, the purpose of lip 152 is to provide good alignment of tower 116 relative to slider 118, and to prevent rotation out-of-plane of tower 116 relative to slider 118, before horizontal fastener 128 may be tightened tight. The tapered or slanted slider flange 124, the slider lip 129, and a flange 180 to be discussed later are also indicated in FIG. 95D.

Figure 96A:
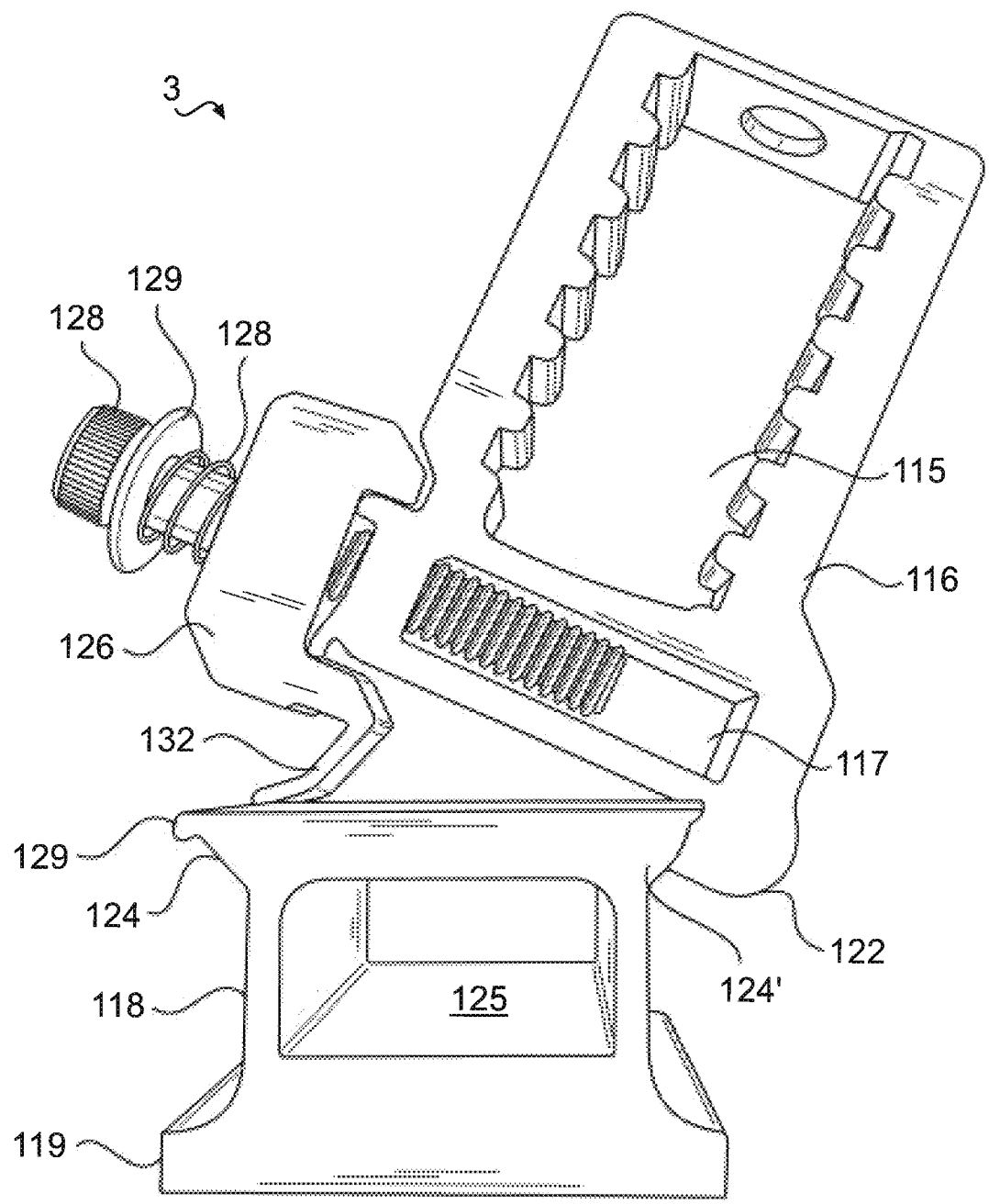
FIGS. 96A-B each show elevation side views of an installation sequence of a Click-On attachment mechanism, according to an embodiment.

FIG. 96A shows an elevation view of an embodiment of a click-on tower sub-assembly 3 in a skewed position next to a slider 118. Slider 118, tower 116, and dovetail clamp 126 may be made as machined or extruded items, which may be made from aluminum or aluminum alloys (which may be anodized black). The open volumes 115 and 17, one bottom flange 119, the tower hook 122, the flanges 124, 124', the hollow volume 125, the horizontal clamp fastener 128, the lip 129, the spring 130, the lower flange 132 of the dovetail clamp 126, and the flat washer 182 are also indicated in FIG. 96A.

Figure 96B:
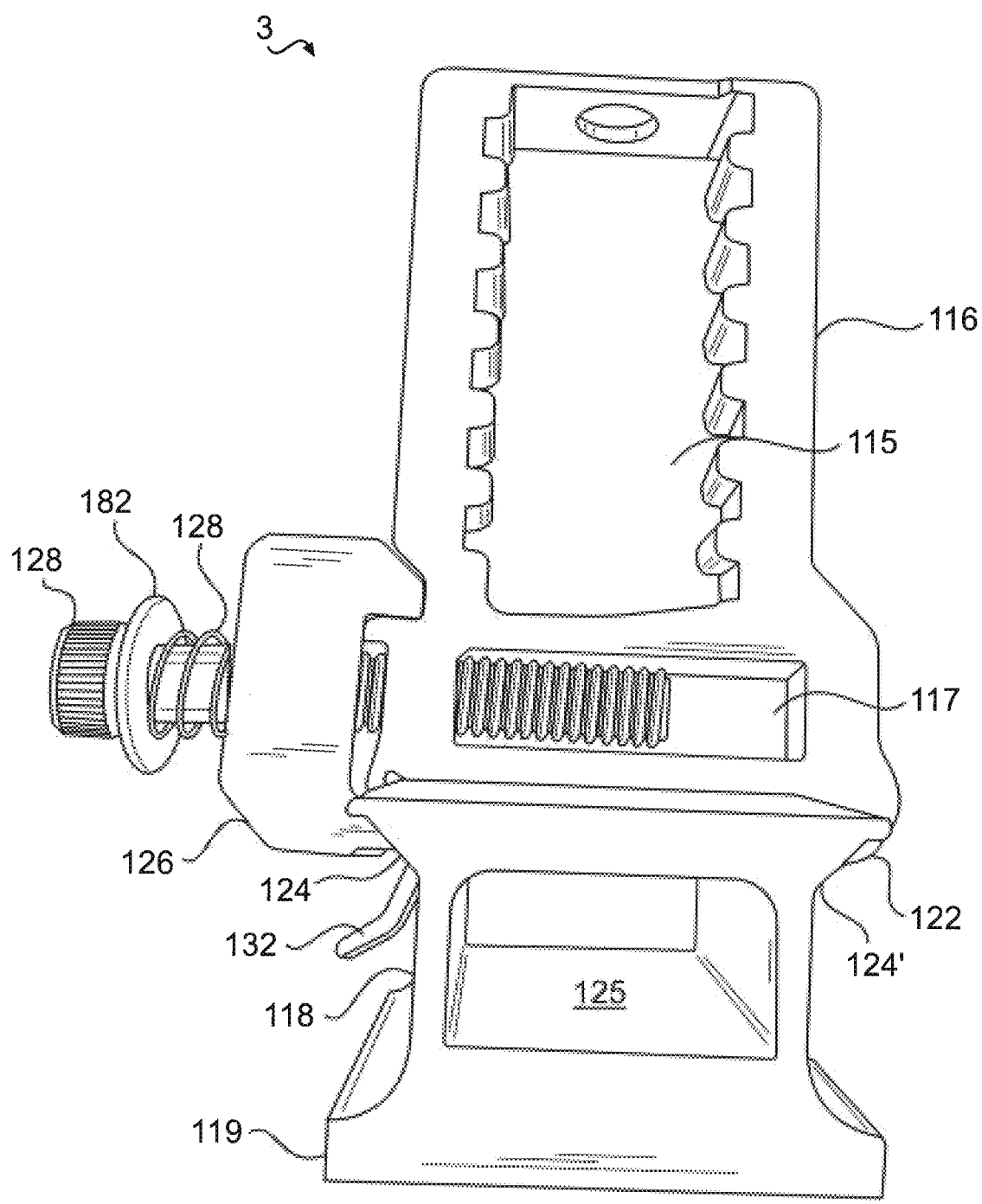

FIG. 96B shows an elevation view of an embodiment of a click-on tower assembly 3 in an attached position on a slider 118. The open volumes 115 and 117, the tower 116, the slider 118, one bottom flange 119, the tower hook 122, the tapered or slanted flanges 124, 124', the hollow volume 125, the dovetail clamp 126, the horizontal bolt 128, the spring 130, the lower flange 132, and the flat washer 182 are also indicated in FIG. 96B.

Figure 97:
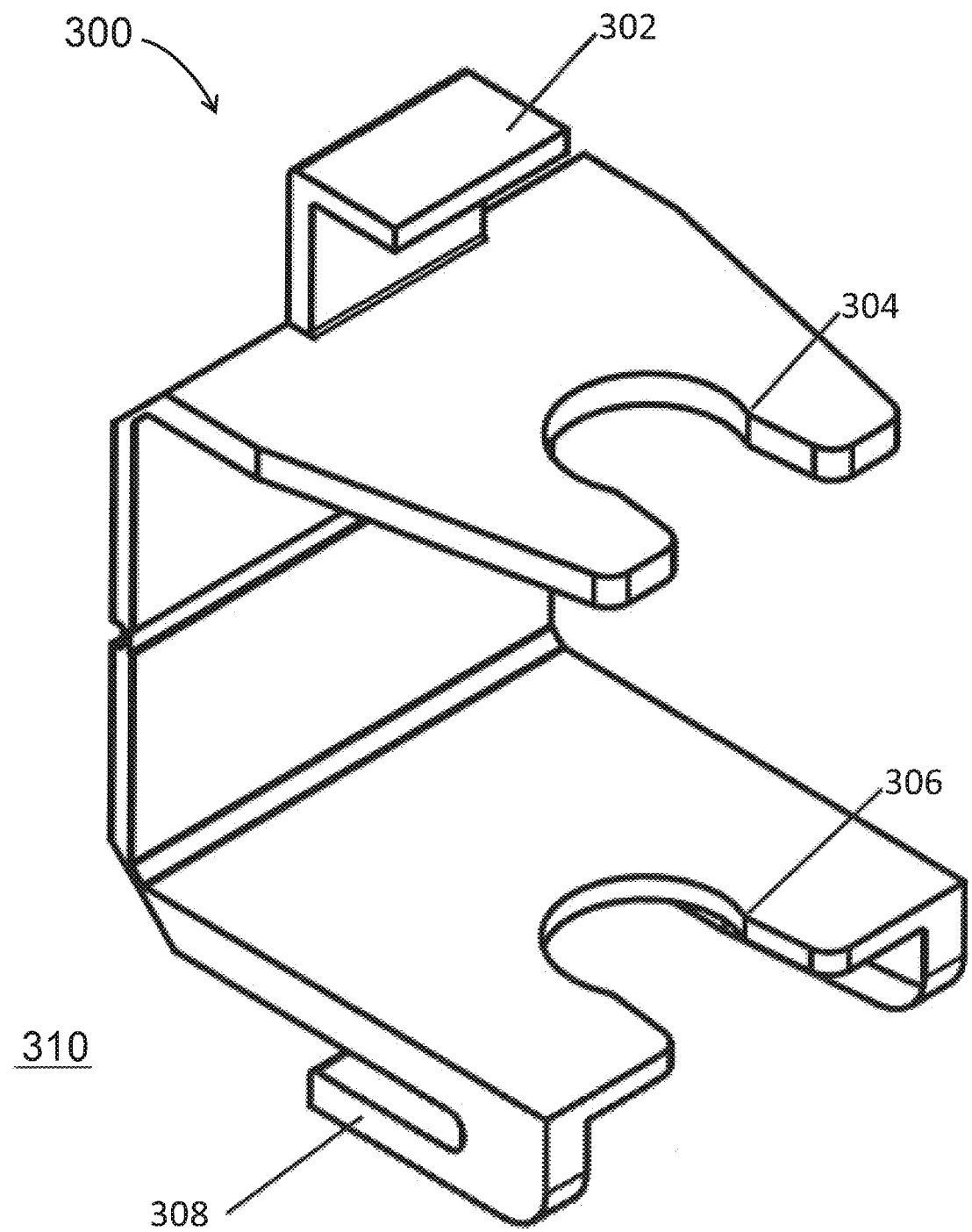
FIG. 97 shows an isometric perspective view of an anti-rotation clip, according to an embodiment.

FIG. 97 shows an isometric perspective view of an anti-rotation clip 300, according to an embodiment. In an embodiment, the anti-rotation clip 300 prevents the base (element 6 in FIG. 1) from rotating with respect to the tower bracket (element 8 in FIG. 1) and the slider (element 14 in FIG. 1). For example, in the embodiment shown, an anti-rotation clip 300 may include a tab 302 that is shaped such that the tab 302 may be inserted into the base. The anti-rotation 300 clip may include two clips 304 and 306, connected by a connecting segment, that are shaped to fit around the height adjustment bolt (element 3 in FIG. 1). The anti-rotation clip 300 may further include two u-shaped tabs 308 that are configured to engage the tower bracket (element 8 in FIG. 1). Additionally, in an embodiment, the anti-rotation clip 300 may include a scored or otherwise relaxed section 310 that extends across the breadth of the connecting segment between the two clips 304, 306. The relaxed section 310 may be formed by a reduced thickness of the material, scoring, or a change in material composition. In general, the relaxed section 310 allows the anti-rotation clip 300 to flex to a suitable degree, and may assist in the attachment process when connecting the clip 300 to the bolt 3. Further, in an embodiment, as described for example, when the tab 302 engages the base, the two clips 304 and 306 engage the height adjustment bolt 3, and the two u-shaped tabs 308 engage the tower bracket, the anti-rotation clip 300 prevents the base from moving relative to the tower bracket and the slider.

Figure 98:
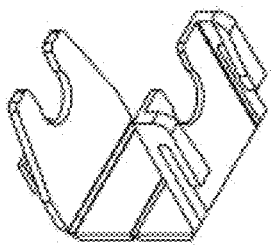
FIG. 98 shows multiple views of the anti-rotation clip of FIG. 97.
Figure 98:
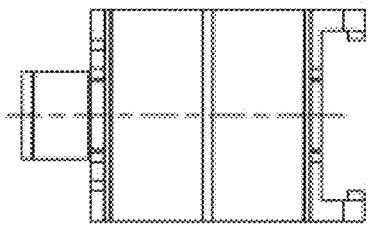
Figure 98:
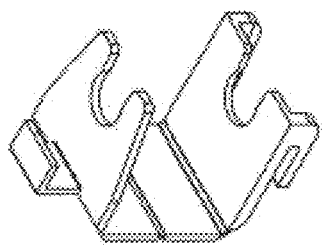
Figure 98:
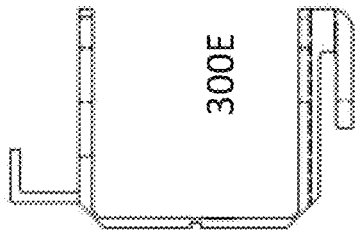
Figure 98:
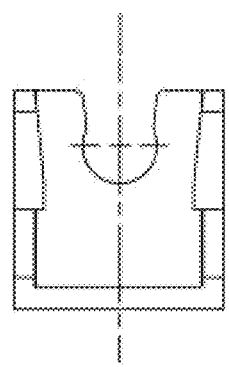
Figure 98:
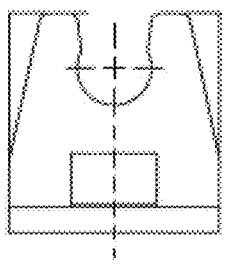
Figure 98:
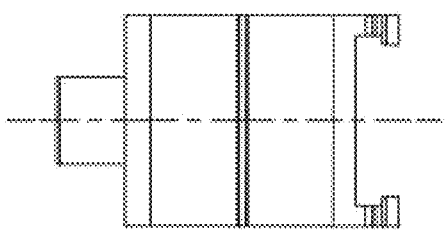

FIG. 98 depicts multiple views of the anti-rotation clip 300 from various directions including: top view 300A, isometric top front view 300B, isometric bottom front view 300C, front view 300D, side view 300E, back view 300F, and bottom view 300G.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter.

What is claimed is:
1. A solar panel mounting assembly, comprising:
   a cap including:
      a secure-side wing,
      a catch-side wing,
      a vertical leg protruding downwardly from the catch-side wing, the vertical leg being integral with the catch-side wing and having a top end and a bottom end, and
      a plurality of an inwardly-facing corrugations disposed at the bottom end of the vertical leg; and
   a base including:
      a secure-side support surface,
      a tilted spring support ledge on a catch-side, and
      a plurality of outwardly-facing corrugations disposed on an upper horizontal portion of the base,
   wherein at least one inwardly-facing corrugation of the vertical leg contacts and engages at least one outwardly-facing corrugation on the upper horizontal portion of the base, and
   wherein the base is vertically adjustable with respect to the cap.
2. The solar panel mounting assembly of claim 1, further comprising:
   a clamping bolt for clamping the cap to the base with a solar panel disposed in-between the cap and base; and
   a height adjustment bolt for adjusting a height of the base above a roof surface.
3. The solar panel mounting assembly of claim 1, wherein a centerline of the clamping bolt is offset from a centerline of the height adjustment bolt by a predetermined distance.

4. The solar panel mounting assembly of claim 3, wherein the predetermined distance ranges from approximately 1 mm to approximately 5 mm.

5. The solar panel mounting assembly of claim 1, wherein the cap further includes:
   the secure-side wing located on a secure-side of the assembly, and
   the catch-side wing located on a catch-side of the assembly.

6. The solar panel mounting assembly of claim 1, wherein a lower clamping surface of the secure-side wing is offset from a lower clamping surface of the catch-side wing by an offset distance.

7. The solar panel mounting assembly of claim 6, wherein the offset distance ranges from approximately 1 mm to approximately 3 mm.

8. The solar panel mounting assembly of claim 1, wherein a vertical distance between adjacent corrugations of the assembly ranges from approximately 1 mm to approximately 3 mm.

9. The solar panel mounting assembly of claim 2, further comprising a spring clip disposed between the clamping bolt and the vertical leg of the cap such that the spring clip maintains a position of the cap against the base.

10. A solar panel mounting assembly, comprising:
    an extended base, including:
       a secure-side support surface,
       a tilted spring support ledge on a catch-side of the assembly,
       a top surface,
       an open central volume,
       a horizontal slot disposed on the bottom of the base, the slot oriented lengthwise along a longitudinal direction of the base,
       a first pair of vertical apertures disposed in the top surface and spaced apart along a longitudinal direction of the base, and
       a second pair of vertical apertures disposed along a bottom surface of the base and providing access to the horizontal slot from above the slot, the first pair of vertical apertures being aligned vertically with the second pair of vertical apertures, respectively;
    a sliding rectangular nut disposed in the horizontal slot; and
    a height adjustment bolt,
    wherein the sliding rectangular nut engages an upper portion of the height adjustment bolt, and
    wherein the sliding rectangular nut and the engaged height adjustment bolt are slideable together as a single unit along a longitudinal length of the tray between a first longitudinal position and a second longitudinal position.

* * * * *

UNITED STATES PATENT AND TRADEMARK OFFICE
CERTIFICATE OF CORRECTION

| | | |
|---|---|---|
| PATENT NO. | : 11,290,053 B2 | |
| APPLICATION NO. | : 16/837946 | |
| DATED | : March 29, 2022 | |
| INVENTOR(S) | : Stacy Harris et al. | |

It is certified that error appears in the above-identified patent and that said Letters Patent is hereby corrected as shown below:

In the Claims

Column 30, Line 65, change "claim 1" to -- claim 2 --.

Signed and Sealed this
Nineteenth Day of September, 2023

Katherine Kelly Vidal
*Director of the United States Patent and Trademark Office*